(12) United States Patent
Watanabe et al.

(10) Patent No.: US 7,970,995 B2
(45) Date of Patent: Jun. 28, 2011

(54) STORAGE SYSTEM

(75) Inventors: Yasuo Watanabe, Machida (JP); Shunji Kawamura, Yokohama (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 597 days.

(21) Appl. No.: 12/060,966

(22) Filed: Apr. 2, 2008

(65) Prior Publication Data

US 2009/0198887 A1    Aug. 6, 2009

(30) Foreign Application Priority Data

Feb. 4, 2008  (JP) ................................. 2008-024504

(51) Int. Cl.
*G06F 12/00* (2006.01)
(52) U.S. Cl. ............. 711/114; 711/162; 711/218; 714/6
(58) Field of Classification Search ........................ None
See application file for complete search history.

(56) References Cited

U.S. PATENT DOCUMENTS

| | | | | |
|---|---|---|---|---|
| 6,101,615 | A * | 8/2000 | Lyons ................................. | 714/6 |
| 6,415,355 | B1 * | 7/2002 | Hirofuji ........................ | 711/114 |
| 6,675,318 | B1 * | 1/2004 | Lee ................................... | 714/6 |
| 2002/0194427 | A1 * | 12/2002 | Hashemi ........................ | 711/114 |
| 2003/0070043 | A1 * | 4/2003 | Merkey .......................... | 711/114 |
| 2005/0086575 | A1 * | 4/2005 | Hassner et al. ................ | 714/766 |
| 2005/0120262 | A1 * | 6/2005 | Dandrea ............................. | 714/6 |
| 2007/0198890 | A1 * | 8/2007 | Dholakia et al. .............. | 714/758 |
| 2008/0126912 | A1 * | 5/2008 | Zohar et al. .................... | 714/763 |
| 2008/0168225 | A1 * | 7/2008 | O'Connor ..................... | 711/114 |

OTHER PUBLICATIONS

U.S. Appl. No. 12/026,858, filed Feb. 6, 2008 to M. Kitamura.
"Intelligent RAID 6 Theory Overview and Implementation" White Paper.

* cited by examiner

*Primary Examiner* — Kaushikkumar Patel
(74) *Attorney, Agent, or Firm* — Brundidge & Stanger, P.C.

(57) ABSTRACT

A storage group configured by a plurality of storage devices is configured by a plurality of storage sub-groups, and the respective storage sub-groups are configured from two or more storage devices. A sub-group storage area, which is the storage area of the respective storage sub-groups, is configured by a plurality of rows of sub-storage areas. A data set, which is configured by a plurality of data elements configuring a data unit, and a second redundancy code created on the basis of this data unit, is written to a row of sub-storage areas, a compressed redundancy code is created on the basis of two or more first redundancy codes respectively created based on two or more data units of two or more storage sub-groups, and this compressed redundancy code is written to a nonvolatile storage area that differs from the above-mentioned two or more storage sub-groups.

2 Claims, 32 Drawing Sheets

FIG. 4

RAID CONFIGURATION TABLE 400

| VDEV | DISK | RAID LEVEL | STRIPE SIZE |
|---|---|---|---|
| 0 | 0, 1, 2, 3, 4, 5, 6, 7, 8, 9, 10, 11 | 0x0a | 32KB |
| 1 | 12, 13, 14, 15 | 0x0a | 32KB |
| 2 | 16, 17, 18, 19, 20, 21, 22, 23, 24, 25, 26, 27, 28, 29, 30 | 0x0b | 32KB |
| 3 | 31, 32, 33, 34, 35, 36, 37, 38, 39, 40, 41, 42, 43, 44, 45 | 0x0c | 32KB |
| 4 | 46, 47, 48, 49, 50, 51, 52, 53, 54, 55, 56, 57 | 0x0d | 32KB |
| ⋮ | ⋮ | ⋮ | ⋮ |

VDEV CONFIGURATION TABLE 500

| VDEV | LDEV | START | END |
|---|---|---|---|
| 0 | 0 | 0 | 0x77FFFFF |
| 0 | 1 | 0x7800000 | 0xC7FFFFF |
| ⋮ | ⋮ | ⋮ | ⋮ |
| 1 | 11 | 0 | 0x77FFFFF |
| 1 | 12 | 0x7800000 | 0xEFFFFFF |
| 1 | 13 | 0xF000000 | 0x13FFFFFF |
| ⋮ | ⋮ | ⋮ | ⋮ |

Columns: 501 (VDEV), 502 (LDEV), 503 (START), 504 (END)

FIG. 6

LU CONFIGURATION TABLE 600

| LDEV (601) | WWN (602) | LUN (603) | CAPACITY (604) |
|---|---|---|---|
| 0 | 31:02:c2:60:35:01 | 0 | 0x0057300 |
| 1 | 31:02:c2:60:35:01 | 1 | 0x01BBC000 |
|   | 31:02:c2:26:44:04 | 2 |   |
| ⋮ | ⋮ | ⋮ | ⋮ |
| k | 31:02:c2:26:44:04 | n | 0x1ADB0000 |

FIG. 7

DISK GROUP CONFIGURATION TABLE 700

| VDEV | DISK GROUP | DISK | RAID LEVEL |
|---|---|---|---|
| 2 | 0 | 16, 17, 18 | RAID5 |
|  | 1 | 19, 20, 21 | RAID5 |
|  | 2 | 22, 23, 24 | RAID5 |
|  | 3 | 25, 26, 27 | RAID5 |
|  | 4 | 28, 29, 30 | RAID5 |
|  | 5 | 16, 19, 22, 25, 28 | RAID4 |
|  | 6 | 17, 20, 23, 26, 29 | RAID4 |
|  | 7 | 18, 21, 24, 27, 30 | RAID4 |
| 3 | 0 | 31, 32, 33 | RAID5 |
|  | 1 | 34, 35, 36 | RAID5 |
|  | 2 | 37, 38, 39 | RAID5 |
|  | 3 | 40, 41, 42 | RAID5 |
|  | 4 | 43, 44, 45 | RAID5 |
|  | 5 | 31, 34, 37, 40, 43 | RAID5 |
|  | 6 | 32, 35, 38, 41, 44 | RAID5 |
|  | 7 | 33, 36, 39 42, 45 | RAID5 |
| 4 | 0 | 43, 44, 45, 46 | PARTIAL |
|  | 1 | 47, 48, 49, 50 | PARTIAL |
|  | 2 | 51, 52, 53, 54 | PARTIAL |
| ⋮ | ⋮ | ⋮ | ⋮ |

HDD FAILURE-CHECK TABLE 800

(1) HDD IN WHICH DATA ELEMENT STORED (2) HDD IN WHICH HORIZONTAL PARITY STORED (3) HDD IN WHICH VERTICAL PARITY STORED (4) HDD IN WHICH VERTICAL PARITY OF HORIZONTAL PARITIES (OR HORIZONTAL PARITY OF VERTICAL PARITIES) STORED

STORAGE SYSTEM

CROSS-REFERENCE TO PRIOR APPLICATION

This application relates to and claims the benefit of priority from Japanese Patent Application number 2008-24504, filed on Feb. 4, 2008, the entire disclosure of which is incorporated herein by reference.

BACKGROUND

The present invention generally relates to a storage system.

Generally speaking, a storage system, in which technology called RAID (Redundant Arrays of Independent (or Inexpensive) Disks) is employed, comprises a RAID group configured from a plurality of storage devices. A RAID group storage area is configured from a plurality of rows of sub-storage areas. The respective rows of sub-storage areas extend across the plurality of storage devices configuring the RAID group, and are configured from a plurality of storage areas corresponding to the plurality of storage devices. Hereinafter, one sub-storage area will be called a "stripe," and one row configured from a plurality of stripes will be called a "row of stripes". The RAID group storage area is made up of consecutive rows of stripes.

A RAID is known to have a number of levels (referred to as "RAID levels" hereinafter).

For example, there is RAID 5. In RAID 5, data is distributively written to a plurality of storage devices (for example, hard disk drives (HDD)), which configure the RAID group corresponding to RAID 5. More specifically, for example, write-targeted data specified by a host computer corresponding to RAID 5 is divided into data of a prescribed size (hereinafter, for the sake of convenience, referred to as a "data unit"), each data unit is divided into a plurality of data elements, and the plurality of data elements is written to a plurality of stripes. Further, in RAID 5, in order to restore a data element that can no longer be read out from a storage device due to this storage device having failed, redundancy data called "parity" (hereinafter, "redundancy code") is created for a single data unit, and this redundancy code is also written to a stripe. More specifically, for example, when there are four storage devices configuring a RAID group, three data elements, which configure a data unit, are written to three stripes corresponding to three storage devices from thereamong, and a redundancy code is written to the stripe corresponding to the one remaining storage device. If a failure should occur in one of the four storage devices configuring the RAID group, the unreadable data element is restored by using the remaining two data elements configuring the data unit, which comprises this unreadable data element, and the redundancy code corresponding to this data unit.

The problem with RAID 5 is that it is unable to tolerate a so-called double-failure. More specifically, when two elements (either two data elements, or one data element and a redundancy code) in a data set, which is configured by a data unit and a redundancy code, become unreadable due to the fact that two of the plurality of storage devices configuring the RAID group have failed, these two elements cannot be restored. This is because only one redundancy code is created for each data unit.

RAID 6 is the RAID level that is capable of tolerating a double-failure like this. In RAID 6, two (two types of) redundancy codes are created for each row of stripes (Intelligent RAID 6). Theory Overview and Implementation.

However, while RAID 6 has the advantage of being able to tolerate a double-failure, it has the disadvantage of requiring more storage capacity than RAID 5 for a single data unit. This is because more redundancy codes are written for a single data unit than in RAID 5.

SUMMARY

Accordingly, an object of the present invention is to make it possible to both restore two elements, which have become unreadable in a single data set, and to conserve consumed storage capacity.

In a first aspect, a storage group, which is configured by a plurality of storage devices, is configured from a plurality of storage sub-groups, and the respective storage sub-groups are configured from two or more storage devices of a plurality of storage devices. The plurality of storage sub-groups are configured from a plurality of first type storage sub-groups and a plurality of second type storage sub-groups. Two or more storage devices, which configure the respective second type storage sub-group, are storage devices constituting the respective components of the plurality of first type storage sub-groups, and therefore, the respective storage devices, which configure a storage group, constitute the components of both any of the plurality of first type storage sub-groups and any of the plurality of second type storage sub-groups. The respective first type sub-group storage areas, which are the respective storage areas of the respective first type storage sub-groups, are configured from a plurality of rows of first type sub-storage areas. A row of first type sub-storage areas spans two or more storage devices configuring the first type storage sub-group, and is configured from two or more first type sub-storage areas corresponding to these two or more storage devices. Respective second type sub-group storage areas, which are the respective storage areas of the plurality of second type storage sub-groups, are configured from the plurality of rows of second type sub-storage areas. The row of second type sub-storage areas spans two or more storage devices, which configure a second type storage sub-group, and is configured from two or more second type sub-storage areas corresponding to these two or more storage devices.

In a second aspect, a storage group, which is configured by a plurality of storage devices, is configured from a plurality of storage sub-groups, and the respective storage sub-groups are configured by two or more storage devices of the plurality of storage devices. A sub-group storage area, which is the storage area of the respective storage sub-groups, is configured from a plurality of rows of sub-storage areas. The respective rows of sub-storage areas span the above-mentioned two or more storage devices, and are configured from a plurality of sub-storage areas corresponding to the above-mentioned plurality of storage devices. In this configuration, a data set, which is configured from a plurality of data elements configuring a data unit and a second redundancy code, which is created on the basis of the above-mentioned data unit, is written to a row of sub-storage areas, and a compressed redundancy code, which is one code of a size that is smaller than the total size of two or more first redundancy codes, is created on the basis of two or more first redundancy codes respectively created based on two or more data units in two or more storage sub-groups of the plurality of storage sub-groups, and this compressed redundancy code is written to a nonvolatile storage area that differs from the above-mentioned two or more storage sub-groups.

In a third aspect, a storage group, which is configured by a plurality of storage devices, is configured from a plurality of storage sub-groups. The respective storage sub-groups are configured by two or more storage devices of the plurality of storage devices. When a data set, comprising a data unit and a redundancy code created on the basis of this data unit, is written to a certain storage sub-group, a different type redundancy code related to this data unit is written to a storage sub-group that differs from this storage sub-group. When a multiple-failure data set, which is a data set comprising a first and second element that are impossible to read out, exists in the above-mentioned certain storage sub-group, the first and second elements are restored by making use of the above-mentioned different type redundancy code that exists in the above-mentioned different storage sub-group.

BRIEF DESCRIPTION OF THE DRAWINGS

FIG. 4 is a diagram showing an example of the configuration of a RAID configuration table;

FIG. 5 is a diagram showing an example of the configuration of a VDEV configuration table;

FIG. 6 is a diagram showing an example of the configuration of a LU configuration table;

FIG. 7 is a diagram showing an example of the configuration of a Disk Group configuration table;

DESCRIPTION OF THE PREFERRED EMBODIMENT

Figure 1:
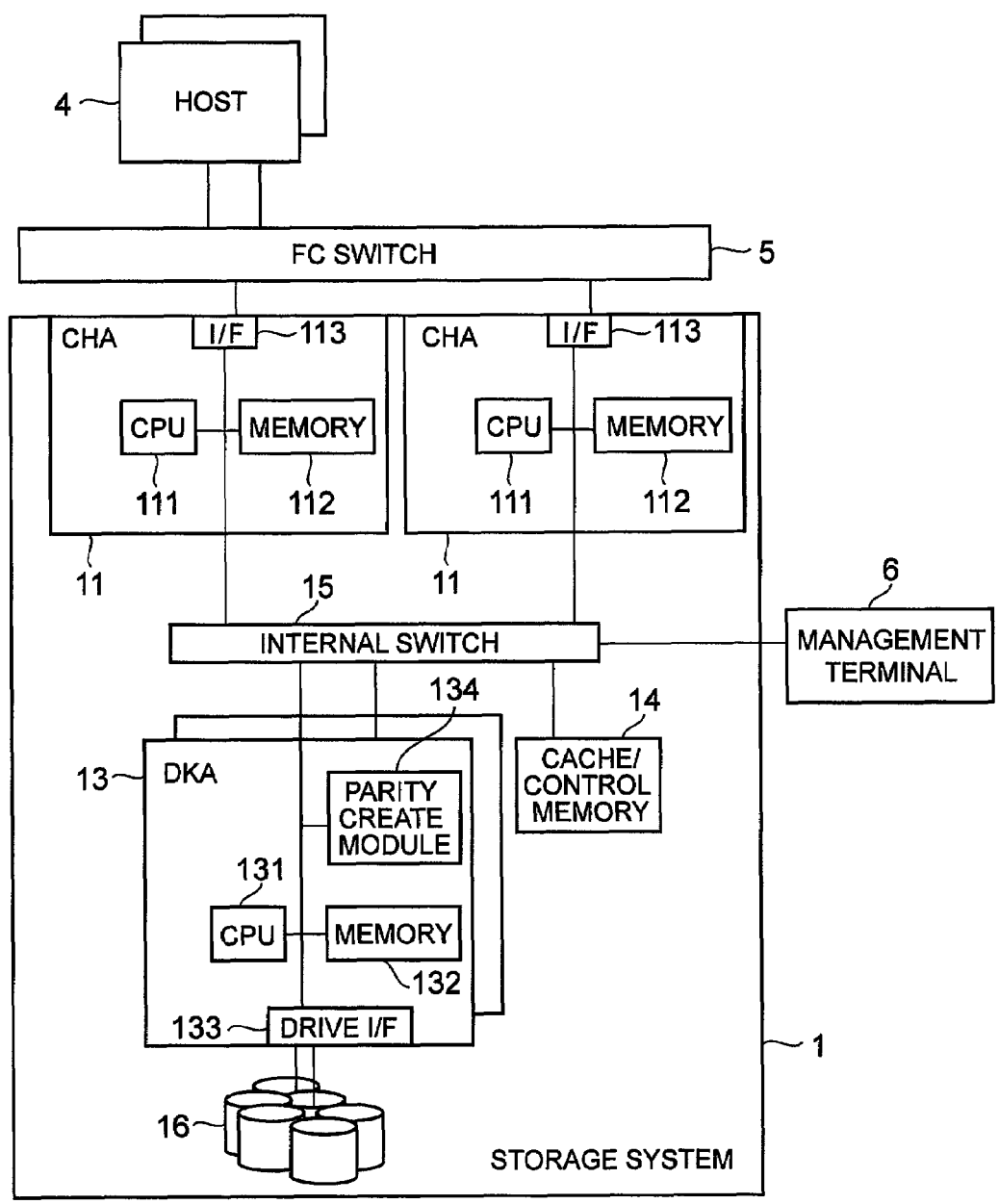
FIG. 1 is a diagram showing the physical configuration of a storage system related to a first embodiment of the present invention.

In Embodiment 1, a storage system comprises a storage group configured from a plurality of storage devices; and a write controller that controls a write to the above-mentioned storage group. The above-mentioned storage group is configured from a plurality of storage sub-groups. The respective storage sub-groups are configured from two or more storage devices of the above-mentioned plurality of storage devices. The above-mentioned plurality of storage sub-groups is configured from a plurality of first type storage sub-groups and a plurality of second type storage sub-groups. The two or more storage devices, which configure the respective second type storage sub-groups, are storage devices, which respectively constitute the components of the above-mentioned plurality of first type storage sub-groups, and therefore, the respective storage devices configuring the above-mentioned storage group constitute the components of both any of the plurality of first type storage sub-groups, and any of the plurality of second type storage sub-groups. The respective first type sub-group storage areas, which are the respective storage areas of the above-mentioned respective first type storage sub-groups, are configured from a plurality of rows of first type sub-storage areas. The above-mentioned row of first type sub-storage areas spans the above-mentioned two or more storage devices configuring the above-mentioned first type storage sub-group, and is configured from two or more first type sub-storage areas corresponding to these two or more storage devices. The respective second type sub-group storage areas, which are the respective storage areas of the above-mentioned respective second type storage sub-groups, are configured from the plurality of rows of second type sub-storage areas. The above-mentioned row of second type sub-storage areas spans the above-mentioned two or more storage devices, which configure the above-mentioned second type storage sub-group, and is configured from two or more second type sub-storage areas corresponding to these two or more storage devices.

In Embodiment 1, for example, the storage group is the total RAID group, which will be explained hereinbelow, the first type storage sub-group is a horizontal RAID group, which will be explained hereinbelow, the row of first type sub-storage areas is a horizontal row of stripes, which will be explained hereinbelow, the first redundancy code is a horizontal parity, which will be explained hereinbelow, the second type storage sub-group is a vertical RAID group, which will be explained hereinbelow, the row of second sub-storage areas is a vertical row of stripes, which will be explained hereinbelow, and the second redundancy code is a vertical parity, which will be explained hereinbelow.

In Embodiment 2 according to Embodiment 1, as the data unit, which is data of a prescribed size, and which is made up of a plurality of elements, there are a first type data unit and a second type data unit. The above-mentioned first type data unit is configured from a plurality of data elements. The above-mentioned second type data unit either is configured from one data element of each of the plurality of first type data units, or is configured from a plurality of first redundancy codes. The above-mentioned write controller: (W1) writes a data set, which comprises a plurality of data elements configuring the above-mentioned first type data unit and a first redundancy code created based on the above-mentioned plurality of data elements to the above-mentioned row of first type sub-storage areas; and (W2) writes a second redundancy code, which is created based on the above-mentioned second type data unit residing in the row of second type sub-storage areas, to a free second type sub-storage area in this row of second type sub storage areas.

In Embodiment 3 according to Embodiment 2, the above-mentioned storage system further comprises a restore controller that controls a restore to the above-mentioned storage group. When a multiple-failure data set, which is a data set comprising an unreadable first and second element, exists in the above-mentioned storage group, the above-mentioned restore controller: restores (R1) the above-mentioned first element in the second data unit, which comprises the above-mentioned first element, based on a data element other than the above-mentioned first element and a second redundancy code created on the basis of this second data unit; and restores (R2) the above-mentioned second element in the second data unit, which comprises the above-mentioned second element, either based on a data element other than the above-mentioned second element and a second redundancy code created on the basis of this second data unit, or based on the restored first element and an element other than the above-mentioned first element in the above-mentioned data set.

The above-mentioned first and second elements are either the two above-mentioned data elements, or one of the above-mentioned data elements and the above-mentioned first redundancy code.

In Embodiment 4 according to any of Embodiments 1 through 3, the above-mentioned respective second type storage sub-groups are RAID groups corresponding to RAID 4.

In Embodiment 5 according to any of Embodiments 1 through 3, the above-mentioned respective second type storage sub-groups are RAID groups corresponding to RAID 5.

In Embodiment 6 according to either Embodiment 4 or Embodiment 5, the above-mentioned respective first type storage sub-groups are RAID groups corresponding to RAID 5.

In Embodiment 7 according to any of Embodiments 2 through 6, the above-mentioned write controller updates the second redundancy code corresponding to the second data unit comprising an updated data element, and/or the second redundancy code corresponding to the second data unit comprising an updated first redundancy code, asynchronously to the timing at which a data element in a certain first data unit and, together therewith, the first redundancy code corresponding to the above-mentioned certain first data unit have been updated.

In Embodiment 8 according to any of Embodiments 4 through 7, two or more logical addresses respectively corresponding to two or more first type sub-storage areas configuring a Pth row of first type sub-storage areas inside a Kth first type storage sub-group, and two or more logical addresses respectively corresponding to two or more first type sub-storage areas configuring a Pth row of first type sub-storage areas inside a K+1st first type storage sub-group are consecutive (K and P being integers greater than 0).

In Embodiment 8, the storage system comprises a storage group, which is configured from a plurality of storage devices, and a write controller that writes a data unit, which is data of a prescribed size, to the above-mentioned storage group. The above-mentioned storage group is configured from a plurality of storage sub-groups. The respective storage sub-groups are configured from two or more storage devices of the above-mentioned plurality of storage devices. The sub-group storage area, which is the storage area of the above-mentioned respective storage sub-groups, is configured from a plurality of rows of sub-storage areas. The respective rows of sub-storage areas span the above-mentioned two or more storage devices, and are configured from a plurality of sub-storage areas corresponding to the above-mentioned plurality of storage devices. The above-mentioned write controller: (W1) writes a data set, which is configured from a plurality of data elements configuring a data unit and a second redundancy code created on the basis of the above-mentioned data unit, to a row of sub-storage areas; (W2) creates a compressed redundancy code, which is one code of a size that is smaller than the total size of two or more first redundancy codes, on the basis of the above-mentioned two or more first redundancy codes respectively created based on two or more data units in two or more storage sub-groups of the above-mentioned plurality of storage sub-groups; and (W3) writes the above-mentioned created compressed redundancy code to a nonvolatile storage area that differs from the above-mentioned two or more storage sub-groups.

In Embodiment 8, for example, the storage group is a total RAID group, which will be explained hereinbelow, the storage sub-group is a part of the RAID group, which will be explained hereinbelow, the first redundancy code is a P parity, which will be explained hereinbelow, and the second redundancy code is a Q parity, which will be explained hereinbelow.

In Embodiment 9, the storage system further comprises a restore controller that restores a data element configuring a data unit stored in the above-mentioned storage group. When a multiple-failure data set, which is a data set comprising an unreadable first and second elements, exists in the above-mentioned storage group, the above-mentioned restore controller: (R1) reads out the above-mentioned compressed redundancy code from the above-mentioned nonvolatile storage area, and restores a first redundancy code created on the basis of a data unit in the above-mentioned multiple-failure data set, based on the above-mentioned read-out compressed redundancy code, and either one or a plurality of first redundancy codes, which constitute the basis of the above-mentioned compressed redundancy code created on the basis of either one or a plurality of data units in either one or a plurality of data sets other than the above-mentioned multiple-failure data set; and (R2) restores the above-mentioned first and second elements, based on the above-mentioned restored first redundancy code and an element other than the above-mentioned first and second elements in the above-mentioned multiple-failure data set, and the above-mentioned first and second elements either are the two above-mentioned data elements, or are one of the above-mentioned data elements, and the above-mentioned second redundancy code.

In Embodiment 10 according to either Embodiment 8 or Embodiment 9, two or more logical addresses respectively corresponding to two or more sub-storage areas configuring a Pth row of sub-storage areas in a Kth storage sub-group, and two or more logical addresses respectively corresponding to two or more sub-storage areas configuring a Pth row of sub-storage areas in a K+1st storage sub-group are consecutive for the above-mentioned two or more storage sub-groups (K and P being integers greater than 0).

In Embodiment 11 according to any of Embodiments 8 through 10, the above-mentioned nonvolatile storage area is a sub-storage area inside a storage sub-group that differs from the above-mentioned two or more storage sub-groups of the above-mentioned plurality of storage sub-groups.

In Embodiment 12, the storage system comprises a storage group configured from a plurality of storage devices; a write controller that writes a data unit, which is data of a prescribed size and a redundancy code created on the basis of this data unit; and a restore controller that controls a restore to the above-mentioned storage group. The above-mentioned storage group is configured from a plurality of storage sub-groups. The respective storage sub-groups are configured from two or more storage devices of the above-mentioned plurality of storage devices. When the above-mentioned write controller writes a data set, comprising a data unit and a redundancy code created on the basis of this data unit, to a certain storage sub-group, the above-mentioned write control unit writes a different type redundancy code related to this data unit to a storage sub-group that differs from this storage sub-group. When a multiple-failure data set, which is a data set comprising unreadable first and second elements, exists in the above-mentioned certain storage sub-group, the above-mentioned restore controller uses the above-mentioned different type redundancy code that exists in the above-mentioned different storage sub-group to restore the above-mentioned first and second elements.

In Embodiment 12, for example, the storage group can be the total RAID group, which will be explained hereinbelow, the storage sub-group can be either a horizontal RAID group or a vertical RAID group, which will be explained hereinbelow, and the row of sub-storage areas can be a row of horizontal stripes, which will be explained hereinbelow, or a row of vertical stripes, which will be explained hereinbelow. Or, for example, the storage group can be the total RAID group, which will be explained hereinbelow, the storage sub-group can be a part of the RAID group, which will be explained hereinbelow, and the first redundancy code can be a P parity, which will be explained hereinbelow.

At least one of the above-mentioned write controller and restore controller can be constructed using hardware (for example, a circuit), a computer program, or a combination thereof (for example, one part can be realized via a computer program, and the remaining part or parts can be realized via hardware). The computer program is executed by being read into a prescribed processor. Further, a storage region that exists in a hardware resource, like a memory, can be used as needed for information processing, which is carried out by a computer program being read into the processor. Further, the computer program can be installed in a computer from a CD-ROM or other such recording medium, and can also be downloaded to the computer via a communication network.

The first embodiment of the present invention will be explained in detail hereinbelow while referring to the figures. Furthermore, in the following explanation, respective data of a prescribed size needed to create a redundancy code will be referred to as a "data unit", and data, which is a component of a data unit, and which is stored in a stripe will be referred to as a "data element". Further, in the following explanation, a storage group will be called a "RAID group", and it will be supposed that the respective storage devices configuring a RAID group are HDD (hard disk drives).

FIG. 1 is a diagram showing the physical configuration of a storage system 1 related to the first embodiment of the present invention.

One or more host computers (hereinafter, host) 4, and the storage system 1 are connected via a FC (Fibre Channel) switch 5. In this figure, the host 4 and the storage system 1 are connected via a single FC switch 5, but the host 4 and the storage system 1 can also be connected via a plurality of FC switches 5. Furthermore, a SAN (Storage Area Network) is constructed by one or more FC switches 5. The FC switch 5 and the host 4, and the FC switch 5 and the host adapter 11 of the storage system 1 are respectively connected by fibre channel cables. The host 4 can send a data I/O request (for example, a read request or a write request) to the storage system 1 by way of the FC switch 5.

The storage system 1, for example, can be made into a RAID system comprising a large number of HDD (hard disk drives) 16 arranged in an array. The storage system 1, for example, comprises a CHA (channel adapter) 11, a DKA (disk adapter) 13, cache/control memory 14, and internal switch 15 as its controller. Access to the HDD 16 is controlled by the storage system 1 controller. Furthermore, for example, the storage system 1 can also be realized by equipping the FC switch 5 with the functions of the CHA 11, DKA 13, and internal switch 15, and combining the FC switch 5 with a plurality of HDD 16.

The CHA 11 has either one or a plurality of I/F (for example, a communication port, or a communication control circuit comprising a communication port) 113, communicably connected to an external device (for example, a host or other storage system), and is for carrying out data communications with the external device. The CHA 11 is configured as a microcomputer system (for example, a circuit board) comprising a CPU 111 and a memory 112. The CHA 11, for example, writes write-targeted data to the cache area of the cache/control memory 14 when there is a write request from the host 4. Further, the CHA 11 sends read-targeted data, which the DKA 13 has read out from the HDD 16 and written to the cache area of the cache/control memory 14, to the host 4 when there is a read request from the host 4.

The DKA 13 has either one or a plurality of drive I/F (for example, a communication port or a communication control circuit comprising a communication port) 133 communicably connected to the respective HDD 16, and is for carrying out communications with the HDD 16. The DKA 13 is configured as a microcomputer system (for example, a circuit board) comprising a CPU 131 and memory 132. The DKA 13, for example, writes write-targeted data, which has been written to the cache area of the cache/control memory 14 from the CHA 11, to the HDD 16, and writes read-targeted data read out from the HDD 16 to the cache area.

Further, the DKA 13 comprises a parity create module 134 that creates a redundancy code (hereinafter, parity) for restoring a data element, which has become impossible to read out due to a failure that has occurred in the HDD. In this embodiment, the parity create module 134 is a hardware circuit for creating parity, but can also be a function incorporated into a computer program. The parity create module 134, for example, creates parity by computing an exclusive OR for the plurality of data elements configuring a data unit (or, by applying a prescribed coefficient to the plurality of data elements making up the data unit, and subsequently computing the exclusive OR for the respective data). Further, the parity create module 134 can create one parity based on a plurality of parities (hereinafter, called a "compressed parity"). In this embodiment, as will be explained hereinbelow, the way of creating parity will differ according to which data protection mode, of any of a first through a fourth data protection mode, is protecting a write-targeted VDEV (VDEV will be explained hereinbelow). In the first data protection mode, one compressed parity is created in each HDD. More specifically, one compressed parity is created for each HDD on the basis of a plurality of data elements and a plurality of first parities (hereinafter, P parities) stored in a plurality of stripes configuring an HDD. In the fourth data protection mode, one compressed parity is created on the basis of a plurality of P parities corresponding to a plurality of data units.

The cache/control memory 14, for example, is either a volatile or a nonvolatile memory. The cache/control memory 14 has a cache area and a control area. The cache/control memory 14 can be configured from two memories: a memory having a cache area, and a memory having a control area. The cache area temporarily stores data received from an external device (host 4), and data read out from the HDD 16. The control area stores information (hereinafter, control information) related to the control of the storage system 1. Control information, for example, can include a variety of tables, which will be explained hereinbelow.

The internal switch 15, for example, is a crossbar switch, and is the device that interconnects the CHA 11, DKA 13, and cache/control memory 14. Instead of the internal switch 15, another type of connector, such as a bus, can be used.

A management terminal 6, for example, is connected to the internal switch 15. The management terminal 6 is a computer for managing the storage system 1. The management terminal 6, for example, can store a variety of tables, which will be explained hereinbelow, in the control area of the cache/control memory 14. Furthermore, the functions carried out by the management terminal 6 can be provided in the host 4. That is, the host 4 can store the various tables that will be explained hereinbelow.

The preceding is an explanation of an example of the physical configuration of the storage system related to the first embodiment. Furthermore, the above explanation is an example; there is no need to limit the configuration of this storage system. For example, the controller can have a simpler configuration, and, for example, can be configured comprising a CPU and a memory on one circuit board (a configuration by which the functions of the CHA 11 and DKA 13 are realized via a single circuit board).

Figure 2:
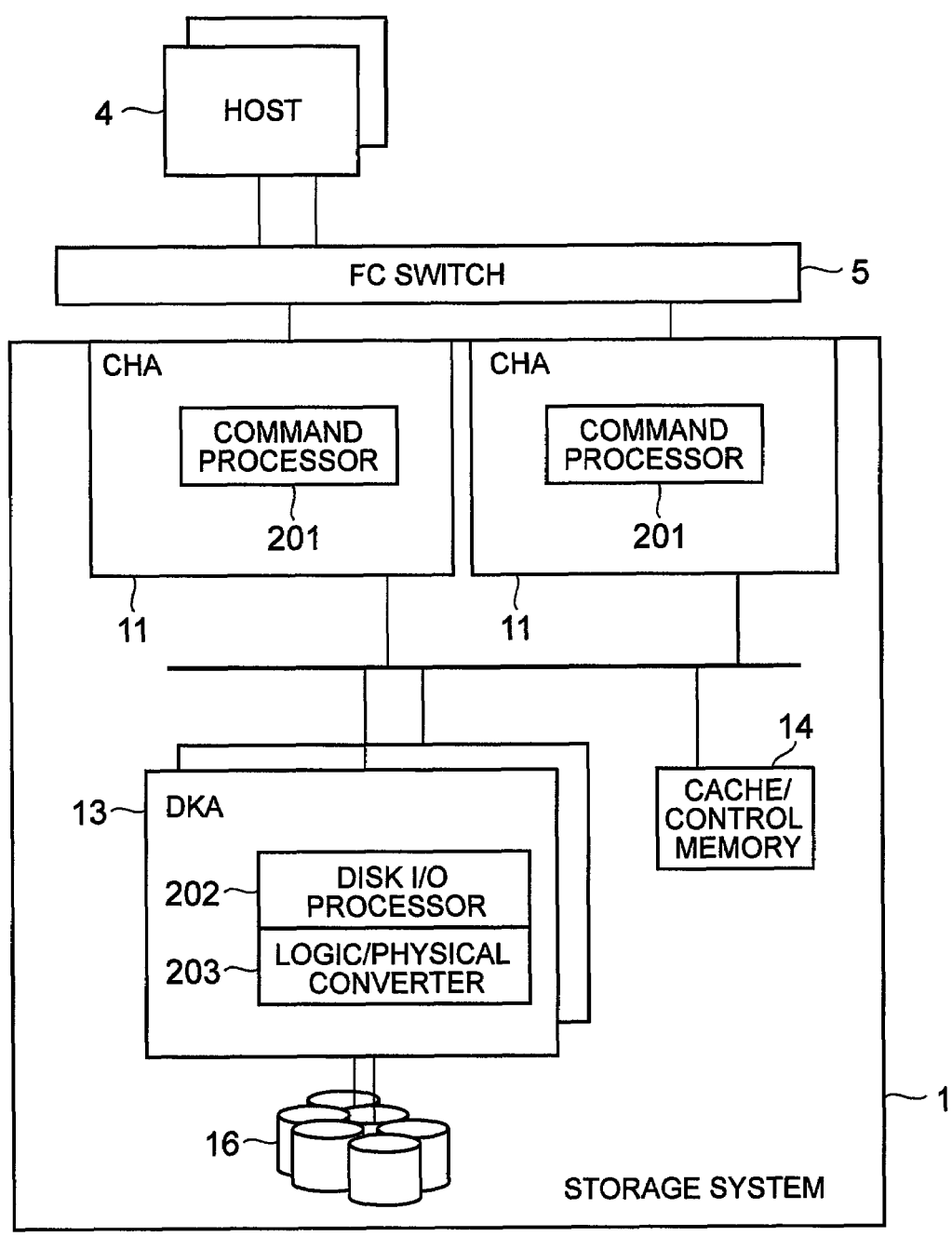
FIG. 2 is a diagram showing an example of the logical configuration of the storage system 1 related to this embodiment.

FIG. 2 is a diagram showing an example of the logical configuration of the storage system 1 related to this embodiment.

In the CHA 11, for example, a command processor 201, for example, is stored in the memory 112 of the CHA 11 as a computer program to be executed by the CPU 111. In the DKA 13, for example, a disk I/O processor 202 and a logical/physical converter 203, for example, are stored in the memory 132 as programs to be executed by the CPU 131. Hereinafter, whenever a computer program is the subject of an explanation, this will signify that the processing is actually being carried out by the CPU, which executes this computer program.

The command processor 201 processes an I/O request received from the host 4. For example, when an I/O request is a write request, the command processor 201 writes the write-targeted data accompanying this write request to the cache area.

The logical/physical converter 203 converts a logical address to a physical address. A logical address, for example, is a LDEV identifier or the LBA (Logical Block Address) of this LDEV. A physical address is an LBA used for specifying the location of the respective disk blocks inside an HDD 16, or a "combination of a cylinder number, track number and sector number (CC, HH, SS)".

The disk I/O processor 202 controls the input/output of data to/from the HDD 16. More specifically, for example, the disk I/O processor 202 divides write-targeted data stored in the cache area into a plurality of data units, and writes the respective data units to the RAID group. At this time, the disk I/O processor 202 uses the logical/physical converter 203 to convert the logical address of the access destination to a physical address, and sends the physical address-specifying I/O request to an HDD 16. Consequently, the data element and parity can be written to the storage area corresponding to this physical address, and the data element and parity can be read from the storage area corresponding to this physical address.

Figure 3:
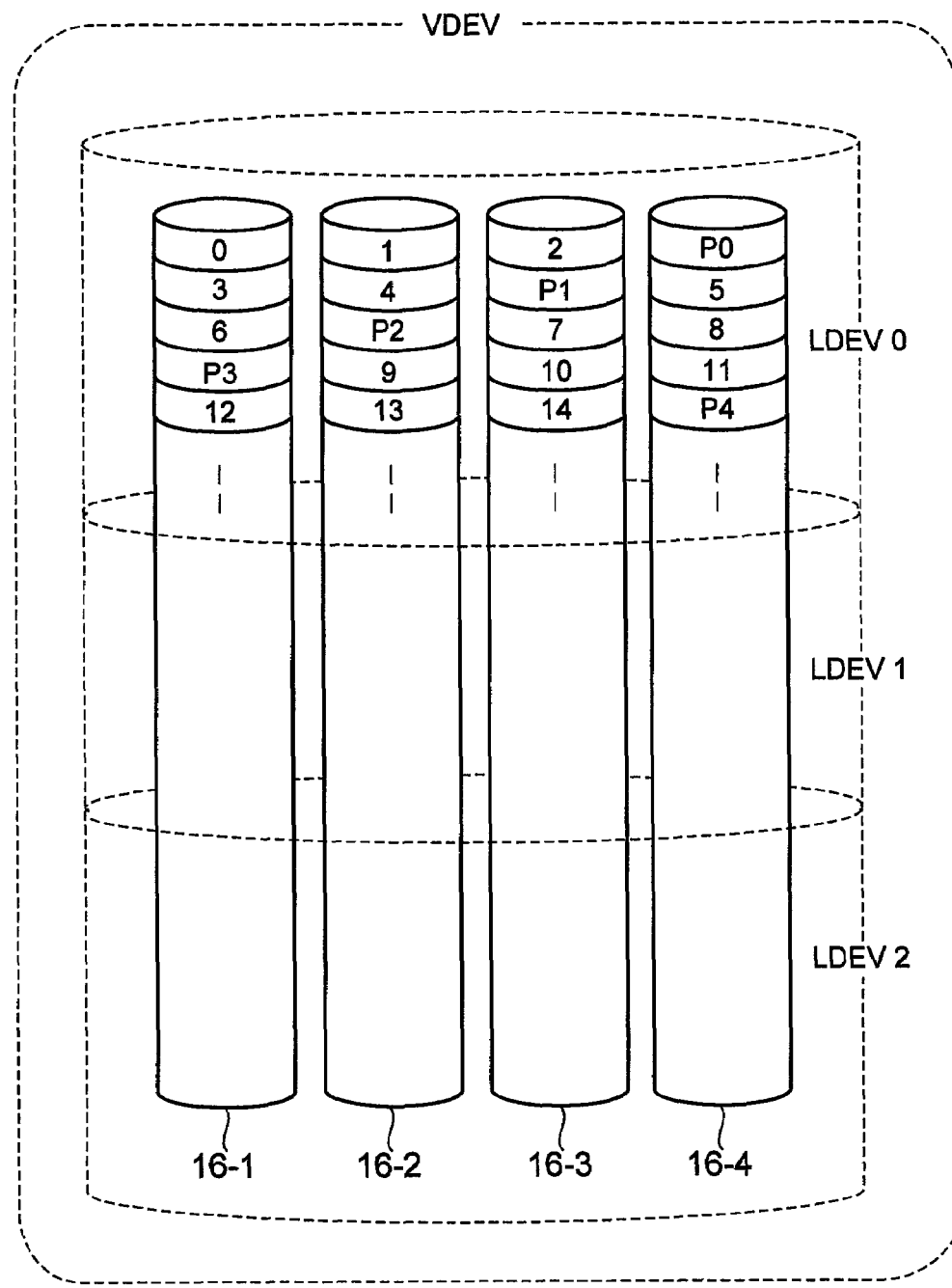
FIG. 3 is a diagram showing an example of the relationships between a plurality of HDD and logical volumes configuring a RAID group.

FIG. 3 is a diagram showing an example of the relationships between a plurality of HDD 16 and logical volumes.

A single RAID group is configured from a plurality of (for example, four) HDD 16-1, 16-2, 16-3 and 16-4. For example, when the RAID level is RAID 5, three data elements configuring a data unit are stored in three HDD 16, and a P parity created on the basis of these three data elements is stored in one other HDD 16.

In this embodiment, the storage area provided by this either one or plurality of RAID groups (a cluster of storage areas of a plurality of HDD 16) is called a "VDEV", which is an abbreviation for Virtual Device. In this example, one VDEV is corresponded to one RAID group. The respective VDEV parts obtained by partitioning this VDEV are called logical volumes in this embodiment. A logical volume is specified from the host 4, and is identified inside the storage system 1 as well. Accordingly, hereinafter a logical volume specified from the host 4 may be called a "LU" (Logical Unit), and a logical volume identified inside the storage system 1 may be called an "LDEV" (Logical Device). In the example of this diagram, three LDEV are created from one VDEV, but the number of LDEV can be either more or less than this (for example, there can be one LDEV for one VDEV).

A VDEV is configured from a plurality of rows of stripes. The respective rows of stripes are configured by four stripes corresponding to the four HDD 16-1, 16-2, 16-3 and 16-4. The HDD 16 storage area is partitioned into a plurality of prescribed size sub-storage areas (that is, stripes). A data element write or parity write is carried out having a stripe as one unit.

Figure 31:
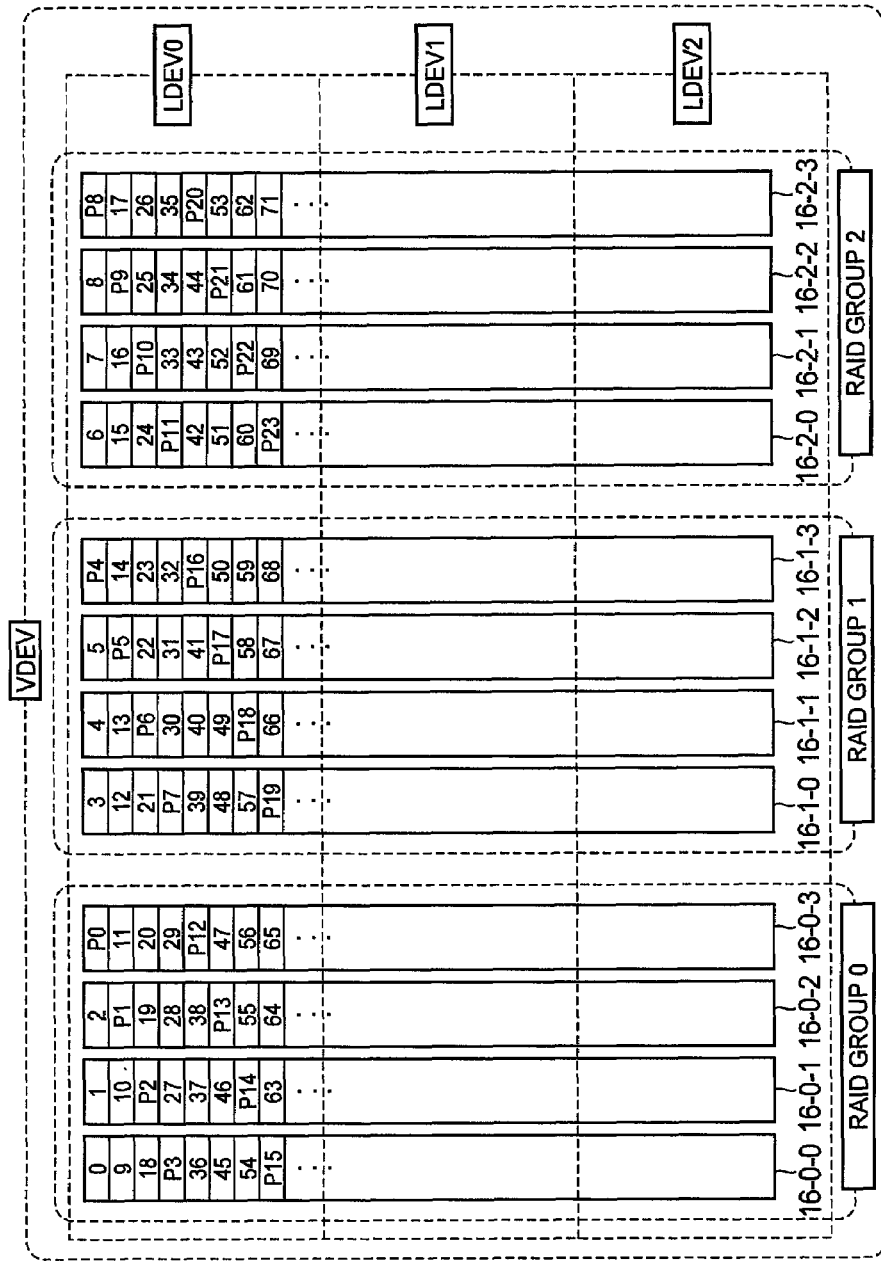
FIG. 31 is a diagram showing another example of the relationships between the plurality of HDD and the logical volumes configuring the RAID group.

FIG. 31 is a diagram showing another example illustrating the relationships between the plurality of HDD 16 and the logical volumes. In the example explained using FIG. 3, one VDEV was corresponded to one RAID group, but in this example, one VDEV is corresponded to a plurality of RAID groups.

In this figure, one RAID group 0 is configured from a plurality (for example, four) HDD 16-0-0, 16-0-1, 16-0-2, and 16-0-3. The same holds true for RAID group 1 and RAID group 2. In this example, one VDEV is corresponded to a plurality (for example, three) RAID groups. Similar to the example of FIG. 3, the respective parts of the VDEV obtained by partitioning this VDEV are LDEV. According to the example shown in FIG. 31, the respective LDEV span a plurality (for example, three) RAID groups.

In this figure, the symbols inside the HDD 16 (0, 1, 2, . . . and P0, P1, P2, . . . ) are identifiers for uniquely identifying data elements and parities inside the VDEV. These consecutive data elements are stored in one LDEV. Unlike the example of FIG. 3, since one VDEV is configured from a plurality of RAID groups in this example, logically consecutive data elements can be arranged across a plurality of RAID groups. Arranging these data elements like this makes it possible to enhance access performance by distributing access to the one LDEV among the plurality of RAID groups.

Various tables comprising control information stored in the cache/control memory 14 will be explained hereinbelow by referring to FIGS. 4 through 9.

FIG. 4 is a diagram showing an example of the configuration of a RAID configuration table 400.

The RAID configuration table 400 is for managing the RAID configurations of the respective VDEV. More specifically, for example, this table 400 has a column 401 in which VDEV identification numbers are written, a column 402 in which HDD identification numbers are written, a column 403 in which RAID levels are written, and a column 404 in which stripe sizes (stripe storage capacities) are written. That is, in this table 400, a VDEV identification number, a plurality of HDD identification numbers configuring the relevant VDEV, the RAID level of the relevant VDEV, and a stripe size are written for each VDEV.

FIG. 5 is a diagram showing an example of the configuration of a VDEV configuration table 500.

The VDEV configuration table 500 is for managing the configuration of a VDEV. More specifically, for example, this table 500 has a column 501 in which VDEV identification numbers are written, a column 502 in which LDEV identification numbers are written, a column 503 in which the LDEV start address of a range of logical addresses in the VDEV are written, and a column 504 in which the LDEV end address of a range of logical addresses in the VDEV are written. That is, the LDEV identification number that exists in a specific range of logical addresses of a specific VDEV is written in this table 500.

FIG. 6 is a diagram showing an example of the configuration of an LU configuration table 600.

The LU configuration table 600 manages the respective LU configurations. More specifically, for example, this table 600 has a column 601 in which LDEV identification numbers are written, a column 602 in which WWN (World Wide Names) are written, a column 603 in which LUN (Logical Unit Numbers) are written, and a column 604 in which LDEV storage capacities are written. That is, in this table 600, an LDEV identification number, a WWN and LUN corresponding to the relevant LDEV, and the storage capacity of this LDEV are written for each LU.

In this embodiment, a logical volume specified from the host 4 is referred to as "LU" as described hereinabove, and more specifically, for example, a logical volume correspondent to a WWN and LUN in the Fibre Channel protocol is referred to as LU. Furthermore, for example, the WWN and LUN columns 602 and 603 need not be provided for a mainframe.

FIG. 7 is a diagram showing an example of the configuration of a Disk Group configuration table 700.

The Disk Group configuration table 700 is used when the HDD specified in column 402 of the RAID configuration table 400 are divided up and managed in a plurality of groups. More specifically, for example, this table has a column 701 in which VDEV identification numbers are written, a column 702 in which numbers uniquely identifying the groups inside the VDEV are written, a column 703 in which the identification numbers of the HDD configuring the respective groups are written, and a column 704 in which the RAID levels of relevant groups are written. That is, in this table 700, which VDEV group is configured from which HDD, and what RAID level each relevant group has are written.

In this embodiment, columns that show RAID levels exist in two tables, the RAID configuration table 400 and the Disk Group configuration table 700. As such, it is possible to express a special RAID level that connotes a plurality of other RAID levels inside a certain RAID group. Furthermore, a specific example of the data configured in the Disk Group configuration table 700 will be described hereinbelow.

Figure 8:
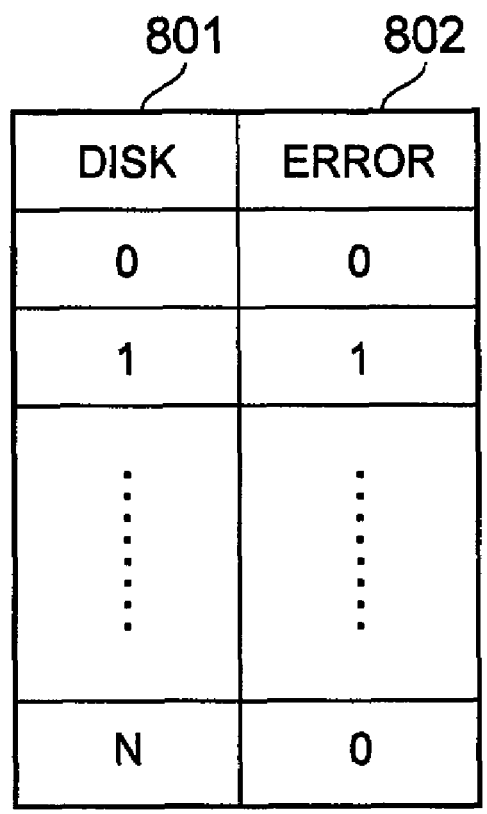
FIG. 8 is a diagram showing an example of the configuration of a HDD failure-check table.

FIG. 8 is a diagram showing an example of the configuration of an HDD failure-check table 800.

The HDD failure-check table 800 is for checking an HDD 16 in which a failure has occurred. More specifically, for example, this table 800 has a column 801 in which HDD identification numbers are written, and a column 802 in which a flag for identifying whether or not a failure has occurred is written. That is, an HDD 16 in which a failure has occurred is written in this table 800.

Figure 9:
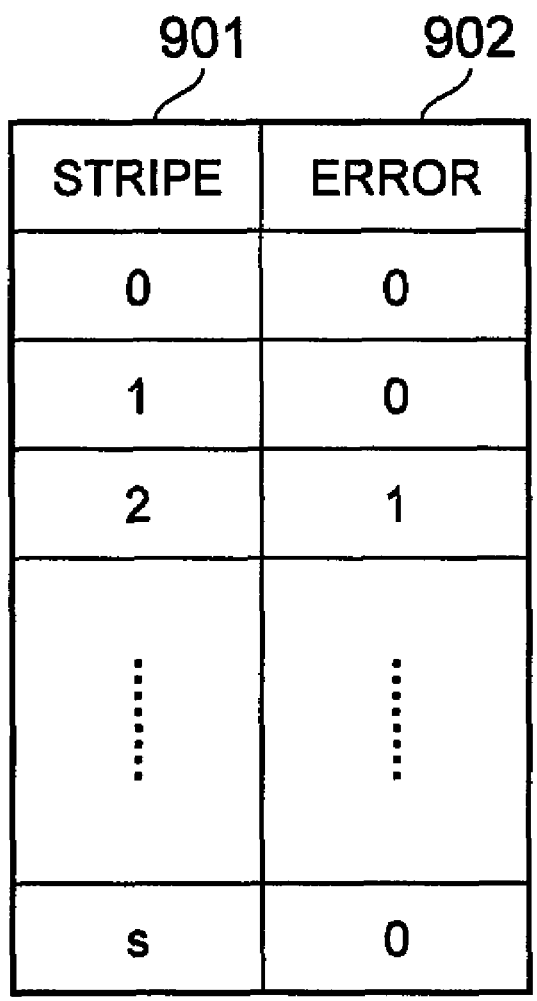
FIG. 9 is a diagram showing an example of the configuration of a stripe failure-check table.

FIG. 9 is a diagram showing an example of the constitution of a stripe failure-check table 900.

The stripe failure-check table 900 is for checking a stripe (for convenience of explanation, a "failed stripe"), of the stripes comprising the failed HDD 16, from which a data element cannot be read out. This table 900 is prepared for all of the HDD 16 configuring a RAID group. More specifically, for example, this table 900 has a column 901 in which stripe identification numbers are written, and a column 902 in which flags for identifying whether or not a failure has occurred are written. That is, a stripe, which is a failed stripe, is written in this table 800. Furthermore, in this figure, the identification number assigned for uniquely specifying the stripe comprised in this HDD 16 is written in column 901 for each HDD 16, but like the identification numbers assigned in FIG. 3, the identification numbers assigned for uniquely specifying the stripes comprised inside a RAID group can also be written in column 901.

The preceding is an explanation of the various tables.

The storage system 1 related to this embodiment employs striping, which distributively writes data to a plurality of HDD 16 configuring a RAID group the same as RAID 5 or RAID 6, but a method that differs from RAID 5 and RAID 6 is used to create and write parity. Hereinbelow, the layout of data elements and parities, and a restore carried out based on this layout will be called a "data protection mode". The storage system 1 related to this embodiment can employ four types of data protection modes.

Any of these four types of data protection modes can restore a data set which has suffered a double-failure. More specifically, for example, an HDD from which data elements cannot be read out from any stripe (hereinafter, a completely failed HDD), and an HDD having both a stripe from which a data element can be read out and a stripe from which a data element cannot be read out (hereinafter, partially failed HDD) exist in a single RAID group, and therefore, when there exists double-failure data, which is a data set (a set comprising a data unit and a redundancy code) comprising two unreadable data elements, it is possible to restore these two data elements. Furthermore, in the second and third data protection modes, even when there are two completely failed HDD in a single horizontal RAID group (will be explained hereinbelow), the data inside these completely failed HDD can be restored. Further, in the fourth data protection mode, even when there are two completely failed HDD in a single partial RAID group (will be explained hereinbelow) the data inside these completely failed HDD can be restored.

In the first and fourth data protection modes, a compressed parity, which is smaller in size than the total size of a plurality of parities corresponding to a plurality of data units on which the compressed parity is based, is created and stored, thereby consuming less storage capacity than in RAID 6, which always creates two parities for one data unit. In the second and third data protection modes, parities, which are based on data elements inside data units of a plurality (a sufficiently large number is required, and this number will be explained hereinbelow) of horizontal RAID groups (will be explained hereinbelow), are created and stored, thereby consuming less storage capacity than in RAID 6, which always creates two parities for one data unit.

These four types of data protection modes will be explained in detail hereinbelow. Further, the writing of data and parity to the HDD 16 is carried out by the disk I/O processor 202, which is executed by the CPU 131 of the DKA 13. Further, for both the first and fourth data protection modes, a stripe in which a compressed parity is stored will be called a "specified stripe" for convenience sake. Conversely, a stripe, which constitutes the write destination of data elements and parity, will be called a "normal stripe". The abovementioned "failed stripe" is a normal stripe from which it is impossible to read out a data element or parity.

Figure 10:
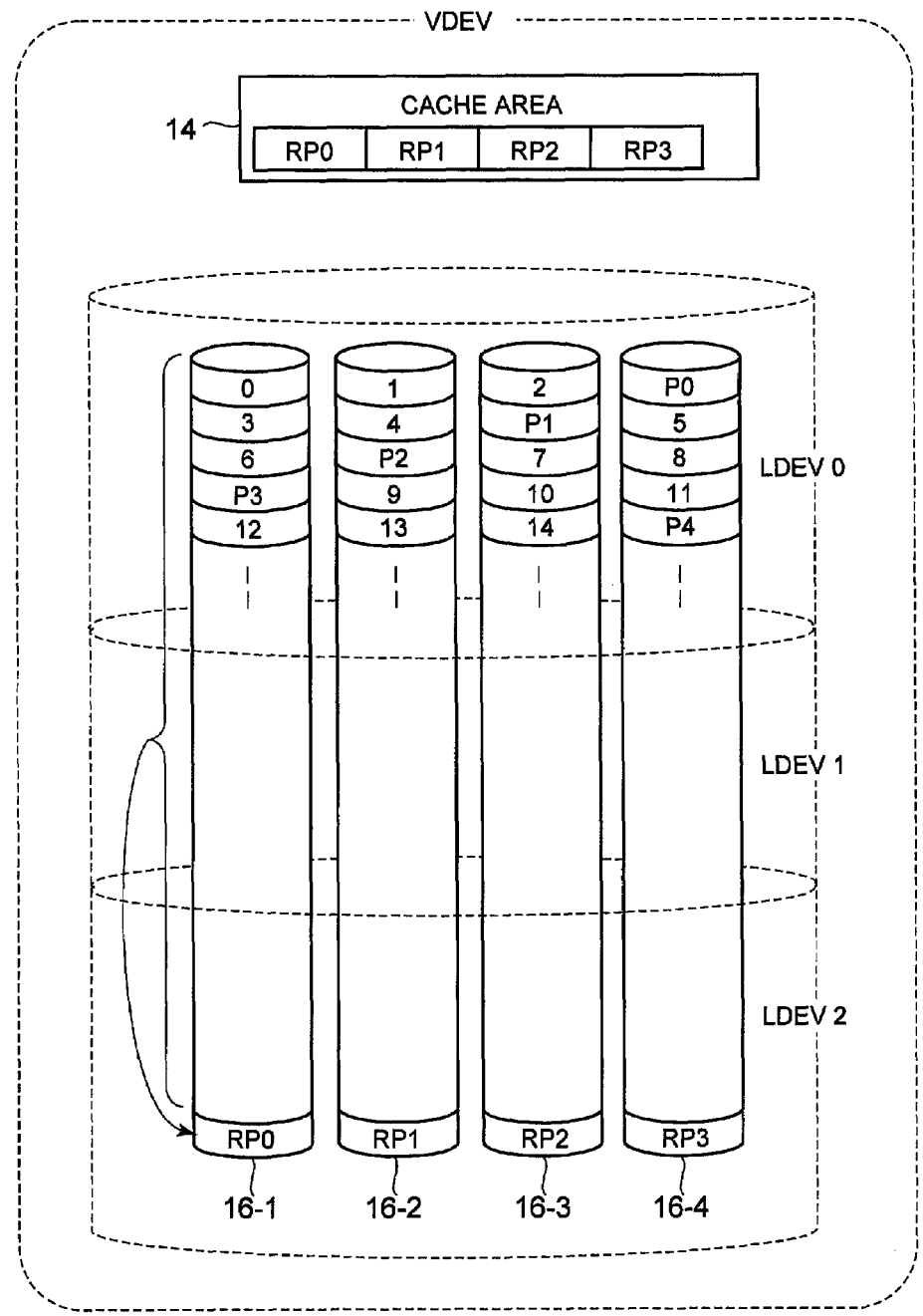
FIG. 10 is a schematic diagram of a write in a first data protection mode.

FIG. 10 is a schematic diagram of a write in the first data protection mode.

First, the manner in which data elements and parity are arranged in HDD 16 in the first data protection mode will be explained.

In the first data protection mode, a compressed parity created from the data elements and P parities of all the stripes comprised in an HDD 16 are written for each HDD 16. This compressed parity is created by computing the exclusive OR of the data elements and P parities stored in all the normal stripes corresponding to the HDD 16 (or, by applying a prescribed coefficient to these data elements and P parities, and subsequently computing the exclusive OR therefor). The locations of the stripes in which the compressed parities are written (that is, the specified stripes), for example, can be at the tail ends of the respective HDD 16 as shown in the figure. In other words, the row of stripes at the tail end of the VDEV is a row of specified stripes configured by four specified stripes. Furthermore, a specified stripe can be a stripe other than that at the tail end of an HDD 16.

In this embodiment, four compressed parities respectively corresponding to the four HDD 16-1 through 16-4 reside in the cache area of the cache/control memory 14, and are written from the cache area to the specified stripes in a timely manner. For example, when a compressed parity is updated by a data write upon receiving of a write request, this updated compressed parity can be written to both an HDD 16 and the cache area upon being updated, and can also be written solely to the cache area without being written to an HDD 16. In the latter case, at a subsequent prescribed timing, at least one of the four compressed parities written to the cache area (for example, either all of the compressed parities or only the updated compressed parity) is copied to a specified stripe in the HDD 16. By so doing, the time required for a write is shortened since the HDD 16 stripe in which the compressed parity is written is not accessed each time a data write is carried out in response to receiving a write request. This will be explained using HDD 16-1 as an example. Compressed parity "RP0", which corresponds to HDD 16-1, is created based on the data elements and P parity (for example, data elements "0", "3", and "6" and P parity "P3") written in the normal stripes of HDD 16-1, and this is written to the cache area and the HDD 16-1. The creation and writing of the compressed parities "RP1" through "RP3" in the other HDD 16-2 through 16-4 are the same as for the compressed parity "RP0" in HDD 16-1.

With the exception of a compressed parity being written, the first data protection mode is substantially the same as the data protection mode of RAID 5. Therefore, when there are a total of four HDD 16 configuring the RAID group as in this figure, three data elements (for example, data elements "0", "1" and "2"), which configure a data unit, are written to three of these HDD 16, and one P parity (for example, P parity "P0"), which is based on this data unit, is written to the one remaining HDD 16. That is, if it is supposed that the number of HDD 16 configuring the RAID group is N (N being an integer of no less than 3), one data element is written to each of (N−1) HDD 16, that is, a total of (N−1) data elements is written to (N−1) HDD 16, and a single P parity, which is created on the basis of these (N−1) data elements, is written to the one remaining HDD 16. The P parity is distributively written to the four HDD 16-1 through 16-4. In other words, the HDD 16, which constitutes the write destination of the P parity, shifts for each data unit.

Next, the updating of the data unit and P parity will be explained in accordance with the first data protection mode. Furthermore, in the following explanation, a pre-update data element will be referred to as an "old data element", and a post-update data element will be referred to as a "new data element" (the same will hold true for a P parity and a compressed parity).

For example, it is supposed that data element "1" of the three data elements configuring the first data unit is updated. In this case, P parity "P0" and compressed parity "RP1" must be updated. This is because both the P parity "P0" and the compressed parity "RP1" were created based on the old data element "1", and if data element "1" is updated, the values of P parity "P0" and compressed parity "RP1" will change.

Accordingly, disk I/O processor 202 first reads out the old data element "1", which is required to create P parity "P0", and the old P parity "P0" from HDD 16-2 and 16-4. Then, the disk I/O processor 202 can create a new P parity "P0" based on the new data element "1", old data element "1" and old P parity "P0" (or, can create a new P parity "P0" from data elements "0" and "2", which have not been updated, and the new data element "1"). Further, the disk I/O processor 202 also carries out the creation of a new compressed parity "RP1" using the same kind of method as that for the creation of the new P parity "P0". That is, the disk I/O processor 202 can create a new compressed parity "RP1" based on the old compressed parity "RP1" corresponding to HDD 16-2, the old data element "1" and the new data element "1" (or, the disk I/O processor 202 can read out from HDD 16-2 a data element other than the old data element "1" and the P parity, and create a new compressed parity "RP1" based on the read-out data element and P parity, and the new data element "1"). Thereafter, the disk I/O processor 202 writes the new data element "1" to the normal stripe in which the old data element "1" is stored, and writes the new P parity "P0" to the normal stripe in which the old P parity "P0" is stored. Further, the disk I/O processor 202 writes the new compressed parity "RP1" to the cache area, and at a prescribed timing, writes the new compressed parity "RP1" in the cache area to the specified stripe in which the old compressed parity "RP1" is stored.

Figure 11:
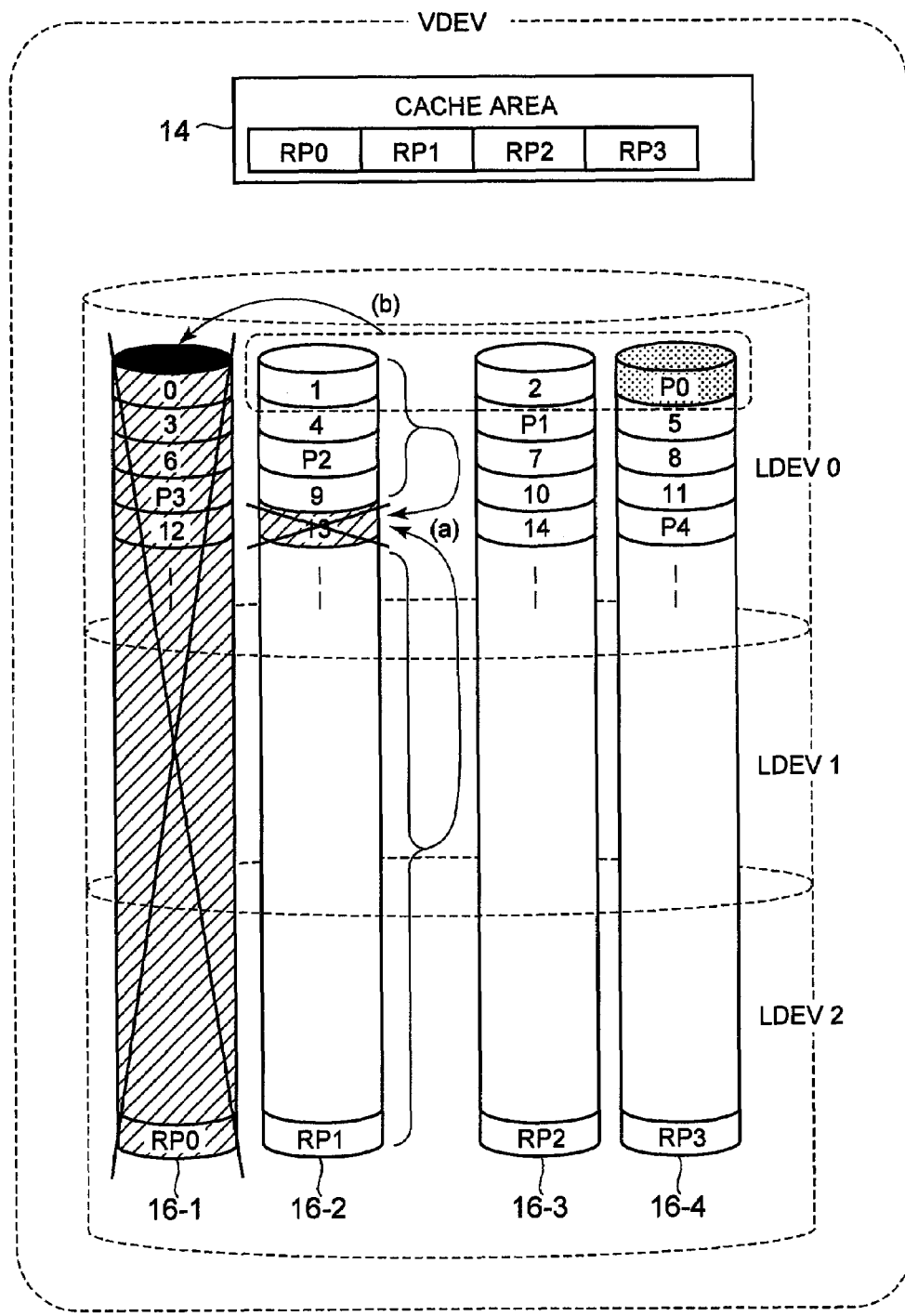
FIG. 11 is a schematic diagram of a restore in the first data protection mode.

FIG. 11 is a schematic diagram of a restore in the first data protection mode. Furthermore, in the following explanation, a data unit in which there is only one data element that cannot be read out, and a data unit, which is not double-failure data (as explained hereinabove, a data unit comprising two unreadable data elements) will be referred to as "single-failure data".

In this figure, HDD 16-1 is a completely failed HDD, and HDD 16-2 is a partially failed HDD. In this partially failed HDD 16-2, the normal stripe, in which data element "13" is stored, is the failed stripe.

The restore procedure for a data element, which constitutes single-failure data, is the same as normal RAID 5. That is, the data element constituting the single-failure data, which is stored in the failed stripe of completely failed HDD 16-1, is restored using all of the other data elements constituting this single-failure data, and the P parity corresponding to this single-failure data (in other words, using the data elements and P parity, which are in all the other stripes in the row of stripes comprising this failed stripe).

Conversely, two unreadable data elements, which constitute double-failure data, cannot be restored using the same procedure as that of a normal RAID 5. This is because there is only one parity corresponding to the double-failure data. In this example, the two data elements "12" and "13" cannot be restored using only the remaining data element "14" and the P parity "P4".

Accordingly, the restoration of these two data elements is carried out using the compressed parity as follows.

First, data element "13", which is stored in the failed stripe of the partially failed HDD 16-2, is restored. More specifically, data element "13" is restored in accordance with the exclusive OR of the data elements and P parity stored in all the normal stripes other than the failed stripe in the partially failed HDD 16-2, and the compressed parity "RP1" corresponding to this partially failed HDD 16-2 (the compressed parity "RP1" stored in either the cache area or the specified stripe) ((a) of this figure).

Next, data element "12", which is stored in the failed stripe of the completely failed HDD 16-1, is restored based on this data element "13", and the other data element "14" in the data unit comprising this data element "13" and the P parity "P4" corresponding to this data unit. Consequently, both data elements "12" and "13" in the double-failure data are restored.

Lastly, the compressed parity, which is stored in the specified stripe of the completely failed HDD 16-1, is restored. More specifically, the compressed parity "RP1" is restored on the basis of the restored data element "12" of the double-failure data, which is stored in the failed stripe of the completely failed HDD 16-1, and the other data elements and P parity, which were restored the same as in RAID 5.

The preceding is an explanation for the first data protection mode.

Furthermore, in the above-described processing, when a P parity instead of a data element is stored in the failed stripe of the partially failed HDD, the P parity stored in this failed stripe is restored based on the compressed parity corresponding to this partially failed HDD, and the data elements and P parity stored in the normal stripes other than the failed stripe of this partially failed HDD. Then, using this restored P parity, the data element stored in the failed stripe of the completely failed HDD is restored using the same method as that of a normal RAID 5.

Further, according to the above explanation, in the first data protection mode, all HDD other than the completely failed HDD can be partially failed HDD. Moreover, to restore a data element stored in a partially failed HDD requires that only one failed stripe exist in the partially failed HDD.

Further, in the first data protection mode, the total size of one data unit and the P parity corresponding thereto is the same size as one row of stripes. More specifically, one data unit and the P parity corresponding thereto fits in one row of stripes, and do not span a plurality of rows of stripes. However, the present invention is not limited to this, and, for example, the total size of one data unit and the P parity corresponding thereto can be smaller than the size of one row of stripes.

Figure 12:
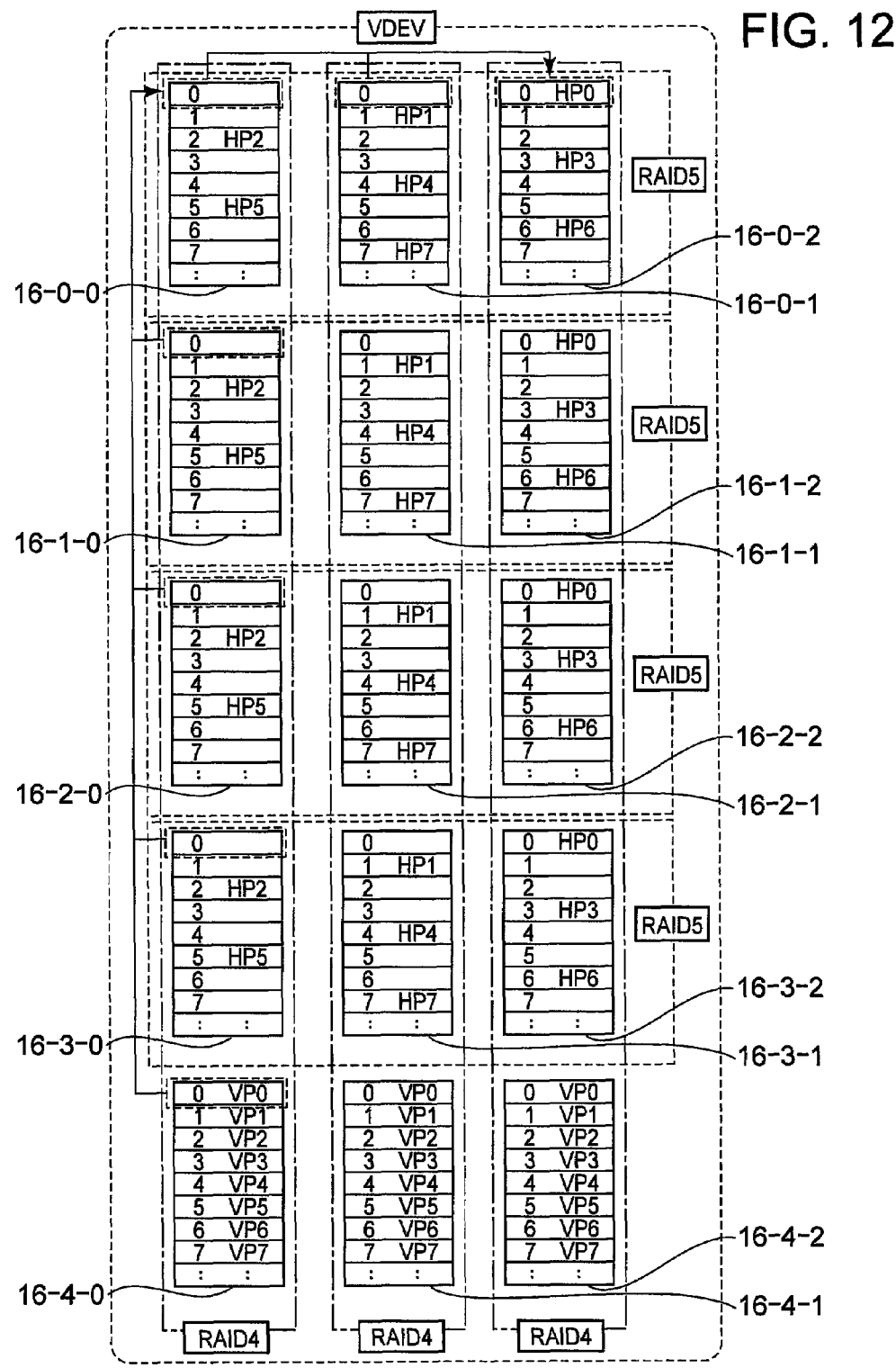
FIG. 12 is a schematic diagram of a write in a second data protection mode.

FIG. 12 is a schematic diagram of a write in the second data protection mode.

The RAID configuration of the second data protection mode will be explained first.

In the second data protection mode, as shown in FIG. 12, the HDD 16 are logically arranged two-dimensionally, and respectively grouped in the horizontal and vertical directions to configure RAID groups. In this embodiment, a horizontal-direction RAID group will be called a "horizontal RAID group", a vertical-direction RAID group will be called a "vertical RAID group", and the RAID group configured from all the horizontal RAID groups and all the vertical RAID groups will be called the "total RAID group". Further, a parity created inside a horizontal RAID group will be called a "horizontal parity" and a parity created inside a vertical RAID group will be called a "vertical parity".

According to FIG. 12, the respective HDD 16 configuring the VDEV are members of a certain one horizontal RAID group, and are also members of a certain one vertical RAID group.

FIG. 12, for example, configures RAID 5 in connection with the horizontal RAID groups, and configures RAID 4 in connection with the vertical RAID groups (that is, the horizontal RAID groups correspond to RAID 5, and the vertical RAID groups correspond to RAID 4). Here the RAID level of RAID 4 is similar to RAID 5, but differs from RAID 5 in that a redundancy code is allocated to one prescribed HDD instead of being distributively allocated to a plurality of HDD like RAID 5. The RAID configuration will be explained in more detail. In the example of FIG. 12, for example, RAID 5-based horizontal RAID groups i are configured from HDD 16-*i*-0, 16-*i*-1, 16-*i*-2 (i=0, 1, 2, 3), and RAID 4-based vertical RAID groups j are configured from HDD 16-0-*j*, 16-1-*j*, 16-2-*j*, 16-3-*j*, 16-4-*j* (j=0, 1, 2).

Next, the manner in which the data elements, horizontal parity and vertical parity are arranged in the HDD 16 in the second data protection mode will be explained.

The horizontal parity inside a RAID 5 horizontal RAID group of RAID 5 is distributively allocated to a plurality of HDD 16 inside this horizontal RAID group. Conversely, the vertical parity inside a RAID 4 vertical RAID group j is allocated to one prescribed HDD 16 (HDD 16-4-*j* in the example of FIG. 12.).

In this figure, the cells configuring the HDD 16 represent the stripes. An identifier (0, 1, 2, . . . ) for uniquely identifying the stripes inside the respective HDD 16 is provided in the left half of a cell. An identifier (HP0, HP1, HP2, . . . ) for uniquely identifying a horizontal parity inside a horizontal RAID group corresponding to a relevant cell, or an identifier (VP0, VP1, VP2, . . . ) for uniquely identifying a vertical parity inside a vertical RAID group corresponding to a relevant cell is provided in the right half of a cell. A cell in which the right half of the cell is blank shows a cell in which a data element is stored.

In the example of this figure, for example, the horizontal parity (horizontal parity HP0) inside the horizontal RAID group 0 corresponding to stripe 0 inside HDD 16-0-0 and 16-0-1 is stored in the stripe 0 inside HDD 16-0-2. Further, the vertical parity (vertical parity VP0) inside the vertical RAID group 0 corresponding to stripe 0 of HDD 16-0-0, 16-1-0, 16-2-0 and 16-3-0 is stored in stripe 0 inside HDD 16-4-0. Hereinafter, a group of a plurality of stripes in the same location (having the same identifier), from among the stripes inside a plurality of HDD 16 inside a certain vertical RAID group, will be called a "row of vertical stripes". By contrast, a group of horizontal-direction stripes inside a horizontal RAID group will be called a "row of horizontal stripes". A plurality of data elements and a vertical parity, which is created from this plurality of data elements, are stored in one row of vertical stripes.

Furthermore, horizontal parities are stored in stripe 2 of HDD 16-0-0, 16-1-0, 16-2-0 and 16-3-0, but vertical parity VP2, which could be created from these horizontal parities, is not created (but could be created). This is because each time the value of a data element is updated, the horizontal parity is updated, and if a vertical parity were to be created from horizontal parities corresponding to horizontal parities, the vertical parity corresponding to the horizontal parities would have to be updated in line with updating the value of the data element, resulting in numerous accesses to the HDD 16. Further, double failure data can still be restored even if a vertical parity corresponding to horizontal parities is not created.

Next, data configured in the Disk Group configuration table 700 in the second data protection mode will be explained in detail.

In FIG. 7, Disks 16, 17 and 18 of Disk Group 0 of VDEV 2 respectively correspond to HDD 16-0-0, 16-0-1 and 16-0-2 of FIG. 12. Since these Disks configure a horizontal RAID group, which has a RAID level of RAID 5, "RAID 5" is configured in FIG. 7 in RAID level column 704 corresponding to Disk Group 0 of VDEV 2.

Further, in FIG. 7, Disks 16, 19, 22, 25 and 28 of VDEV 2 Disk Group 5 correspond to HDD 16-0-0, 16-1-0, 16-2-0, 16-3-0 and 16-4-0 of FIG. 12. Because these Disks configure a vertical RAID group the RAID level of which is RAID 4, "RAID 4" is configured in the RAID level column 704 corresponding to VDEV 2 Disk Group 5 in FIG. 7.

Next, the storage capacity consumed in the second data protection mode will be explained.

First, the "data capacity ratio" of a certain RAID group will be defined as follows. That is, "RAID group data capacity ratio"="total amount of data other than redundancy codes comprised in RAID group"/"total capacity of all HDD configuring RAID group". This means that the larger the data capacity ratio, the more it is possible to conserve the amount of HDD storage capacity consumed.

Figure 32A:
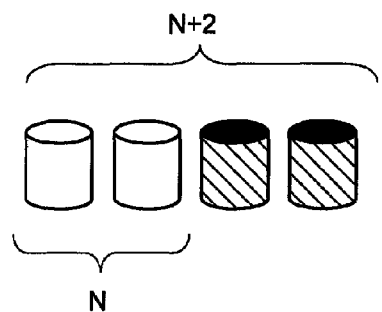
FIG. 32A is a schematic diagram related to the amount of data comprising the RAID group in RAID 6.

Here, for example, A="total capacity of all HDD configuring RAID group", B="total amount of data other than redundancy codes comprised in RAID group", C="RAID group data capacity ratio"=B/A, and, in addition, when the storage capacity of all the HDD 16 is the same, A0 and B0 are the number of HDD when the C of RAID 6 is C0, achieving the relationships A0=N+2, B0=N, and C0=B0/A0=N/(N+2) (Referring to FIG. 32A, in FIG. 32A, N is the number of HDD in which data elements are stored, and the 2 of N+2 is the number of HDD in which parities are stored. Furthermore, FIG. 32 is convenient for use in computing the capacities of A and B, and redundancy codes are actually distributively stored in a plurality of HDD.).

Figure 32B:
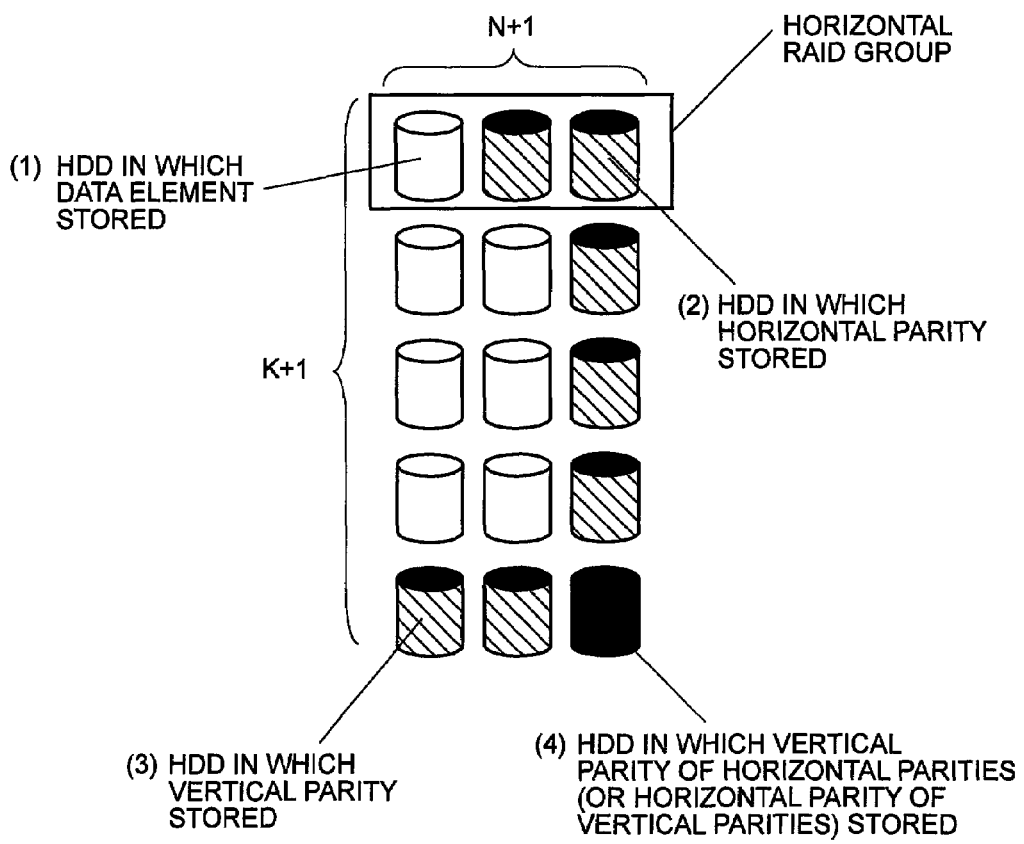
FIG. 32B shows the type of HDD in the case of a RAID group for which a horizontal RAID group and a vertical RAID group both correspond to RAID 4.

As a simple example of this, think of both the horizontal RAID groups and the vertical RAID groups as RAID groups that correspond to RAID 4 Referring to FIG. 32B). In this case, the HDD, for example, can be classified into four types of HDD: (1) HDD in which are stored data elements; (2) HDD in which are stored horizontal parities; (3) HDD in which are stored vertical parities; and (4) HDD in which are stored the vertical parity of horizontal parities (or the horizontal parity of vertical parities). It is possible to restore a data set when a double failure occurs inside a horizontal RAID group even without the HDD of (4). Therefore, a determination must be made as to whether or not to include the HDD of (4) in the "total capacity of all HDD configuring the RAID group".

In a situation (Case 1) in which the HDD of (4) is included in the "total capacity of all the HDD configuring the RAID group", the following relational expressions are achieved:

$$A1=(N+1)(K+1)$$

$$B1=N\cdot K$$

$$C1=B1/A1=N\cdot K/((N+1)(K+1))$$

A1, B1, C1, respectively, are A, B, C in Case 1. In Case 1, the data capacity efficiency is allowed to be higher than RAID 6, C1>C0, that is,
If the expression below is satisfied.

$$N\cdot K/((N+1)(K+1))>N/(N+2) \quad (W)$$

If (W) is modified, it becomes $$K>N+1 \quad (W)'$$

Conversely, in a situation (Case 2) in which the HDD of (4) is not included in the "total capacity of all the HDD configuring RAID group", the following relational expressions are achieved:

$$A2=(N+1)(K+1)-1$$

$$B2=N\cdot K$$

$$C2=B1/A1=N\cdot K/((N+1)(K+1)-1)$$

A2, B2, C2 are respectively A, B, C in Case 2. In Case 2, the data capacity efficiency is allowed to be higher than RAID 6, C1>C0, that is,
if the expression below is satisfied.

$$N\cdot K/((N+1)(K+1)-1)>N/(N+2) \quad (w)$$

If (w) is modified, it becomes $$K>N \quad (w)'$$

In Case 2, configuration-wise it is considered impossible for both the horizontal RAID groups and the vertical RAID groups not to correspond to RAID 4. Therefore, either when one of the horizontal RAID groups or vertical RAID groups is RAID 5 and the other is RAID 4, or when both the horizontal RAID groups and vertical RAID groups are RAID 5, the same thinking as in Case 1 should apply.

Therefore, in the second data protection mode (and the third data protection mode described hereinbelow), it is probably better to use the Case 1 concept of data capacity efficiency.

Next, the updating of a data unit, horizontal parity and vertical parity in accordance with the second data protection mode will be explained. Furthermore, in the following explanation, a pre-update data element will be referred to as an "old data element" and a post-update data element will be referred to as a "new data element" (the same will hold true for a horizontal parity and a vertical parity as well).

For example, take a case in which the stripe 0 inside HDD 16-0-0 is to be updated. For the sake of explanation, the data inside stripe 0 of HDD 16-0-0, 16-0-2 and 16-4-0, respectively, will be called data element "0", horizontal parity "HP0" and vertical parity "VP0". When updating data element "0", it is necessary to update horizontal parity "HP0" and vertical parity "VP0". This is because the values of the horizontal parity "HP0" and the vertical parity "VP0" are each dependent on data element "0", and if the value of data element "0" is updated, the values of the horizontal parity "HP0" and the vertical parity "VP0" will change.

Accordingly, the disk I/O processor 202 first reads from HDD 16-0-0 and 16-0-2 the old data element "0" and the old horizontal parity "HP0", which are required to create a new horizontal parity "HP0". Then the disk I/O processor 202 can create the new horizontal parity "HP0" on the basis of the new data element "0", the old data element "0" and the old horizontal parity "HP0" (or, can create a new horizontal parity "HP0" from the data element inside stripe 0 of HDD 16-0-1, which is the data element that has not been updated, and the new data element "0"). Further, the disk I/O processor 202 also carries out the creation of a new vertical parity "VP0" using the same method as that for creating the new horizontal parity "HP0". That is, the disk I/O processor 202 can create the new vertical parity "VP0" on the basis of the old vertical parity "VP0", the old data element "0" and the new data element "0" (or, the disk I/O processor 202 can read out data from stripes 0 of HDD 16-1-0, 16-2-0 and 16-3-0, and create a new vertical parity "VP0" on the basis of the read-out data and the new data element "0"). Thereafter, the disk I/O processor 202 writes the new data element "0" to the stripe in which the old data element "0" is being stored, writes the new horizontal parity "HP0" to the stripe in which the old horizontal parity "HP0" is being stored, and writes the new vertical parity "VP0" to the stripe in which the old vertical parity "VP0" is being stored.

In the second data protection mode, since a vertical parity is updated no matter what data element is updated, read/write access to the HDD 16 storing the vertical parity occurs. For this reason, there are times when the HDD 16 storing the vertical parity becomes an I/O performance bottleneck for the storage system 1. Accordingly, in order to do away with this performance bottleneck, the data unit update and the vertical parity update can be carried out asynchronously. More specifically, first, when updating the data unit, a bit corresponding to the relevant data unit inside the cache/control memory 14-stored table that stores whether or not a data unit has been updated, is set to ON. Vertical parity updating is not carried out at this time. Next, asynchronously to the updating of the data unit (for example, at fixed times, or when the I/O load on the storage system 1 is low), the data unit required for vertical parity updating (a data unit for which the bit in the above-mentioned table is ON) is selected by referring to the above-mentioned table, and a new vertical parity is created based on the data elements of the row of vertical stripes corresponding to the vertical parity that corresponds to this data unit, thereby updating the vertical parity.

Next, the mapping of a logical address and a physical address in the second data protection mode will be explained. In the second data protection mode, for example, it is possible to map a logical address and a physical address such that consecutive logical addresses extend across a plurality of horizontal RAID groups. In other words, for example, two or more logical addresses, which respectively correspond to two or more stripes configuring a Pth row of stripes inside an Xth horizontal RAID group, and two or more logical addresses, which respectively correspond to two or more stripes configuring a Pth row of stripes inside an X+1st horizontal RAID group are consecutive (where X and P are integers greater than 0).

In the example of FIG. 12, for example, the logical addresses and physical addresses are mapped such that stripes 0 of HDD 16-0-0, 16-0-1, 16-1-0, 16-1-1, 16-2-0, 16-2-1, 16-3-0 and 16-3-1 constitute consecutive logical addresses. When writing lengthy data having consecutive logical addresses, carrying out mapping like this increases the probability of being able to create a vertical parity by determining the exclusive OR of data elements inside this lengthy data. In the example of FIG. 12 above, it is possible to create a vertical parity VP0 inside HDD 16-4-0 by computing the exclusive OR of stripes 0 of HDD 16-0-0, 16-1-0, 16-2-0 and 16-3-0. Creating a vertical parity like this does away with the need to read out the old vertical parity from the HDD 16 when writing lengthy data, thereby making it possible to enhance write efficiency.

Figure 13:
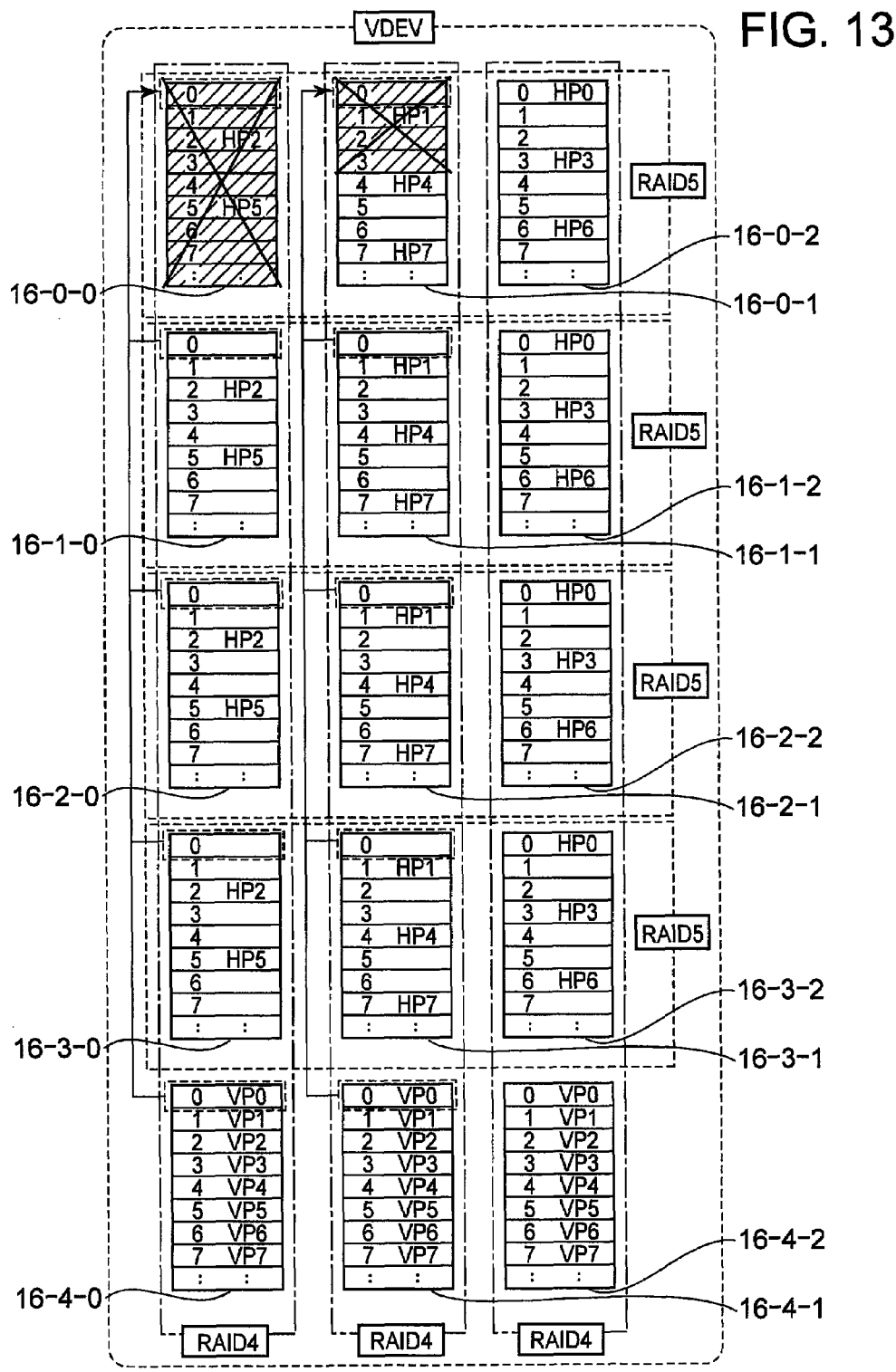
FIG. 13 is a schematic diagram of a restore in the second data protection mode.

FIG. 13 is a schematic diagram of a restore in the second data protection mode. Even in the second data protection mode, it is possible to restore one data element that cannot be read out from single-failure data, and two data elements that cannot be read out from double-failure data.

In FIG. 13, HDD 16-0-0 is a completely failed HDD, and HDD 16-0-1 is a partially failed HDD. In this partially failed HDD 16-0-1, stripes 0 through 3 are failed stripes.

The procedure for restoring a data element configuring single-failure data is the same as that in a normal RAID 5. That is, the data element configuring the single-failure, which is stored in the failed stripe of completely failed HDD 16-0-0, is restored using all the other data elements configuring this single-failure data, and the horizontal parity corresponding to this single-failure data (in other words, using the data elements and horizontal parities of all the other stripes in the row of stripes comprising this failed stripe).

Conversely, two unreadable data elements configuring double-failure data cannot be restored with the same procedure as that of a normal RAID 5.

Accordingly, the restore of these two data elements is carried out as follows using horizontal parity. That is, these two data elements are restored via the same method as that of RAID 4 using the data elements and vertical parities that are in all the other stripes in the (previously defined) row of vertical stripes comprising the failed stripe of the unreadable data element. In FIG. 13, for example, the data element corresponding to stripe 0 inside HDD 16-0-0 is restored from the data elements and vertical parities corresponding to stripes 0 of HDD 16-1-0, 16-2-0, 16-3-0, and 16-4-0. By so doing, it is possible to restore both of the two unreadable data elements configuring the double-failure data using the vertical parity. Furthermore, after using vertical parity to restore one of the two data elements configuring the double-failure data, the relevant double-failure date becomes single-failure data, thereby making it possible for the subsequent restore procedure to be the same as the single-failure data restore procedure.

Single-failure data and double-failure data can be restored as described hereinabove.

Furthermore, in the above explanation, it is supposed that HDD 16-0-1 is the partially failed HDD, but the restore can be carried out the same way even when HDD 16-0-1 is the completely failed HDD. Further, in the above explanation, it is supposed that HDD 16-0-0 is the completely failed HDD, but the restore can be carried out the same way even when HDD 16-0-0 is the partially failed HDD.

Further, in the above explanation, a situation in which an HDD 16 configuring a horizontal RAID group constitutes completely failed HDD was explained, but when the HDD, which is storing the vertical parities of a vertical RAID group (for example, HDD 16-4-0 of FIG. 13) is a completely failed HDD, a vertical parity is created in accordance with the parity creation method of RAID 4 from the other HDD of the relevant vertical RAID group, thereby restoring the completely failed HDD.

The preceding is an explanation of second data protection mode.

Figure 14:
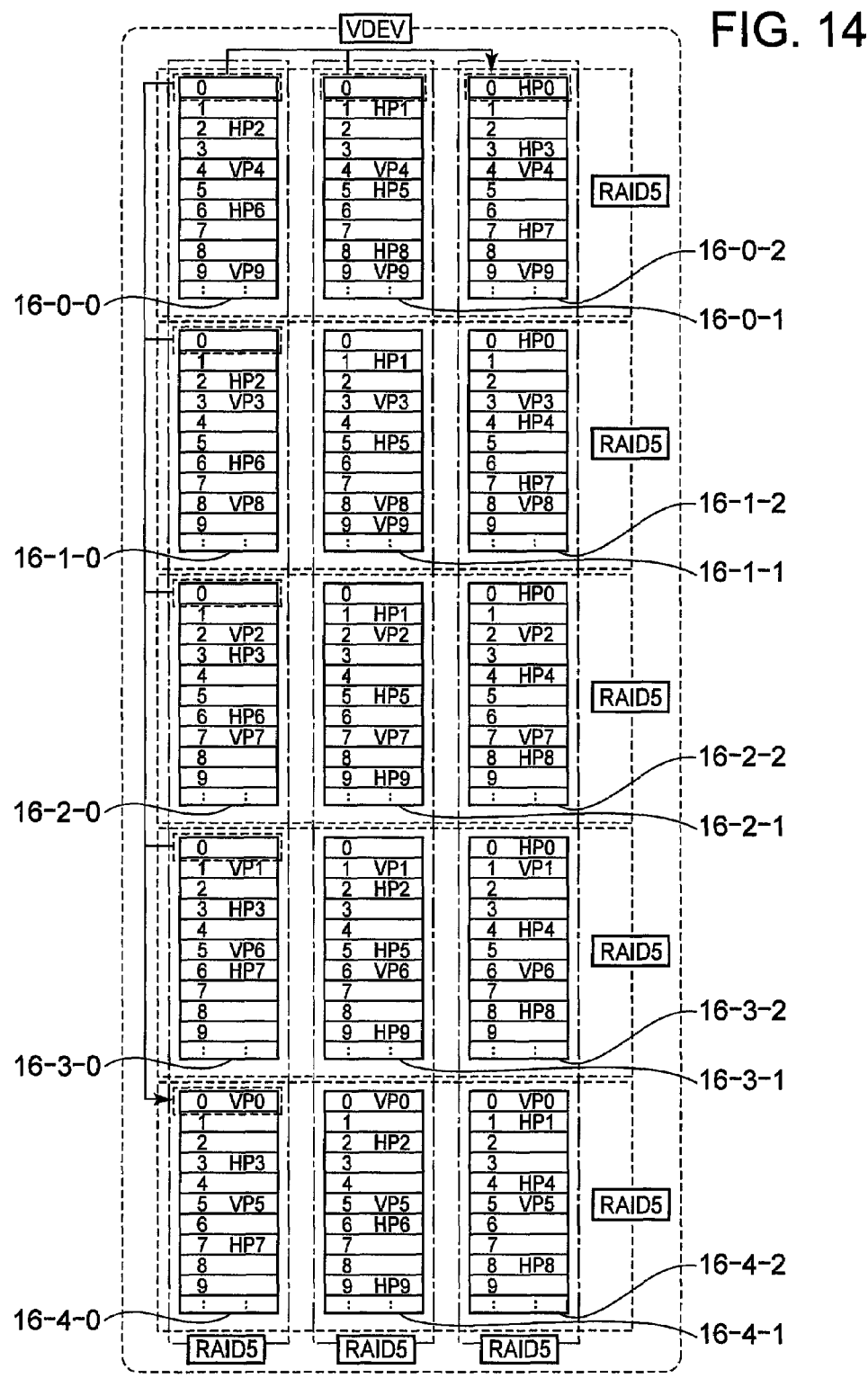
FIG. 14 is a schematic diagram of a write in a third data protection mode.

FIG. 14 is a schematic diagram of a write in the third data protection mode.

The third data protection mode is a format that is similar to that of the second data protection mode. Hereinbelow, the third data protection mode will be explained by focusing on the points of similarity and points of difference between the third data protection mode and the second data protection mode.

First, the RAID configuration in the third data protection mode will be explained.

In the third data protection mode, horizontal RAID groups and vertical RAID groups are configured the same as in the second data protection mode, but unlike the second data protection mode, RAID 5 rather than RAID 4 is configured for the vertical RAID groups. The RAID group configured from all the horizontal RAID groups and all the vertical RAID groups will be called the total RAID group the same as in the second data protection mode. The RAID configuration will be explained in detail. In the example of FIG. 14, for example, RAID 5-based horizontal RAID groups i are configured from HDD 16-*i*-0, 16-*i*-1, 16-*i*-2 (i=0, 1, 2, 3, 4), and RAID 5-based vertical RAID groups j are configured from HDD 16-0-*j*, 16-1-*j*, 16-2-*j*, 16-3-*j*, 16-4-*j* (j=0, 1, 2).

Next, the manner in which the data elements, horizontal parity and vertical parity are arranged in the HDD 16 in the third data protection mode will be explained.

The horizontal parities inside a RAID 5 horizontal RAID group are distributively allocated to a plurality of HDD 16 inside the relevant horizontal RAID group. This is the same as the second data protection mode. The third data protection mode differs from the second data protection mode in that the vertical parities inside a RAID 5 vertical RAID group j are distributively allocated to a plurality of HDD 16 inside the relevant vertical RAID group. In other words, the HDD 16 that constitutes the allocation destination of a vertical parity shifts in each row of vertical stripes. Furthermore, the definition of a row of vertical stripes as used here is the same as in the second data protection mode.

In FIG. 14, the meaning of a cell, which configures an HDD 16, is the same as in the second data protection mode.

In the example of FIG. 14, for example, the horizontal parity of the horizontal RAID group 0 corresponding to the stripes 0 inside HDD 16-0-0 and 16-0-1 is the stripe 0 (horizontal parity HP0) inside HDD 16-0-2. Further, the vertical parity of the vertical RAID group 0 corresponding to the stripes 0 inside HDD 16-0-0, 16-1-0, 16-2-0 and 16-3-0 is stored in the stripe 0 (vertical parity VP0) inside HDD 16-4-0.

Next, in the third data protection mode, since the specific example of the data configured in the Disk Group configuration table 700 is practically the same as that explained for the second data protection mode, a detailed explanation thereof will be omitted. Unlike in the second data protection mode, since the RAID level of the vertical RAID group is RAID 5 in the third data protection mode, "RAID 5" instead of "RAID 4" is configured in the element of column 704 in which the RAID level of the vertical RAID group is configured.

Next, the mapping of a logical address and a physical address in the third data protection mode will be explained. In the third data protection mode, too, logical addresses and physical addresses can be mapped such that consecutive logical addresses span a plurality of horizontal RAID groups the same as in the second data protection mode. The specific example of this is practically the same as that explained for the second data protection mode. Carrying out mapping like this can increase write performance by doing away with the need to read out the old vertical parity from the HDD 16 when writing lengthy data the same as in the second data protection mode.

Next, since the method of updating a data unit, horizontal parity and vertical parity in accordance with the third data protection mode is the same as that in the second data protection mode, with the exception of the fact that vertical parities are distributively allocated to a plurality of HDD 16 inside a vertical RAID group, the explanation will be omitted.

Figure 15:
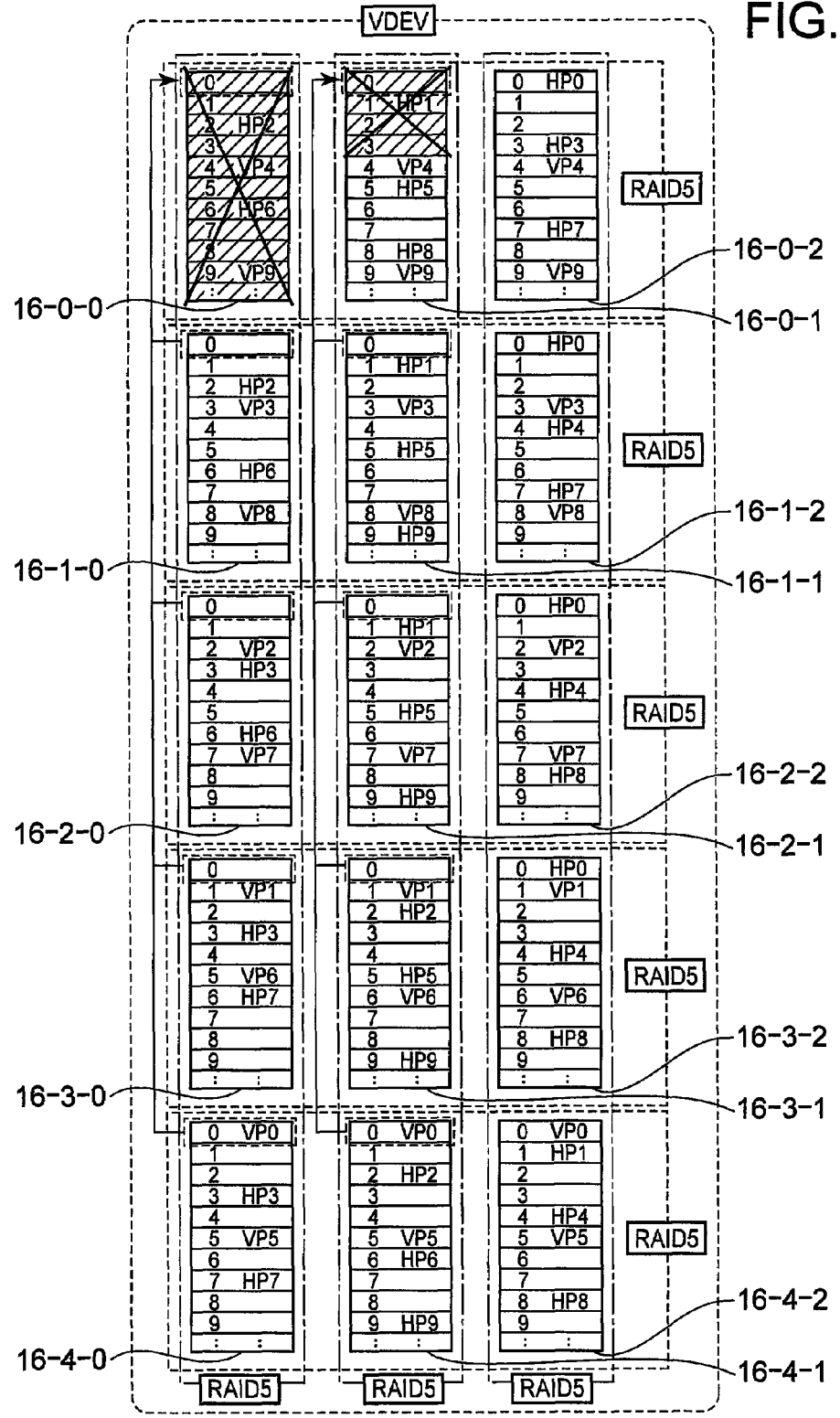
FIG. 15 is a schematic diagram of a restore in the third data protection mode.

FIG. 15 is a schematic diagram of a restore in the third data protection mode.

In the third data protection mode as well, one unreadable data element in a single-failure data and two unreadable data elements in a double-failure data can be restored the same as in the second data protection mode.

In FIG. 15, HDD 16-0-0 is a completely failed HDD, and HDD 16-0-1 is a partially failed HDD. In this partially failed HDD 16-0-1, stripes 0 through 3 are failed stripes.

Since the procedure for restoring the data elements configuring the single-failure data is the same as that of a normal RAID 5 and is the same as the procedure explained for the second data protection mode, this explanation will be omitted.

Conversely, two unreadable data elements configuring a double-failure data cannot be restored using the same procedures as a normal RAID 5.

Accordingly, the restore of these two data elements is carried out using the vertical parity the same as in the second data protection mode, but since a vertical RAID group in the third data protection mode is configured in accordance with RAID 5, unlike in the second data protection mode, the restore is carried out via the same method as RAID 5 using the data elements and vertical parities in all the other stripes of the (previously defined) row of vertical stripes comprising the failed stripe, which is the unreadable data element. In FIG. 15, for example, the data element corresponding to the stripe 0 inside HDD 16-0-0 is restored based on the data elements and vertical parity corresponding to the stripes 0 inside HDD 16-1-0, 16-2-0, 16-3-0 and 16-4-0. In so doing, it is possible to restore both of the two unreadable data elements configuring the double-failure data using the vertical parity. Furthermore, after using vertical parity to restore one of the two data elements configuring the double-failure data, the relevant double-failure data becomes single-failure data, thereby making it possible for the subsequent restore procedure to be the same as the single-failure data restore procedure.

Single-failure data and double-failure data can be restored as described hereinabove.

Furthermore, in the above explanation, it is supposed that HDD 16-0-1 is the partially failed HDD, but the restore can be carried out the same way even when HDD 16-0-1 is the completely failed HDD. Further, in the above explanation, it is supposed that HDD 16-0-0 is the completely failed HDD, but the restore can be carried out the same way even when HDD 16-0-0 is the partially failed HDD. Further, when the vertical parity constitutes the failed stripe, the relevant vertical parity can be restored in accordance with the RAID 5 restore method based on the other data elements of the row of vertical stripes comprising the relevant vertical parity.

The preceding is an explanation of third data protection mode.

Figure 16:
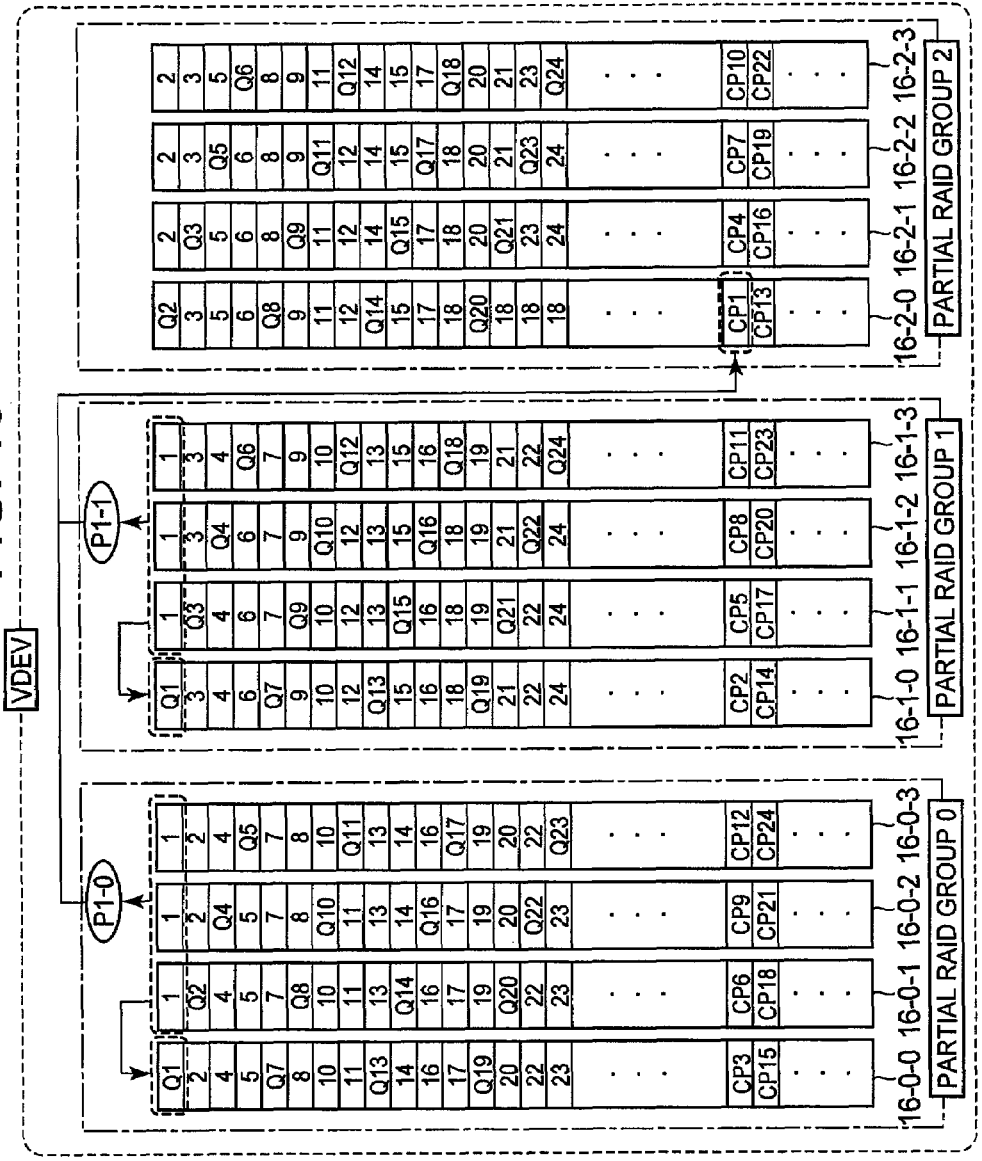
FIG. 16 is a schematic diagram of a write in a fourth data protection mode.

FIG. 16 is a schematic diagram of a write in the fourth data protection mode.

First, the RAID configuration in the fourth data protection mode will be explained.

In the fourth data protection mode, as shown in FIG. 16, a RAID group is configured by grouping together a plurality of HDD 16 (to expedite the explanation, this RAID group will be called a "partial RAID group"), and these RAID groups are further grouped together to configure a RAID group (to expedite the explanation, this RAID group will be called the "total RAID group"). A VDEV is configured in accordance with the total RAID group. In FIG. 16, for example, partial RAID group 0 is configured by HDD 16-0-0, 16-0-1, 16-0-2, and 16-0-2, and the total RAID group is configured from partial RAID groups 0, 1 and 2.

Next, the manner in which the data elements and redundancy data are arranged in the HDD 16 in the fourth data protection mode will be explained. In the fourth data protection mode, a data unit is stored in a row of stripes of a partial RAID group. In the fourth data protection mode, unlike with the data protection modes explained thus far, a Q parity (a second redundancy code) as well as P parity is created the same as in RAID 6. However, whereas the Q parity is written to a partial RAID group for each data unit, P parity is not written for each data unit. With regard to P parity, a plurality of P parities, which correspond to data units inside a plurality of partial RAID groups, is compressed into a single compressed parity, and written to the total RAID group. Consequently, it is possible to conserve the consumed storage capacity of the total RAID group while being able to restore two data elements in double-failure data.

Prior to explaining the compressed parity in the fourth data protection mode, the cells configuring the HDD 16 in FIG. 16 will be explained. The cells inside the HDD 16 (for example, HDD 16-0-0) of FIG. 16 represent stripes. Inside the respective cells is written either an identifier for uniquely identifying a data element inside the HDD 16 to which the stripe corresponding to the relevant cell belongs, or an identifier for uniquely identifying the Q parity inside the partial RAID group to which the stripe corresponding to the relevant cell belongs, or an identifier for uniquely identifying the compressed parity inside the total RAID group to which the stripe corresponding to the relevant cell belongs. A data element is written in a cell in which a numeral (1, 2, 3, . . . ) is written inside the cell. A Q parity, which is created from a plurality of data elements corresponding to i of the data elements inside the partial RAID group to which the relevant stripe belongs, is written in a stripe corresponding to the cell in which "Qi" (i=1, 2, 3, . . . ) is written inside the cell. A compressed parity, which is created from a plurality of data elements corresponding to i of the data elements inside the total RAID group to which the relevant stripe belongs, is written in the stripe corresponding to the cell in which "CPi" (i=1, 2, 3, . . . ) is written inside the cell.

In the fourth data protection mode, the compressed parity written to the specified stripe is created by a code, which compresses a plurality of P parities corresponding to a plurality of data units into one parity, more specifically, by computing the exclusive OR of this plurality of P parities. In this embodiment, for example, one compression code is created on the basis of two P parities, which correspond to two data units. More specifically, for example, the compressed parity "CP1" is created by computing the exclusive OR of a first P parity corresponding to a first data unit ("P1-0", which is the exclusive OR of data element "1" inside HDD 16-0-1, 16-0-2 and 16-0-3), and a second P parity corresponding to a second data unit ("P1-1", which is the exclusive OR of data element "1" inside HDD 16-1-1, 16-1-2 and 16-1-3).

In the fourth data protection mode, a plurality of specified stripes exists in one HDD 16. Thus, a plurality of rows of specified stripes exists in a partial RAID group. The plurality of rows of specified stripes can be distributed in the partial RAID group, or, as shown in the figure, the plurality of rows of specified stripes can exist as consecutive rows of specified stripes at the tail end of the partial RAID group.

The following rule is observed in the fourth data protection mode of this embodiment. That is, one compressed parity, which has been created from a plurality of P parities corresponding to data units inside a plurality of partial RAID groups, is written to a partial RAID group other than the partial RAID group used to create the relevant compressed parity, from among the plurality of partial RAID groups configuring the total RAID group. This is to avoid a situation in which the compressed parity and either the data elements in the respective data units corresponding thereto or the Q parities corresponding to the respective data units are read out simultaneously as the result of a HDD 16 failure. For example, compressed parity "CP1" will be explained. Because the six data elements configuring the two data units corresponding to the compressed parity "CP1" are written to HDD 16-0-1, 16-0-2, 16-0-3, 16-1-1, 16-1-2 and 16-1-3, and the Q parities corresponding to these two data units are written in HDD 16-0-0 and 16-1-0, the compressed parity "CP1" is written to the partial RAID group (in this example, partial RAID group 2) other than partial RAID groups 0 and 1, which are the partial RAID groups configured from these HDD 16. In other words, the plurality of data units corresponding to the plurality of P parities, which is to be the basis for the compressed parity written to partial RAID group 2, should be the data units that are written in partial RAID group 0 and partial RAID group 1.

Next, a specific example of data configured in the Disk Group configuration table 700 in the fourth data protection mode will be explained.

In FIG. 7, Disks 43, 44, 45 and 46 of Disk Group 0 of VDEV 4 correspond to HDD 16-0-0, 16-0-1, 16-0-2 and 16-0-3 of FIG. 16. Since these Disks configure a partial RAID group, "PARTIAL", which represents the partial RAID group, is configured in RAID level column 704 corresponding to Disk Group 0 of VDEV 4 in FIG. 7.

Next, the updating of a data unit, Q parity and compressed parity in accordance with the fourth data protection mode will be explained. Furthermore, in the following explanation, a pre-update data element will be referred to as an "old data element", and a post-update data element will be referred to as a "new data element" (the same will hold true for a Q parity and a compressed parity).

For example, take a case in which the stripe 1 inside HDD 16-0-1 is to be updated. For the sake of explanation, the data inside the stripe 1 of HDD 16-0-1 will be called data element "1", the data inside the stripe Q1 of HDD 16-0-0 will be called Q parity "Q1", and the data inside the stripe CP1 of HDD 16-2-0 will be called compressed parity "CP1". When updating data element "1", it is necessary to update Q parity "Q1" and compressed parity "CP1". This is because the values of the Q parity "Q1" and the compressed parity "CP1" are each dependent on data element "1", and if the value of the data element "1" is updated, the values of the Q parity "Q1" and the compressed parity "CP1" will change.

Accordingly, the disk I/O processor 202 first reads from HDD 16-0-1 and 16-0-0 the old data element "1" and the old Q parity "Q1", which are required to create a new Q parity "Q1". Then the disk I/O processor 202 can create the new Q parity "Q1" on the basis of the new data element "1", the old data element "1" and the old Q parity "Q1" (or, can create a new Q parity "Q1" from the data elements inside the stripes 1 of HDD 16-0-2 and 16-0-3, which are the data elements that have not been updated, and the new data element "1"). Furthermore, the creation of the Q parity conforms to the RAID 6 Q parity create method. Next, the disk I/O processor 202 also carries out the creation of a new compressed parity "CP1" using the same method as that for creating the new Q parity "Q1". That is, the disk I/O processor 202 can create the new compressed parity "CP1" on the basis of the old compressed parity "CP1", the old data element "1" and the new data element "1" (or, the disk I/O processor 202 can read out data from the stripes 1 inside HDD 16-0-2, 16-0-3, 16-1-1, 16-1-2 and 16-1-3, and create a new compressed parity "CP1" on the basis of the read-out data and the new data element "1"). However, the creation of the compressed parity conforms to the RAID 6 P parity create method. Thereafter, the disk I/O processor 202 writes the new data element "1" to the stripe in which the old data element "1" is being stored, writes the new Q parity "Q1" to the stripe in which the old Q parity "Q1" is being stored, and writes the new compressed parity "CP1" to the stripe in which the old compressed parity "CP1" is being stored.

Next, the mapping of a logical address and a physical address in the fourth data protection mode will be explained. In the fourth data protection mode, for example, it is possible to map a logical address and a physical address such that consecutive logical addresses span a plurality of partial RAID groups. In other words, for example, two or more logical addresses, which respectively correspond to two or more stripes configuring a pth row of stripes inside an xth partial RAID group (for example, partial RAID group 0), and two or more logical addresses, which respectively correspond to two or more stripes configuring a pth row of stripes inside an x+1st partial RAID group (for example, partial RAID group 1) are consecutive (where x and p are integers greater than 0).

In the example of FIG. 16, for example, mapping of the logical addresses and physical addresses is carried out such that stripes 0 of HDD 16-0-1, 16-0-2, 16-0-3, 16-1-1, 16-1-2 and 16-1-3 constitute consecutive logical addresses. When writing lengthy data having consecutive logical addresses, carrying out mapping like this increases the probability of being able to create a compressed parity by determining the P parity of data elements inside this lengthy data. In the example of FIG. 16 above, it is possible to create a compressed parity CP1 inside HDD 16-2-0 using the data elements of stripes 1 inside HDD 16-0-1, 16-0-2, 16-0-3, 16-1-1, 16-1-2 and 16-1-3. Creating a compressed parity like this does away with the need to read out the old compressed parity from the HDD 16 when writing lengthy data, thereby making it possible to enhance write efficiency.

Figure 17:
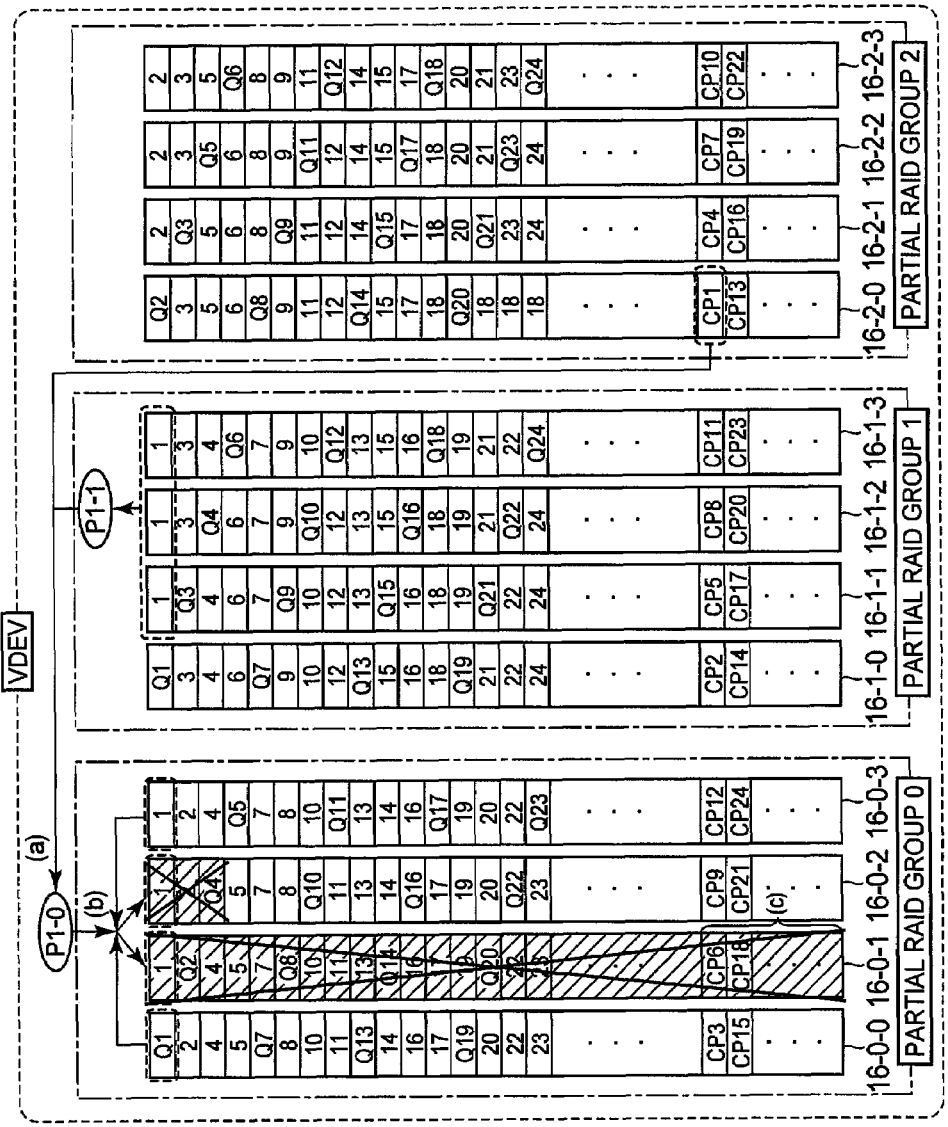
FIG. 17 is a schematic diagram of a restore in the fourth data protection mode.

FIG. 17 is a schematic diagram of a restore in the fourth data protection mode. In the fourth data protection mode as well, it is possible to restore one data element that cannot be read out from single-failure data, and two data elements that cannot be read out from double-failure data.

In this figure, HDD 16-0-1 is a completely failed HDD, and HDD 16-0-2 is a partially failed HDD. In this partially failed HDD 16-0-2, stripes 1, 2 and Q4 are failed stripes.

The procedure for restoring a data element configuring single-failure data can utilize the same concept as that of a normal RAID 6. That is, the data element configuring the single-failure, which is stored in the failed stripe of completely failed HDD 16-0-1, is restored using all the other data elements configuring this single-failure data, and the Q parities corresponding to this single-failure data (in other words, using the data elements and Q parities of all the other stripes in the row of stripes comprising this failed stripe). However, this procedure is only employed when it is possible to read out the Q parities corresponding to the failed stripe.

Conversely, two unreadable data elements configuring double-failure data cannot be restored with the same procedure as that of a normal RAID 6 (for example, when the two unreadable data elements are stripes 1 of HDD 16-0-1 and 16-0-2 of the same figure). Further, when a Q parity corresponding to the failed stripe of single-failure data cannot be read out, the one data element configuring the single-failure data cannot be restored via the same procedure as that of a normal RAID 6 (for example, when the unreadable data element is stripe 2 of HDD 16-0-2 of the same figure, and the unreadable Q parity is stripe Q2 of HDD 16-0-1 of this figure).

Accordingly, the restore of the two unreadable data elements configuring the double-failure data, or the restore of one unreadable data element configuring the single-failure data and the unreadable Q parity are carried out as follows utilizing a compressed parity.

First, a P parity corresponding to either the double-failure data or the single-failure data is created ((a) in this figure). More specifically, for example, P parity "P1-0", which forms the basis for compressed parity "CP1", and which corresponds to partial RAID group 0 to which the failed stripes belong, is created by computing an exclusive OR on the basis of the compressed parity "CP1", and the P parity "P1-1", which is the basis of the compressed parity "CP1", and which corresponds to a partial RAID group other than partial RAID group 0 to which the failed stripes belong.

Thereafter, in accordance with the same procedure as RAID 6, the two unreadable data elements configuring the double-failure data, or one unreadable data element configuring the single-failure data and the unreadable Q parity are restored ((b) in this figure). More specifically, for example, either the data elements or the Q parities of the two failed stripes (in this example, stripes 1 of HDD 16-0-1 and 16-0-2) are restored on the basis of the created P parity "P1-0", and either the data element or Q parity (in this example, stripe Q1 of HDD 16-0-0 and stripe 1 of HDD 16-0-3) of (readable) stripes other than the two failed stripes of the row of stripes of partial RAID group 0 to which the failed stripes belong.

Finally, the respective compressed parities stored in the respective specified stripes of the completely failed HDD 16-0-1 are restored ((c) in this figure). More specifically, since all of the single-failure data and double-failure data have been restored in accordance with the restores of the single-failure data and the double-failure data explained thus far, a P parity is created on the basis of the restored data unit, and compressed parities "CP6", "CP18" and so forth, which are stored in the completely failed HDD 16-0-1, are restored on the basis of the created P parity and the P parity, which corresponds to the other data unit corresponding to the compressed parity to which this data unit corresponds.

The preceding is an explanation for the fourth data protection mode.

Furthermore, this explanation used a RAID configuration based on a RAID 6 known as a P+Q mode, but a RAID configuration based on RAID 6 known as a two-dimensional XOR mode can be used instead of this. When the two-dimensional XOR mode is used, a compressed parity is created by creating two-dimensional XOR mode diagonal parities for a plurality of partial RAID groups and computing the exclusive ORs of these diagonal parities, and this compressed parity is stored in a different partial RAID group. Further, in the above explanation, it is supposed that HDD 16-0-2 is the partially failed HDD, but the same restore would be possible even if HDD 16-0-2 was the completely failed HDD. Further, in the above explanation, it is supposed that HDD 16-0-1 is the completely failed HDD, but the same restore would be possible even if HDD 16-0-1 were the partially failed HDD.

The preceding is explanations of the first through the fourth data protection modes. Furthermore, in all of the data protection modes, unreadable data elements in single-failure data and double-failure data for completely failed HDD and partially failed HDD are restored to a prescribed storage resource, for example, a spare HDD.

The flows of the various processes carried out in this embodiment will be explained hereinbelow.

Figure 18:
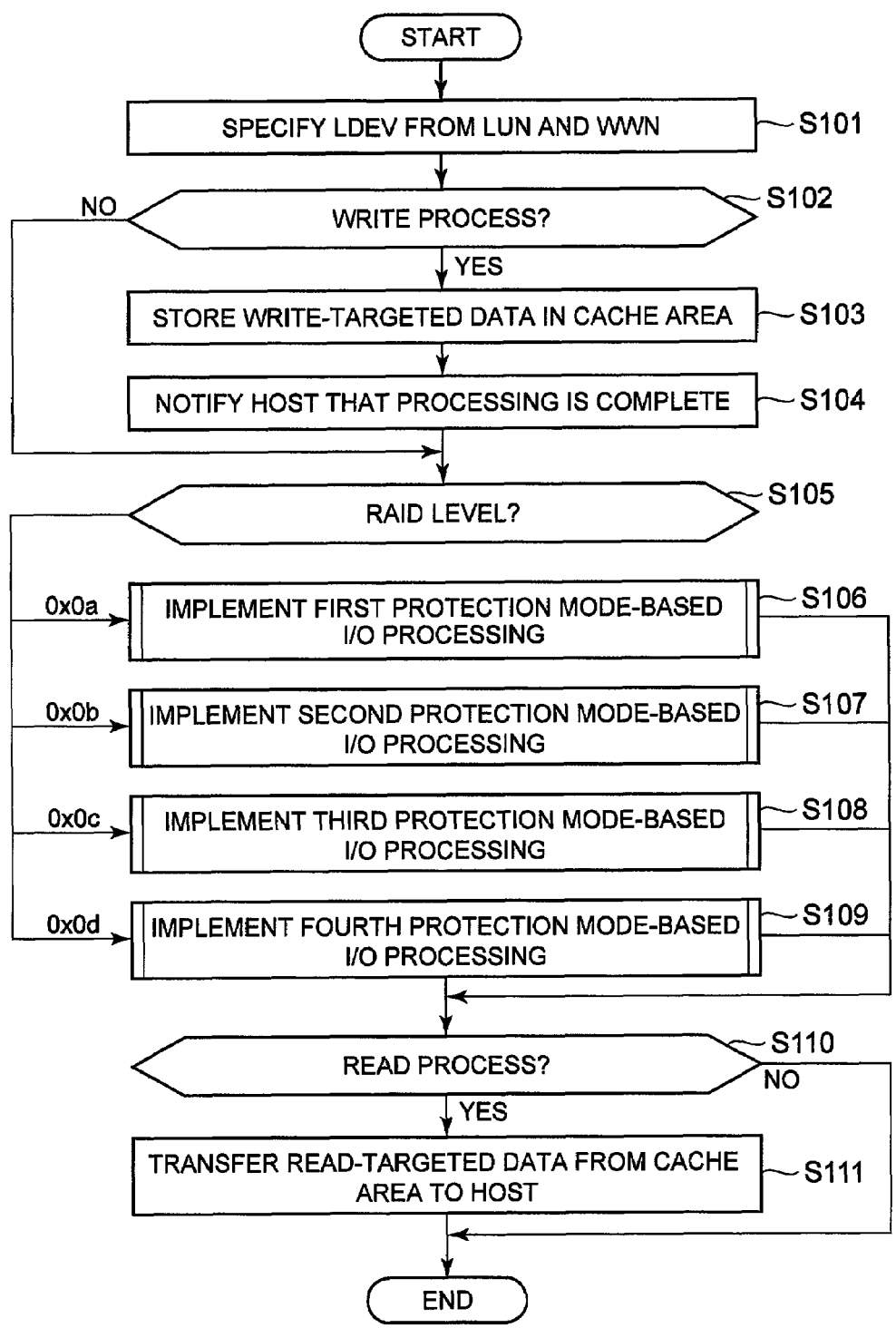
FIG. 18 is a flowchart of the process carried out by a command processor when the storage system receives an I/O request from the host.

FIG. 18 is a flowchart of processing carried out by the command processor 201 when the storage system 1 receives an I/O request from the host 4.

When the host 4 accesses a LU, an I/O request specifying the WWN and LUN of assigned to the LU, and then a read- or write-targeted address (LBA: Logical Block Address) is issued to the storage system 1. The command processor 201 responds to the receiving of this I/O request, references the LU configuration table 600, and calculates an LDEV identification number (LDEV number) corresponded to the LUN and WWN (S101). Next, the command processor 201 determines whether or not the I/O request from the host 4 is a write request (S102). When the I/O request is a write request (S102: YES), this processing proceeds to S103, and when the I/O request is not a write request (is a read request) (S102: NO), this processing moves to S105.

In S103, the command processor 201 stores the write-data (write-targeted data conforming to the I/O request) in an unused area of the cache area of the cache/control memory 14, and in S104, notifies the host 4 that the relevant write process has been completed. The processing of S104 can be carried out subsequent to this, for example, after S105. At the point in time of S104, the data write to the HDD 16 has not been completed, but notifying the host 4 that processing has been completed when the write-data is stored in the cache area makes it possible to speed up write process response time.

In S105, the command processor 201 references the RAID configuration table 400 and the VDEV configuration table 500, and determines the RAID level of the VDEV comprising the LDEV to which the calculated LDEV number was assigned in S101.

When the value of the RAID level is "0x0a" (S105: 0x0a), the command processor 201 implements a read or write process for the LDEV to which the calculated LDEV number was assigned in S101 based on the first data protection mode (S106). This process will be described in detail using FIG. 19.

Next, when the value of the RAID level is "0x0b" (S105: 0x0b), the command processor 201 implements a read or write process for the LDEV to which the calculated LDEV number was assigned in S101 based on the second data protection mode (S107). This process will be described in detail using FIGS. 22 and 23.

Next, when the value of the RAID level is "0x0c" (S105: 0x0c), the command processor 201 implements a read or write process for the LDEV to which the calculated LDEV number was assigned in S101 based on the third data protection mode (S108). This process will be described in detail using FIGS. 22 and 23.

Finally, when the value of the RAID level is "0x0d" (S105: 0x0d), the command processor 201 implements a read or write process for the LDEV to which the calculated LDEV number was assigned in S101 based on the fourth data protection mode (S109). This process will be described in detail using FIGS. 27 and 28.

In S110, the command processor 201 determines if the received I/O request is a read request. When the relevant request is a read request (S110: YES), the read-targeted data from the HDD 16 is stored in the cache area via the processing of the above-mentioned S106, S107, S108 and S109, and the command processor 201 returns the read-targeted data that is in the cache area to the host 4 (S111). In S110, when it is determined that the relevant request is not a read request (S110: NO), this processing ends.

Figure 19:
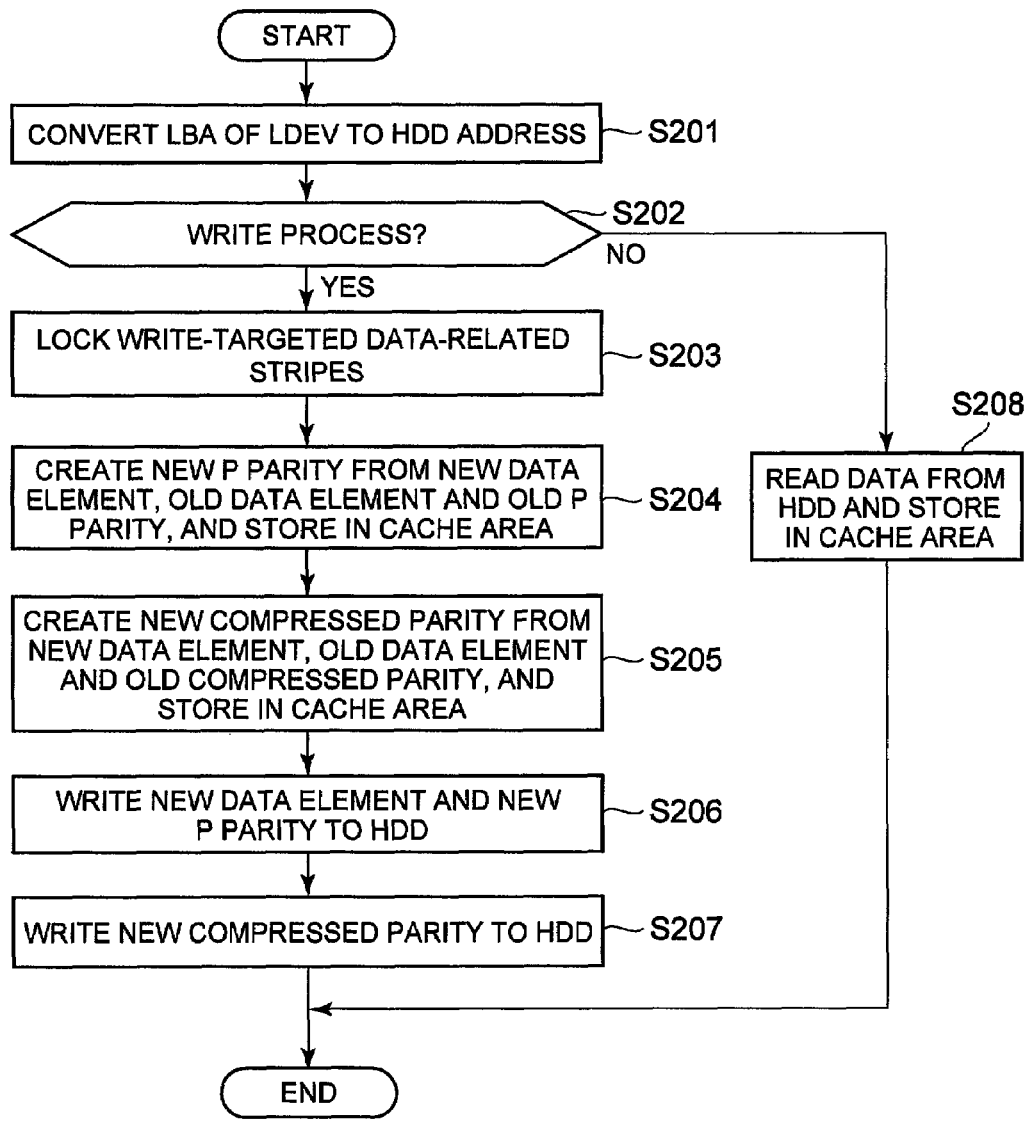
FIG. 19 is a flowchart of an I/O process based on the first data protection mode.

FIG. 19 is a flowchart of I/O processing based on the first data protection mode.

In the explanation of FIG. 19, the LDEV targeted by the I/O request will be referred to as the "target LDEV", the respective HDD of the VDEV comprising the target LDEV will be referred to as the "target HDD", and the HDD address, which is corresponded to the volume area specified by the LBA specified by the I/O request from the host 4, will be called the "target physical address".

In S201, the LBA specified by the I/O request from the host 4 is converted to the target physical address. More specifically, for example, the command processor 201 sends to the DKA 13 an I/O request comprising the LBA specified in the I/O request from the host 4, and the disk I/O processor 202 inside the DKA 13 receives this I/O request. This I/O request can be written to the control area of the cache/control memory 14, and it can be sent to the DKA 13 via the internal switch 15. The DKA 13, which receives the I/O request, is the DKA 13 connected to the respective target HDD 16. The disk I/O processor 202 of the relevant DKA 13 converts the LBA inside the received I/O request to the target physical address.

In S202, the disk I/O processor 202 determines if the received I/O request is a write request. When the received I/O request is a write request (S202: YES), this processing proceeds to S203, and when the received I/O request is a read request (S202: NO), this processing moves to S208. Furthermore, the processing of S202 may be completed prior to the end of S201 processing.

In S203, the disk I/O processor 202 locks the stripes related to the write for the write-targeted data placed in the cache area (for example, the stripes in which the respective data units, into which the write-targeted data has been divided, the P parities related to the respective data units, or an updated compressed parity are written) so as to make these stripes inaccessible to other requests. In the storage system 1, since a plurality of access requests from the host 4 are handled simultaneously, there is the possibility of a plurality of updates being simultaneously generated to the stripes related to the write of the write-targeted data. If the updating of a stripe required to create P parity is generated by this other access process in the midst of a P parity create process (between S203 and S207), the contents of the P parity will become inconsistent. To prevent this from happening, the lock process is carried out.

In S204, the disk I/O processor 202 creates a new P parity from the new data element in the data unit, the old data element corresponding to the new data element, and the new P parity, and writes this created new P parity to the cache area. Furthermore, when the old data element and the old P parity are not stored in the cache area, the disk I/O processor 202 reads out the old data element and the old P parity from the HDD 16 prior to carrying out this processing.

In S205, the disk I/O processor 202 creates a new compressed parity from the new data element, old data element and old compressed parity, and writes this created new compressed parity to the cache area. Furthermore, when the old compressed parity is not stored in the cache area, the disk I/O processor 202 reads out the old compressed parity from the HDD 16 prior to carrying out this processing.

In S206, the disk I/O processor 202 writes the new data element and new P parity to the respective target HDD 16 by sending to the respective target HDD 16 new data element and new P parity write requests, which specify the target physical addresses.

In S207, the disk I/O processor 202 writes the new compressed parities to the respective target HDD 16 by sending to the respective target HDD 16 new compressed parity write requests, which specify the target physical addresses, and unlocks the stripes, which were locked in S203. Furthermore, the disk I/O processor 202, for example, can write all the post-update compressed parities written to the cache area to the HDD 16 simultaneously at a prescribed timing without carrying out the processing of this S207.

In S208, the disk I/O processor 202 reads out the read-targeted data from the respective HDD 16, and stores this read-out read-targeted data in the cache area.

Figure 20:
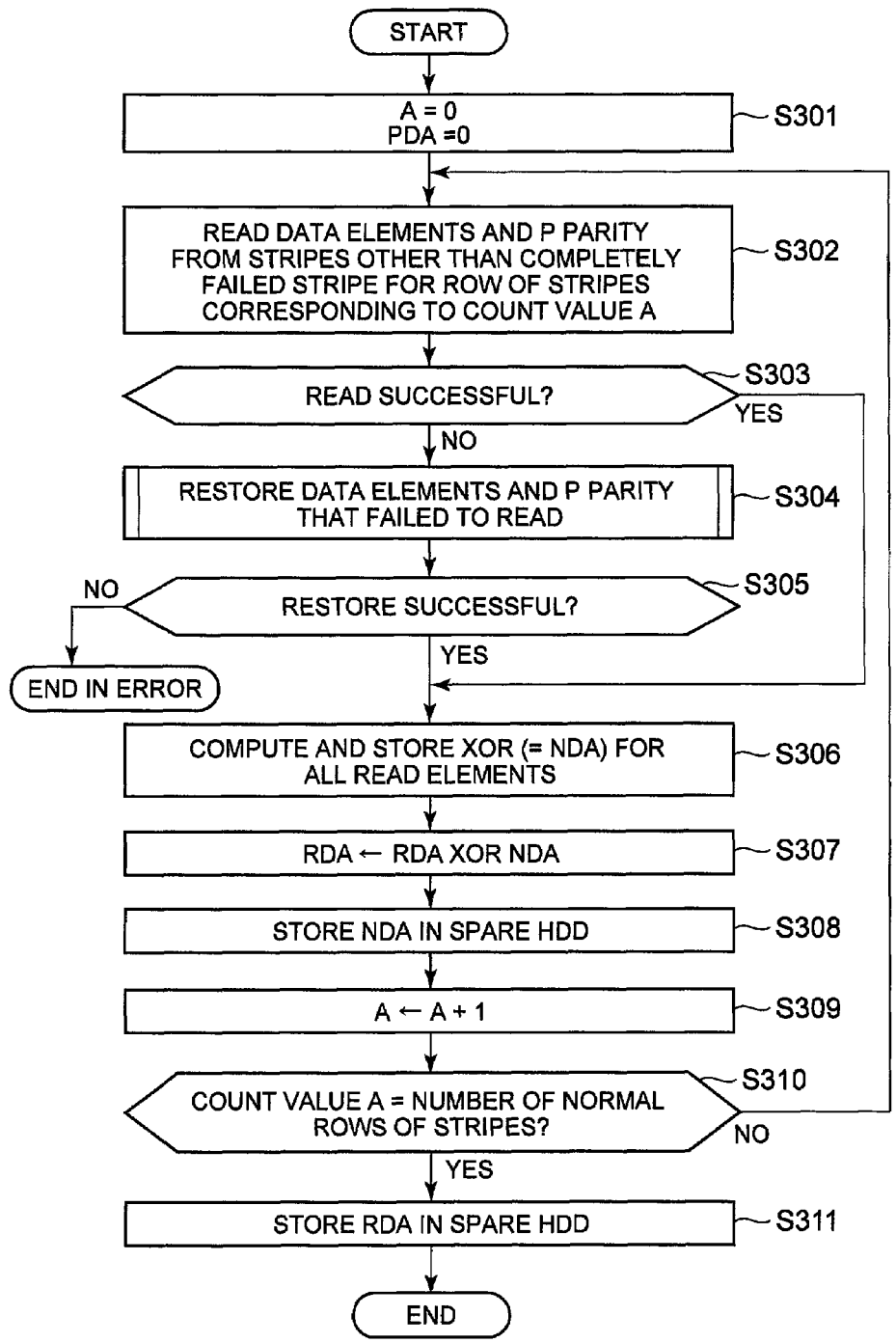
FIG. 20 is a flowchart of a restore process in the first data protection mode.

FIG. 20 is a flowchart of a restore process in the first data protection mode.

The disk I/O processor 202 carries out the restore process. In the explanation of FIG. 20, it is supposed that there is one completely failed HDD in the RAID group. In the processing of FIG. 20, the disk I/O processor 202 restores all the data element, P parity and compressed parity stripes in the completely failed HDD. Further, if either a data element or P parity read from the stripe of one other HDD fails at the time of this restore (that is, when there is at least one failed stripe besides the completely failed HDD), the disk I/O processor 202 moves to the processing of FIG. 21, and restores either the data element or P parity comprised in the HDD 16 other than the completely failed HDD 16.

The disk I/O processor 202 records in the cache/control memory 14 the count value (described as "count value A" hereinafter), which represents the rank-order number of a row of stripes from the top of the HDD, and the compressed parity (described as the "provisional compressed parity RD" hereinafter), which was arbitrarily updated in the midst of this restore process.

In S301, the disk I/O processor 202 respectively sets the initialization values of count value A and the provisional compressed parity RD to 0.

In S302, the disk I/O processor 202 reads out the data elements and P parity (may be times when there is no P parity) from all the stripes other than the failed stripe (completely failed stripe hereinafter) of the completely failed HDD in the row of stripes specified from the count value A (the Ath stripe from the top). That is, the disk I/O processor 202 reads out the Ath stripe from the top of an HDD 16 other than the completely failed HDD.

In S303, the disk I/O processor 202 determines whether or not the read in S302 was successful. When this read was successful (S303: YES), this processing moves to S306, and when this read failed (S303: NO), this processing proceeds to S304.

In S304, the disk I/O processor 202 restores the read-failed data element and/or P parity of the processing of S302. This process will be explained in detail below by referring to FIG. 21.

In S305, the disk I/O processor 202 determines whether or not the restore of S304 succeeded. When the restore was successful (S304: YES), this processing proceeds to S306, and when the restore failed (S304: NO), this processing ends.

In S306, the disk I/O processor 202 creates either the data element or P parity of the completely failed stripe corresponding to count value A from the data element and P parity read out in S303 or restored in S304 by computing the exclusive OR thereof, and writes the created either data element or P parity (described as the "restoration element ND" hereinafter) to the cache area.

In S307, the disk I/O processor 202 computes the exclusive OR of the provisional compressed parity RD and restoration element ND stored in the cache area, and makes the computed value the provisional compressed parity RD. That is, the provisional compressed parity RD is updated to the most recent provisional compressed parity RD based on this restored restoration element ND.

In S308, the disk I/O processor 202 writes the restoration element ND to the stripe, which is in the same location in the spare HDD as the location of the target stripe in the completely failed HDD 16. Furthermore, the spare HDD is mounted in the storage system 1, and is the HDD that commences operation in place of the completely failed HDD 16 subsequent to this restore process ending normally, in other words, the HDD that becomes a member of the RAID group in place of the completely failed HDD.

In S309, the disk I/O processor 202 adds 1 to the count value A.

In S310, the disk I/O processor 202 determines whether or not the post-update count value A in accordance with S309 is the same as the number of rows of normal stripes. When count value A constitutes the number of rows of normal stripes (S310: YES), this processing proceeds to S311, and when the count value A is less than the number of rows of normal stripes (S310: NO), this processing moves to S302. The fact that count value A is the number of rows of normal stripes signifies that all the normal stripes in the completely failed HDD have been restored. Moving to S311 means the provisional compressed parity RD is the compressed parity that was completed based on the data elements and P parities corresponding to all the normal stripes in the completely failed HDD.

In S311, the disk I/O processor 202 writes the provisional compressed parity RD (that is, the completed compressed parity) to the stripe, which is in the same location in the spare HDD 16 as the location of the specified stripe in the completely failed HDD 16.

According to the above-described series of processes, all the data elements, P parities and compressed parities stored in the completely failed HDD are restored to a spare HDD.

Figure 21:
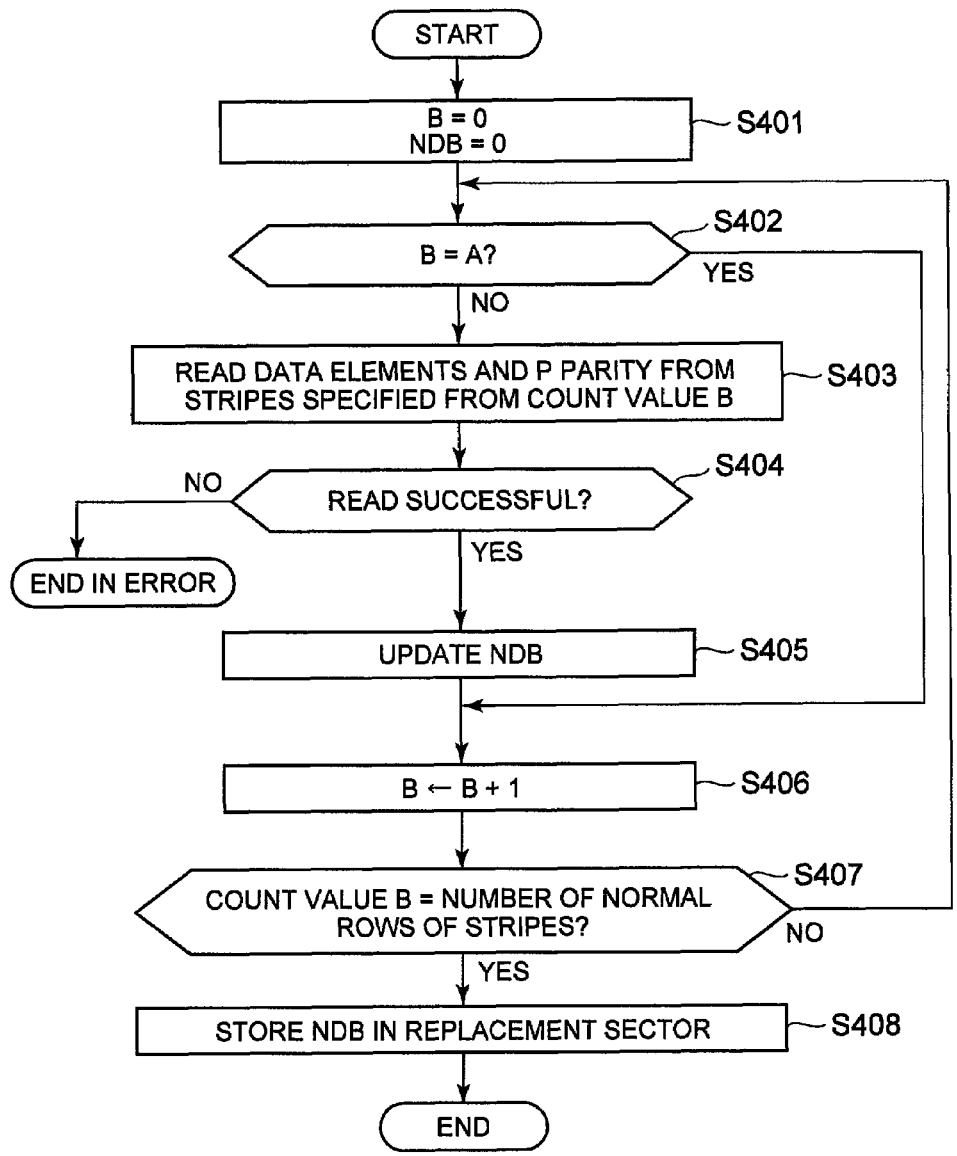
FIG. 21 is a flowchart of processing corresponding to S304 of FIG. 20.

FIG. 21 is a flowchart of processing equivalent to S304 of FIG. 20.

This processing is implemented in S304 of FIG. 20. In this processing, the disk I/O processor 202 restores either a data element or P parity, which failed to be read out in S303 of FIG. 20. This processing is carried out for an HDD 16 having a failed stripe, which is storing either the data element or P parity that failed to be read out in S303 of FIG. 20, that is, for a partially failed HDD. In FIG. 21, since either the data element or P parity stored in this failed stripe is the restore target, hereinafter, this failed stripe will be referred to as the "partially failed stripe".

First, the disk I/O processor 202 writes to the cache area a count value (hereinafter, described as "count value B"), which represents the rank-order number of a row of stripes from the top of the HDD, and a midway temporary value in the computing of either the data element or P parity stored in the partially failed stripe (hereinafter, described as the "provisional restoration element NDB").

In S401, the disk I/O processor 202 respectively sets 0 as the initialization value of count value B and provisional restoration element NDB.

In S402, the disk I/O processor 202 determines whether or not count value B is the same as count value A. When count value B and count value A are the same (S402: YES), this processing moves to S406, and when count value B and count value A are different (S402: NO), this processing proceeds to S403.

In S403, the disk I/O processor 202 reads out either the data element or the P parity from the stripe specified from count value B.

In S404, the disk I/O processor 202 determines whether or not the read of S403 was successful. When this read was successful (S404: YES), this processing proceeds to S405, and when this read failed (S404: NO), this processing ends in an error. Thus, S305 of FIG. 20 becomes NO, and the restore process ends in an error. That is, when two failed stripes exist in a partially failed HDD, a restore process in the first data protection mode ends in an error.

In S405, the disk I/O processor 202 computes the exclusive OR of either the data element or P parity read in S403 and the provisional restoration element NDB already being stored in the cache area, and makes this computed value the provisional restoration element NDB. That is, the provisional restoration element NDB is updated to the most recent value.

In S406, the disk I/O processor 202 adds 1 to count value B.

In S407, the disk I/O processor 202 determines whether or not count value B and the number of rows of normal stripes are the same. When count value B is the same as the number rows of normal stripes (S407: YES), this processing proceeds to S408, and when count value B differs from the number rows of normal stripes (S407: NO), this processing moves to S402. When count value B is the same as the number of rows of normal stripes, the provisional restoration element NDB, which was created based on the data elements and P parity stored in all the normal stripes besides the one failed stripe in the partially failed HDD, constitutes either the data element or P parity stored in this failed stripe. In other words, either the data element or P parity stored in the failed stripe has been restored in the cache area.

In S408, the disk I/O processor 202 writes the provisional restoration element NDB, that is, either the data element or P parity stored in the failed stripe, which has been restored in the cache area, to a replacement sector inside the partially failed HDD 16. The replacement sector is a reserved stripe provided in the HDD. Thereafter, this reserved stripe can be used as the Ath stripe in the relevant HDD in place of the failed stripe.

Figure 22:
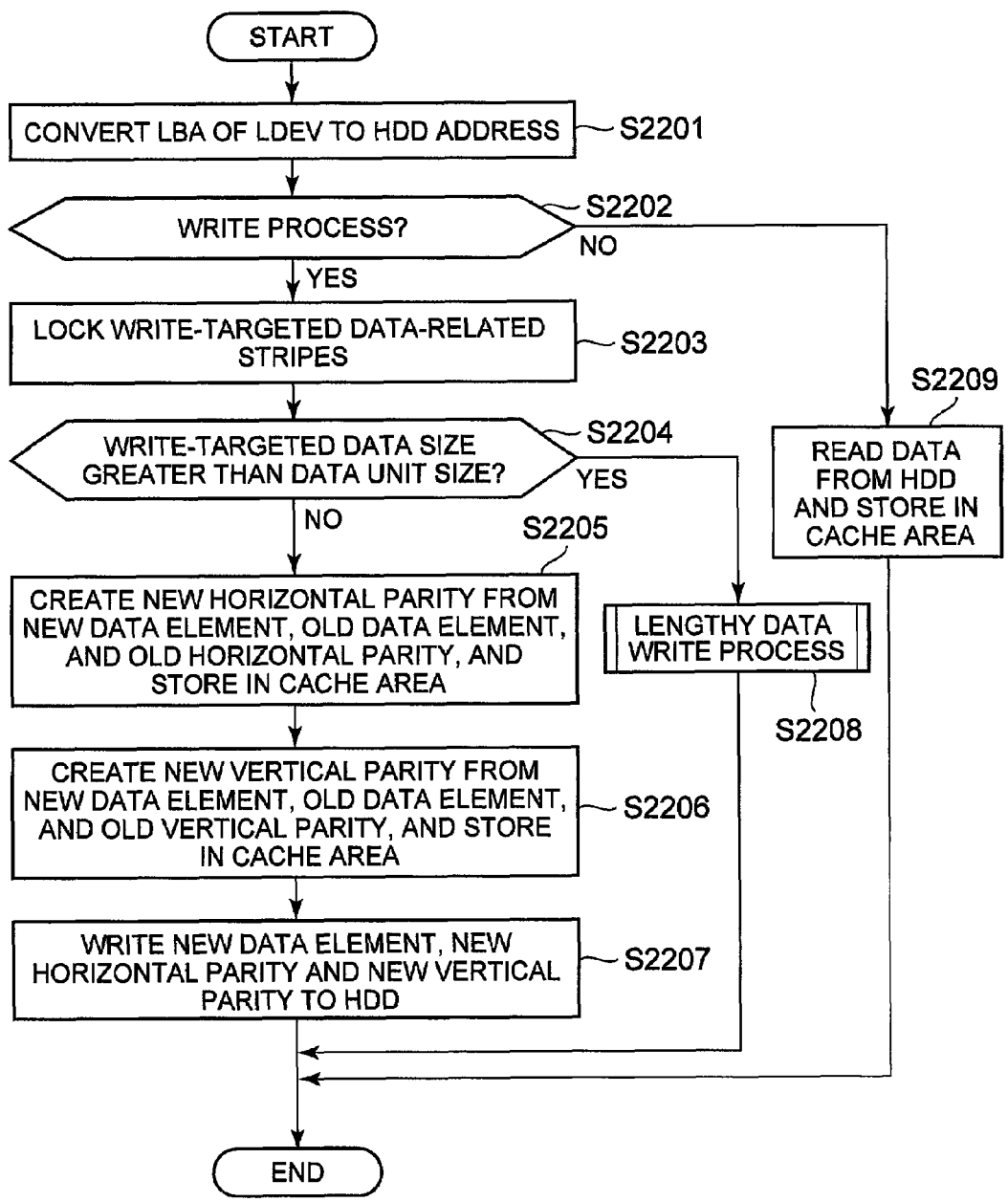
FIG. 22 is a flowchart of I/O processing based on the second and third data protection modes.

FIG. 22 is a flowchart of I/O processing based on the second and third data protection mode.

Figure 23:
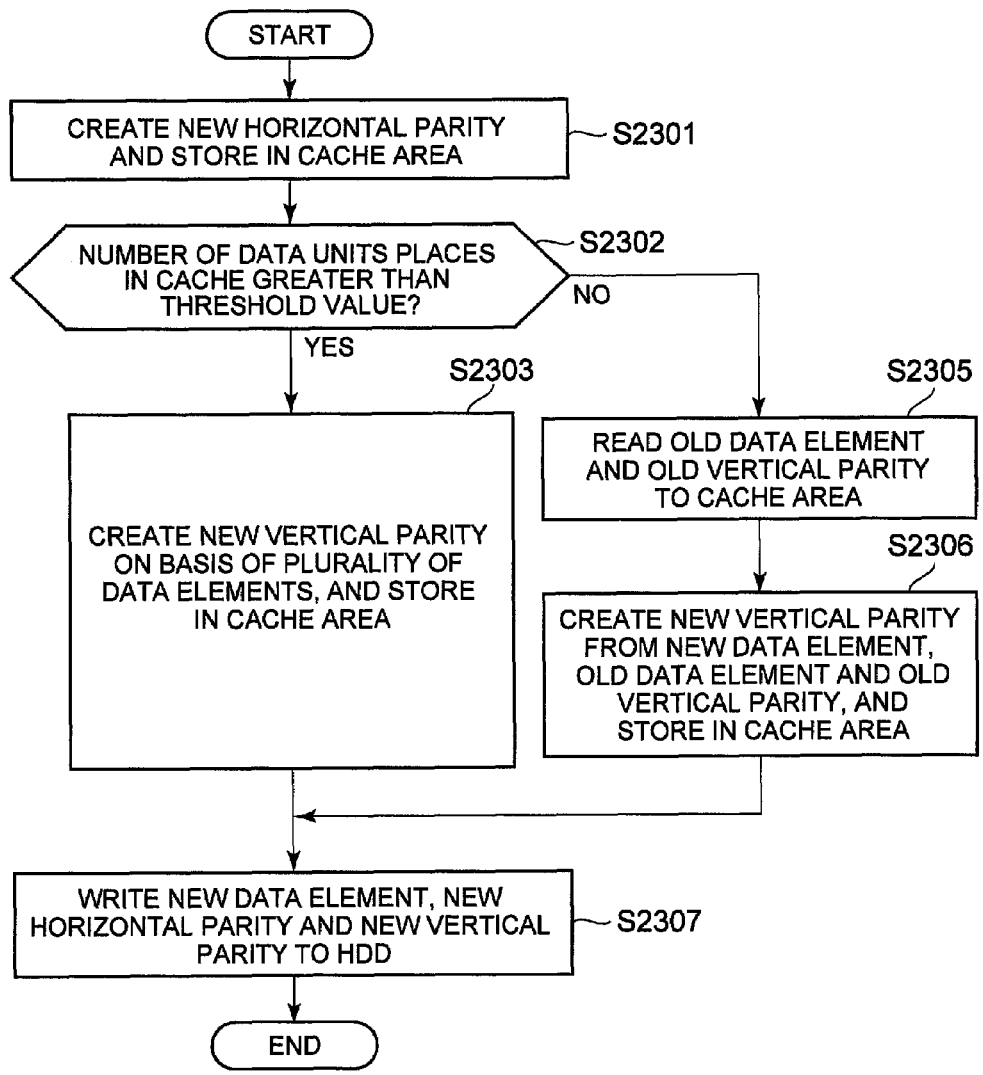
FIG. 23 is a flowchart of processing corresponding to S2208 of FIG. 22.

Similar to the explanation of FIG. 19, in the explanations of FIGS. 22 and 23, an LDEV that is the target of an I/O request will be referred to as the "target LDEV", the respective HDD of the VDEV comprising the target LDEV will be referred to as the "target HDD", and the HDD address, which is corresponded to the volume area specified by the LBA, which is specified by the I/O request from the host 4, will be called the "target physical address".

The processing of S2201 is the same processing as that of S201 of FIG. 19. That is, in S2201, the LBA specified by the I/O request from the host 4 is converted to the target physical address.

In S2202, the same as the processing of S202 of FIG. 19, the disk I/O processor 202 determines if the received I/O request is a write request or a read request. When the received I/O request is a write request (S2202: YES), this processing proceeds to S2203, and when the received I/O request is a read request (S2202: NO), this processing moves to S2209.

In S2203, the disk I/O processor 202 locks the stripes related to the write of the write-targeted data placed in the cache area (for example, the write-destination stripes, such as those of the data units into which the write-targeted data has been divided, and the horizontal and vertical parities corresponding thereto) so as to make these stripes inaccessible to other requests.

In S2204, the disk I/O processor 202 determines whether or not the size of the write-targeted data is greater than the size of the data unit. When the size of the write-targeted data is smaller than the size of the data unit (S2204: NO), this processing moves to S2205, and when the size of the write-targeted data is larger than the size of the data unit (S2204: YES), this processing moves to S2208.

In S2205, the disk I/O processor 202 creates a new horizontal parity from the new data element in the data unit, the old data element corresponding to this new data element, and the old horizontal parity by computing the exclusive OR thereof, and writes this created new horizontal parity to the cache area. Furthermore, when the old data element and the old horizontal parity are not stored in the cache area, the disk I/O processor 202 reads out the old data element and the old horizontal parity from the HDD 16 prior to carrying out this processing.

In S2206, the disk I/O processor 202 creates a new vertical parity from the new data element, old data element and old vertical parity, and writes this created new vertical parity to the cache area. Furthermore, when the old vertical parity is not stored in the cache area, the disk I/O processor 202 reads out the old vertical parity from the HDD 16 prior to carrying out this processing.

In S2207, the disk I/O processor 202 writes the new data element, new horizontal parity and new vertical parity to the respective target HDD 16 by sending to the respective target HDD 16 the new data element, new horizontal parity, and new vertical parity write requests, which specify the target physical addresses. Furthermore, the disk I/O processor 202, for example, can simultaneously write all of the post-update new data elements, new horizontal parities, and new vertical parities that have been written to the cache area to the HDD 16 at a prescribed timing without carrying out this S2207 processing.

In S2208, the disk I/O processor 202 carries out a write process when the write-targeted data is larger than the data unit. Thus processing will be described in detail below by referring to FIG. 23.

In S2209, the same as the processing of S208 of FIG. 19, the disk I/O processor 202 reads out the read-targeted data from the respective HDD 16, and stores this read-out read-targeted data in the cache area.

FIG. 23 is a flowchart of processing that is equivalent of S2208 of FIG. 22.

This processing is implemented in S2208 of FIG. 22.

In S2301, the disk I/O processor 202 uses the respective data units corresponding to the write-targeted data placed in the cache area to create a new horizontal parity, and writes this created new horizontal parity to the cache area. Furthermore, according to the configuration of a data unit (for example, when only one data element is updated), a new horizontal parity can be created via the same processing as that of S2205 of FIG. 22.

In S2302, the disk I/O processor 202 determines whether or not the number of data units stored in the cache area is greater than a prescribed number (the number of data units corresponding to one vertical parity). When a prescribed number or more of data units have been placed in the cache area (S2302: YES), this processing proceeds to S2303, and when a prescribed number or more of data units have not been placed in the cache area (S2302: NO), this processing moves to S2305.

In S2303, the disk I/O processor 202 creates a new vertical parity on the basis of the data elements comprised in a plurality of data units stored in the cache area, and writes this new vertical parity to the cache area. Furthermore, when the number of data units cannot be divided evenly into the number of data units corresponding to one vertical parity (when a remainder is generated), the disk I/O processor 202 creates a new vertical parity for the surplus data units via the processing described for S2305 and S2306. Or, a new vertical parity can also be created using a data unit to be written anew in the future, or an existing data unit.

In S2305, the disk I/O processor 202 reads out the old data element and the old parity from the HDD 16.

In S2306, the same as the processing of S2206 of FIG. 22, the disk I/O processor 202 creates a new vertical parity from the new data element, old data element and old vertical parity by computing the exclusive OR thereof, and writes this created new vertical parity to the cache area.

In S2307, the same as the processing of S2207 of FIG. 22, the disk I/O processor 202 writes the new data element, new horizontal parity and new vertical parity to the respective target HDD 16 by sending to the respective target HDD 16 the new data element, new horizontal parity, and new vertical parity write requests, which specify the target physical addresses.

Figure 24:
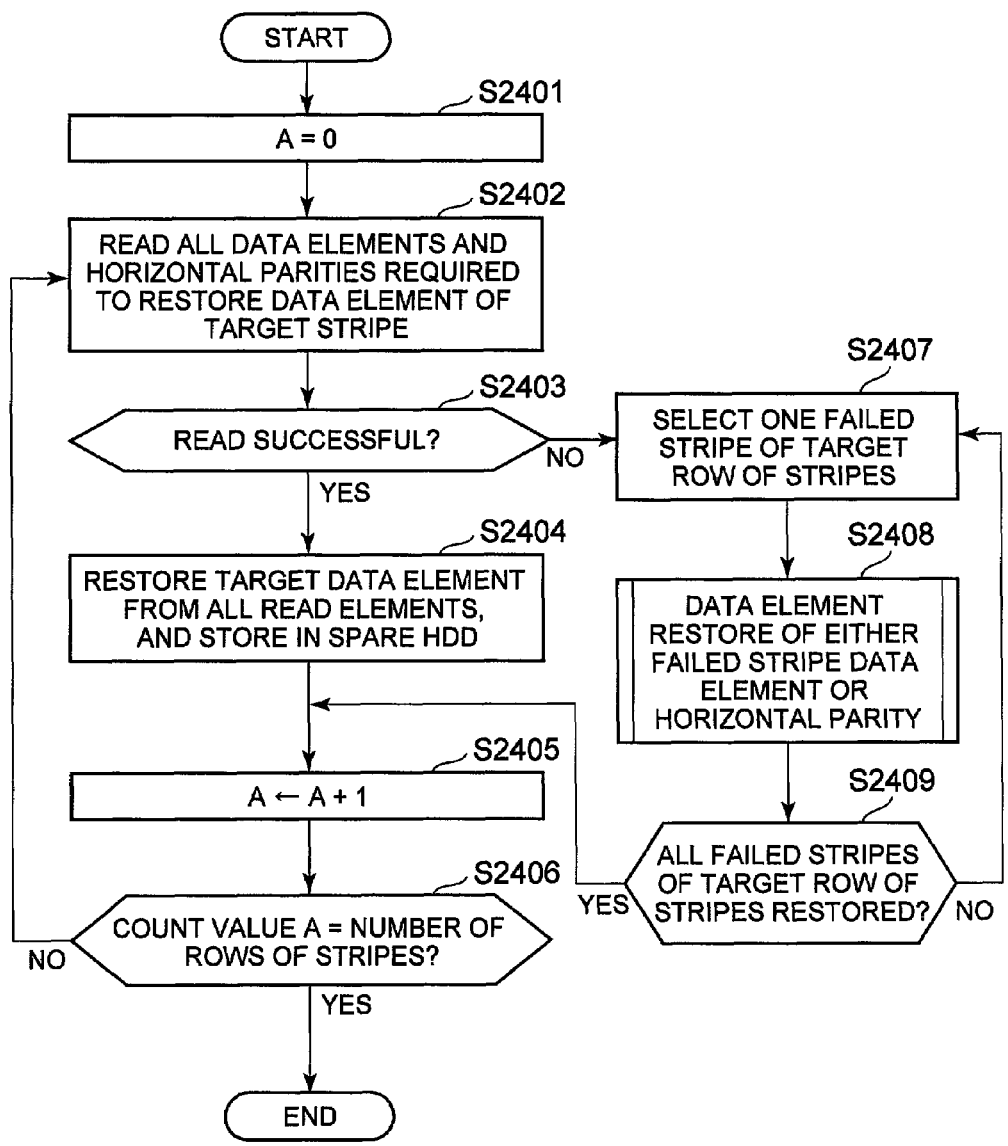
FIG. 24 is a flowchart of restore processing in the second and third data protection modes.

FIG. 24 is a flowchart of restore processing in the second and third protection modes.

In the explanation of FIG. 24, it is supposed that there is one completely failed HDD in the RAID group the same as in the case of FIG. 20. In the processing of FIG. 24, the disk I/O processor 202 restores the data elements and horizontal parities of all the stripes in the completely failed HDD.

The disk I/O processor 202 records in the cache/control memory 14 a count value (described as "count value A" hereinafter), which represents the rank-order number of a row of stripes from the top of the HDD.

In S2401, the disk I/O processor 202 sets the count value A to 0.

In S2402, the disk I/O processor 202 reads out the data elements and horizontal parity (there may not be any horizontal parity) from all the stripes other than the completely failed stripes in the row of stripes specified from the count value A.

In S2403, the disk I/O processor 202 determines whether or not the read of S2402 was successful (if everything was read out), and when this read was successful (S2403: YES), this processing moves to S2405, and when this read failed (S2403: NO), this processing moves to S2407. When the read fails, this signifies that there were two or more failed stripes in the target row of stripes.

In S2404, the disk I/O processor 202 uses the data elements and horizontal parity read out in S2402 to create either a data element or a horizontal parity for the completely failed stripe, and writes this data element or horizontal parity to a stripe in the spare HDD 16, which is in the same location as the location of the completely failed stripe corresponding to count value A in the completely failed HDD 16.

In S2405, the disk I/O processor 202 adds 1 to the count value A.

In S2406, the disk I/O processor 202 determines whether or not the count value A is identical to the number of rows of stripes inside the HDD. When the count value A constitutes the number of rows of stripes (S2406: YES), this processing moves to S2409, and when the count value A does not constitute the number of rows of stripes (S2406: NO), this processing moves to S2402.

In S2407, the disk I/O processor 202 selects one of the failed stripes in the target row of stripes, which has not been restored.

In S2408, the disk I/O processor 202 restores either the data element or the horizontal parity that corresponds to the selected failed stripe. This processing will be explained hereinbelow by referring to FIG. 25. Furthermore, if there is only one failed stripe in the target row of stripes, either the data element or the horizontal parity that corresponds to the relevant failed stripe can be restored via the processing of S2405 instead of this processing.

In S2409, the disk I/O processor 202 determines if all the failed stripes of the target row of stripes have been restored. If all the failed stripes have been restored (S2409: YES), this processing moves to S2405. If all the failed stripes have not been restored (S2409: NO), this processing moves to S2407.

Figure 25:
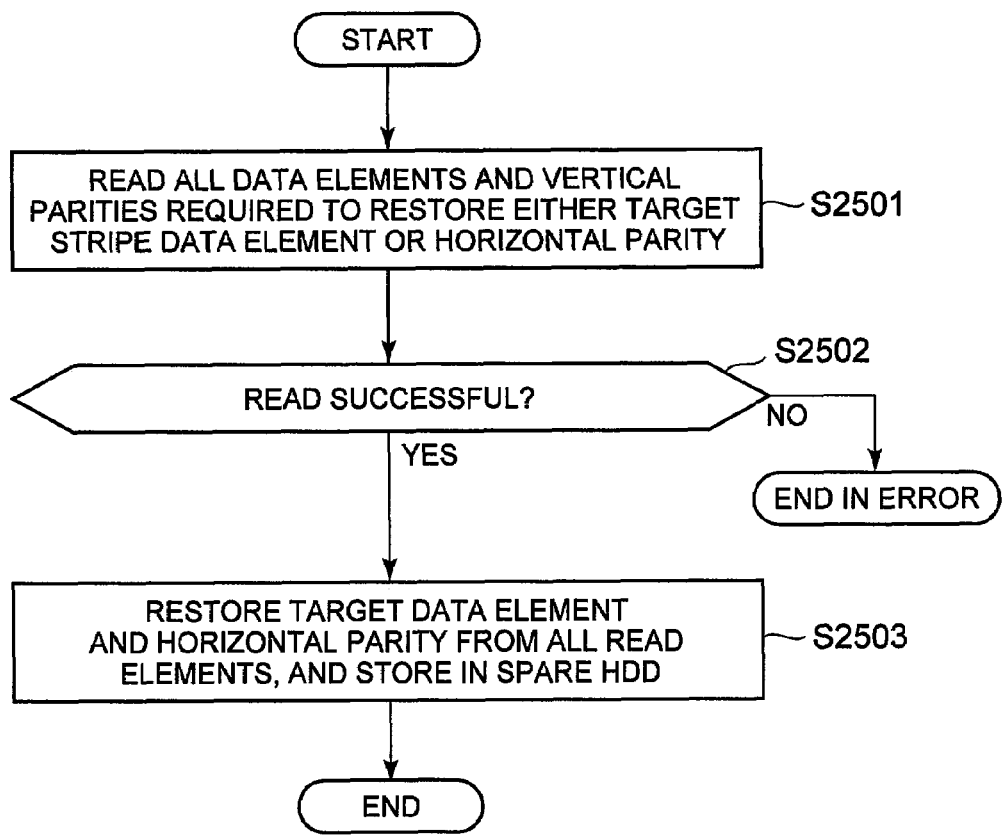
FIG. 25 is a flowchart of processing corresponding to S2407 of FIG. 24.

FIG. 25 is a flowchart of processing that is equivalent to that of S2408 of FIG. 24.

This processing is implemented in S2408 of FIG. 24.

In S2501, the disk I/O processor 202 reads out from the corresponding stripes all of the data elements and vertical parities required to restore the data element and horizontal parity corresponding to the target stripe (the failed stripe or the completely failed stripe that correspond to either the data element or horizontal parity that failed to be read out in the read implemented in S2402).

In S2502, the disk I/O processor 202 determines whether or not the read of S2501 was successful. When this read succeeded (S2502: YES), this processing proceeds to S2503, and when this read failed (S2502: NO), this processing ends in an error.

In S2503, the disk I/O processor 202 uses the data element and vertical parity read out in S2502 to create a data element and a horizontal parity. Then, if either the created data element or horizontal parity is either a data element or horizontal parity inside the completely failed HDD, the disk I/O processor 202 writes either the created data element or horizontal parity to the stripe in the spare HDD 16, which is in the same location as the location of the completely failed stripe corresponding to count value A. If either the created data element or horizontal parity is not either a data element or horizontal parity of the completely failed HDD, either the created data element or horizontal parity is written to a replacement sector of the HDD 16 to which the relevant data element or horizontal parity belong.

Figure 26:
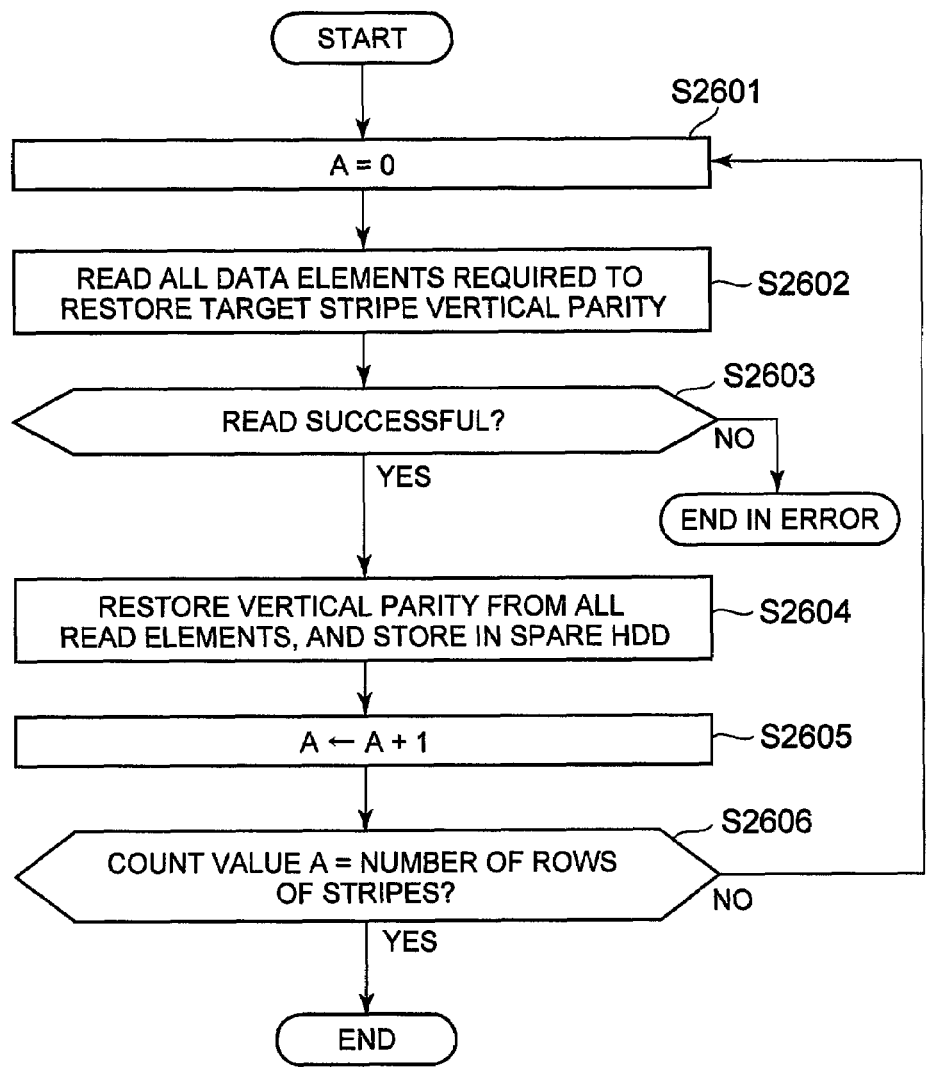
FIG. 26 is a flowchart of a process for restoring an HDD, in which vertical parity is stored in the second data protection mode.

FIG. 26 is a flowchart of processing in the second data protection mode for restoring an HDD in which a vertical parity is stored.

In the explanation of FIG. 26, it is supposed that, of the HDD 16 configuring a vertical RAID group, the HDD 16 storing the vertical parity is a completely failed HDD. In the processing of FIG. 26, the disk I/O processor 202 restores the vertical parity of all the stripes in the completely failed HDD.

The disk I/O processor 202 records in the cache/control memory 14 a count value (described as "count value A" hereinafter), which represents the rank-order number of a row of stripes from the top of the HDD.

In S2601, the disk I/O processor 202 sets the count value A to 0.

In S2602, the disk I/O processor 202 reads out all the data elements, which are inside the vertical RAID group to which vertical parity belongs, and which are needed to restore the relevant vertical parity of the row of stripes corresponding to the count value A.

In S2603, the disk I/O processor 202 determines whether or not the read of S2602 was successful. When this read succeeded (S2603: YES), this processing proceeds to S2604, and when this read failed (S2603: NO), this processing ends in error.

In S2604, the disk I/O processor 202 creates a vertical parity from all the data elements read out in S2602, and writes the created vertical parity to the stripe corresponding to the count value A in the spare HDD 16.

In S2605, the disk I/O processor 202 adds 1 to the count value A.

In S2606, the disk I/O processor 202 determines whether or not the count value A is identical to the number of rows of stripes inside the HDD. When the count value A constitutes the number of rows of stripes (S2606: YES), this processing ends, and when the count value A does not constitute the number of rows of stripes (S2606: NO), this processing moves to S2601.

Figure 27:
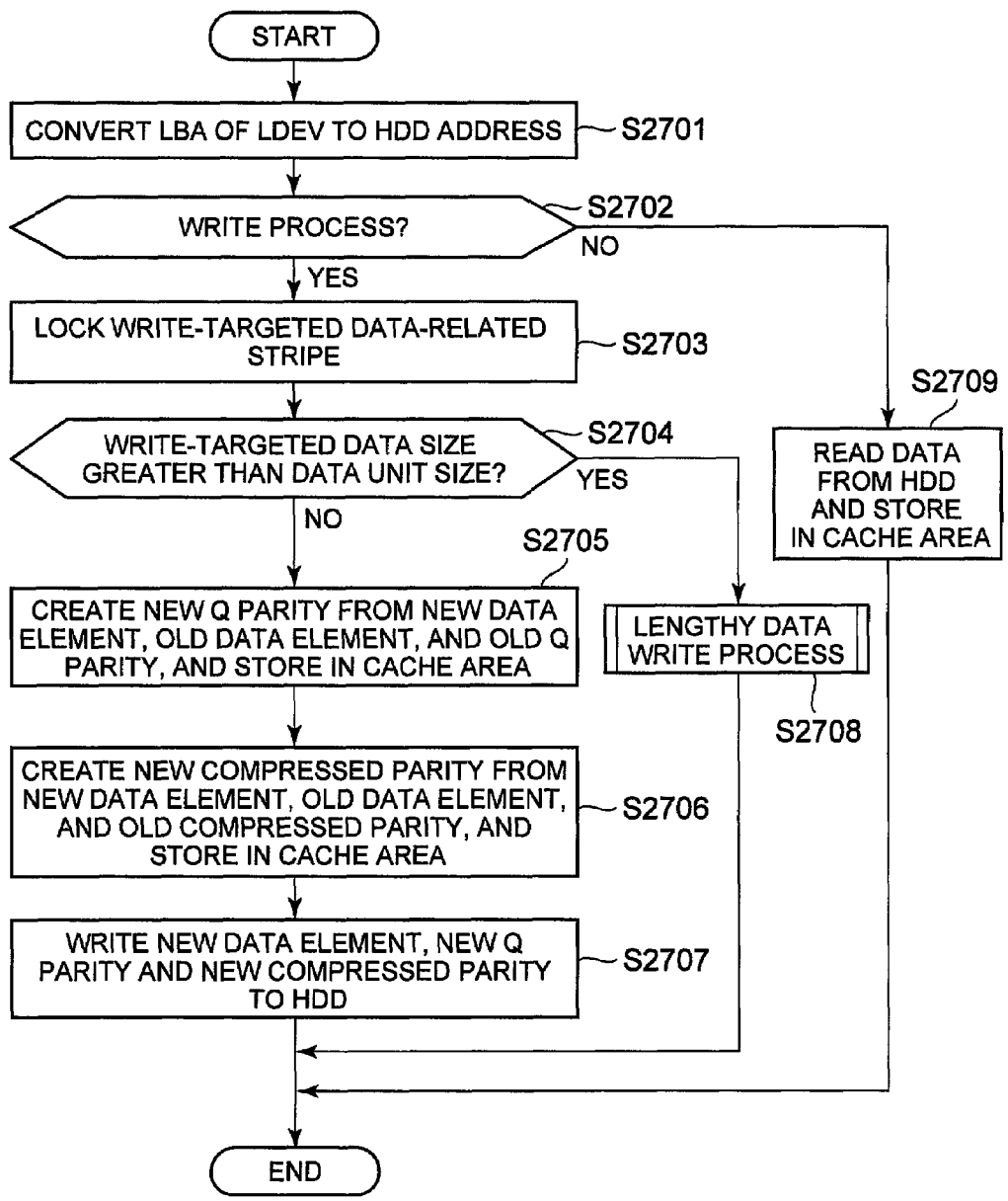
FIG. 27 is a flowchart of an I/O process based on the fourth data protection mode.

FIG. 27 is a flowchart of I/O processing based on the fourth data protection mode.

Figure 28:
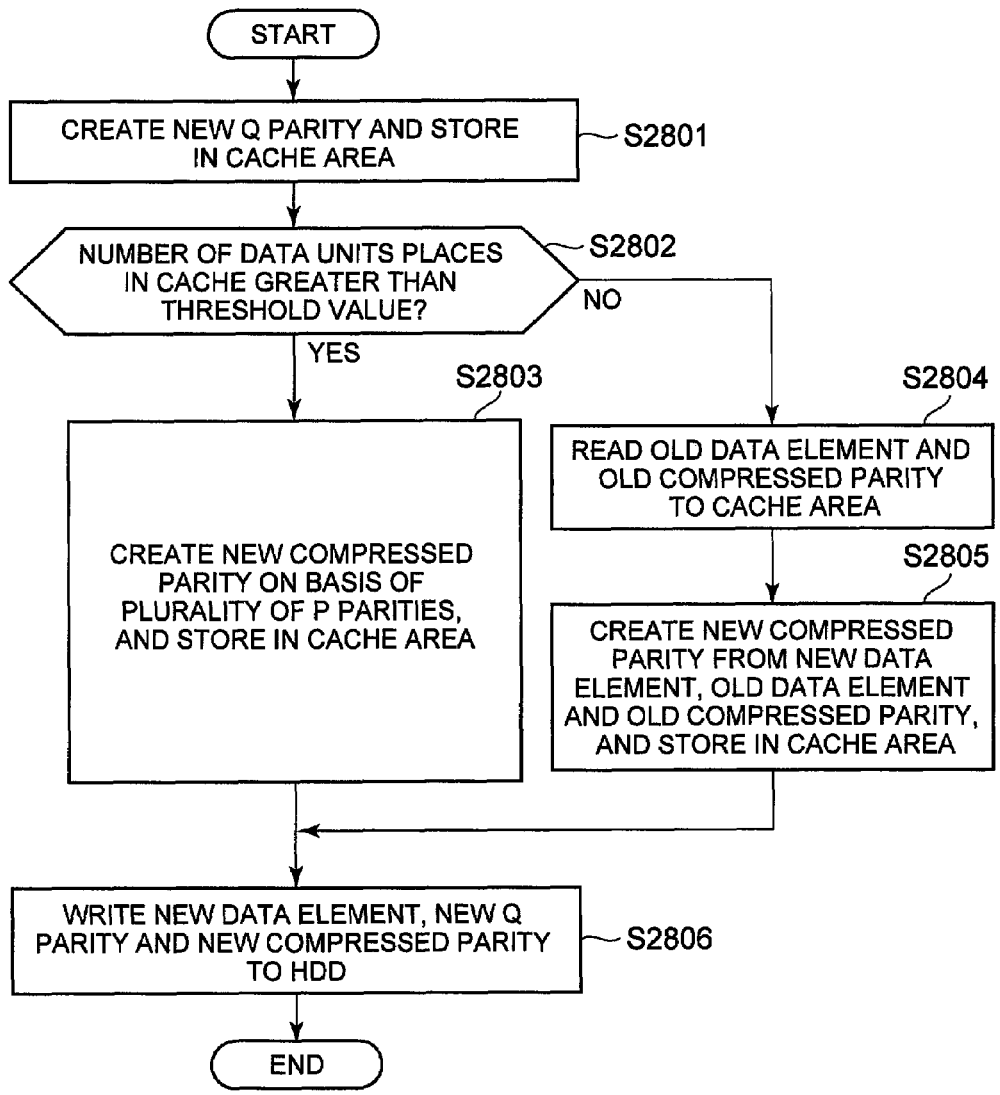
FIG. 28 is a flowchart of processing corresponding to S2708 of FIG. 27.

The same as the explanation of FIG. 19, in the explanations of FIGS. 27 and 28, the I/O-request-targeted LDEV will be referred to as the "target LDEV", the respective HDD of the VDEV comprising the target LDEV will be referred to as the "target HDD", and the HDD address, which is corresponded to the volume area specified by the LBA specified by the I/O request from the host 4, will be called the "target physical address".

The processing of S2701 is the same processing as that of S201 of FIG. 19. That is, in S2701, the LBA specified by the I/O request from the host 4 is converted to the target physical address.

In S2702, the same as the processing of S202 of FIG. 19, the disk I/O processor 202 determines if the received I/O request is a write request or a read request. When the received I/O request is a write request (S2702: YES), this processing proceeds to S2703, and when the received I/O request is a read request (S2702: NO), this processing moves to S2709.

In S2703, the disk I/O processor 202 locks the stripes related to the write of the write-targeted data placed in the cache area (for example, the write-destination stripes, such as those of the data units into which the write-targeted data has been divided, and the Q parity and compressed parity corresponding thereto) so as to make these stripes inaccessible to other requests.

In S2704, the disk I/O processor 202 determines whether or not the size of the write-targeted data is greater than the size of the data unit. When the size of the write-targeted data is smaller than the size of the data unit (S2704: NO), this processing proceeds to S2705, and when the size of the write-targeted data is larger than the size of the data unit (S2704: YES), this processing moves to S2708.

In S2705, the disk I/O processor 202 creates a new Q parity from the new data element in the data unit, the old data element corresponding to this new data element, and the old Q parity, and writes this created new Q parity to the cache area. Furthermore, when the old data element and the old Q parity are not stored in the cache area, the disk I/O processor 202 reads out the old data element and the old Q parity from the HDD 16 prior to carrying out this processing.

In S2706, the disk I/O processor 202 creates a new compressed parity from the new data element, old data element and old compressed parity, and writes this created new compressed parity to the cache area. Furthermore, when the old compressed parity is not stored in the cache area, the disk I/O processor 202 reads out the old compressed parity from the HDD 16 prior to carrying out this processing.

In S2707, the disk I/O processor 202 writes the new data element, new Q parity and new compressed parity to the respective target HDD 16 by sending to the respective target HDD 16 the new data element, new Q parity, and new compressed parity write requests, which specify the target physical addresses. Furthermore, the disk I/O processor 202, for example, can simultaneously write all of the post-update new data elements, new Q parities, and new compressed parities that have been written to the cache area to the HDD 16 at a prescribed timing without carrying out this S2707 processing.

In S2708, the disk I/O processor 202 carries out a write process when the write-targeted data is larger than the data unit. This processing will be described in detail below by referring to FIG. 28.

In S2709, the same as the processing of S208 of FIG. 19, the disk I/O processor 202 reads out the read-targeted data from the respective HDD 16, and stores this read-out read-targeted data in the cache area.

FIG. 28 is a flowchart of processing that is equivalent to that of S2708 of FIG. 27.

This processing is implemented in S2708 of FIG. 27.

In S2801, the disk I/O processor 202 uses the respective data units corresponding to the write-targeted data placed in the cache area to create a new Q parity, and writes this created new Q parity to the cache area. Furthermore, according to the configuration of a data unit (for example, when only one data element is updated), a new Q parity can be created via the same processing as that of S2705 of FIG. 27.

In S2802, the disk I/O processor 202 determines whether or not the number of data units stored in the cache area is greater than a prescribed number (the number of data units corresponding to one compressed parity). When a prescribed number or more of data units have been placed in the cache area (S2802: YES), this processing proceeds to S2803, and when a prescribed number or more of data units have not been placed in the cache area (S2802: NO), this processing moves to S2804.

In S2803, the disk I/O processor 202 creates a plurality of P parities corresponding to a plurality of data units stored in the cache area, creates a new compressed parity that compresses the created plurality of P parities into one parity, and writes this new compressed parity to the cache area. Furthermore, if the number of data units cannot be divided evenly into the number of data units corresponding to the one compressed parity (when a remainder is generated), the disk I/O processor 202 creates a new compressed parity for the surplus data units via the processing described for S2805 and S2806. Or, a new compressed parity can also be created using a data unit to be written anew in the future, or an existing data unit.

In S2804, the disk I/O processor 202 reads out the old data element and the old compressed parity from the HDD 16.

In S2805, the same as the processing of S2706 of FIG. 27, the disk I/O processor 202 creates a new compressed parity from the new data element, old data element and old compressed parity by computing the exclusive OR thereof, and writes this created new compressed parity to the cache area.

In S2806, the same of the processing of S2707 of FIG. 27, the disk I/O processor 202 writes the new data element, new Q parity and new compressed parity to the respective target HDD 16 by sending to the respective target HDD 16 the new data element, new Q parity, and new compressed parity write requests, which specify the target physical addresses.

Figure 29:
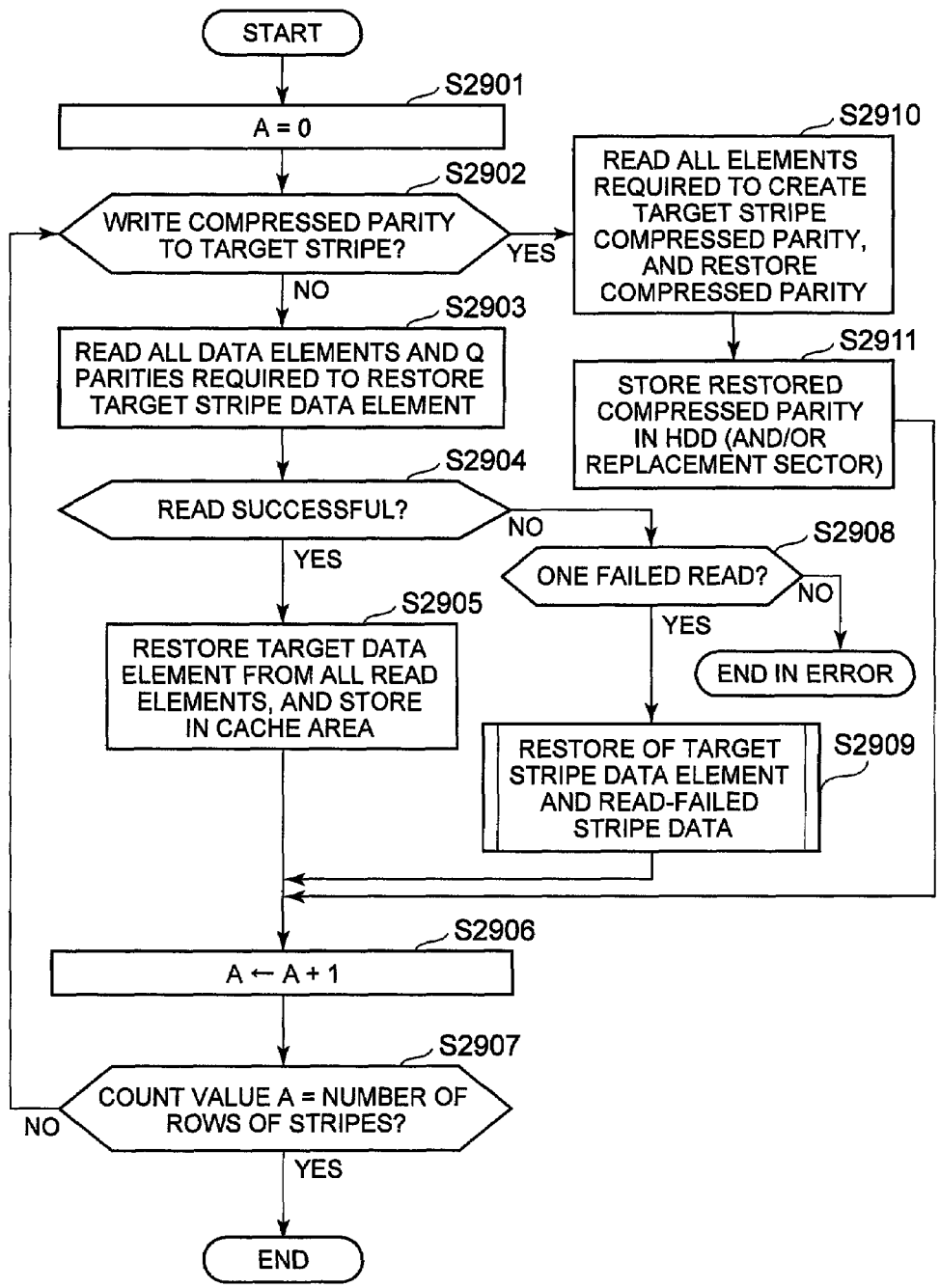
FIG. 29 is a flowchart of a restore process in the fourth data protection mode.

FIG. 29 is a flowchart of restore processing in the fourth data protection mode.

In the explanation of FIG. 29, it is supposed that there is one completely failed HDD in the RAID group the same as in the case of FIG. 20. In the processing of FIG. 29, the disk I/O processor 202 restores the data elements, Q parities and compressed parities of all the stripes in the completely failed HDD.

The disk I/O processor 202 records in the cache/control memory 14 a count value (described as "count value A" hereinafter), which represents the rank-order number of a row of stripes from the top of the HDD.

In S2901, the disk I/O processor 202 sets the count value A to 0.

In S2902, the disk I/O processor 202 determines whether or not the failed stripe of the completely failed HDD (hereinafter, the completely failed stripe) in the row of stripes specified from the count value A is the specified stripe into which the compressed parity is written. When the completely failed stripe corresponding to count value A is the specified stripe (S2902: YES), this processing moves to S2910. When the completely failed stripe corresponding to count value A is not the specified stripe (S2902: NO), this processing proceeds to S2903.

In S2903, the disk I/O processor 202 reads out the data elements and Q parities (there may not be any Q parities) from all the stripes other than the completely failed stripe in the row of stripes specified from the count value A.

In S2904, the disk I/O processor 202 determines whether or not the read of S2903 was successful (if everything was read out), and when this read succeeded (S2904: YES), this processing proceeds to S2905, and when this read failed (S2904: NO), this processing moves to S2908.

In S2905, the disk I/O processor 202 uses the data elements and Q parity read out in S2903 to create either a data element or a Q parity for the completely failed stripe, and writes this data element or Q parity to a stripe, which is in the same location in the spare HDD 16 as the location of the completely failed stripe corresponding to count value A in the completely failed HDD 16.

In S2906, the disk I/O processor 202 adds 1 to the count value A.

In S2907, the disk I/O processor 202 determines whether or not the count value A is identical to the number of rows of stripes inside the HDD. When the count value A constitutes the number of rows of stripes (S2907: YES), this processing ends, and when the count value A does not constitute the number of rows of stripes (S2907: NO), this processing moves to S2902.

In S2908, the disk I/O processor 202 determines whether or not one of the reads carried out in S2903 was a failed read. If there was one failed read, this processing proceeds to S2909, and if there was more than one failed read, this processing ends in an error.

In S2909, the disk I/O processor 202 restores the data of the completely failed stripe, and the data of the stripe that corresponds to either the data element or the Q parity that failed to be read in S2903. This processing will be described in detail hereinbelow by referring to FIG. 30.

In S2910, the disk I/O processor 202 reads all the data required for creating a compressed parity for the stripe corresponding to the count value A, and creates a compressed parity.

In S2911, the disk I/O processor 202 stores the created compressed parity in the spare HDD 16 in the same location as the stripe corresponding to the count value A.

Figure 30:
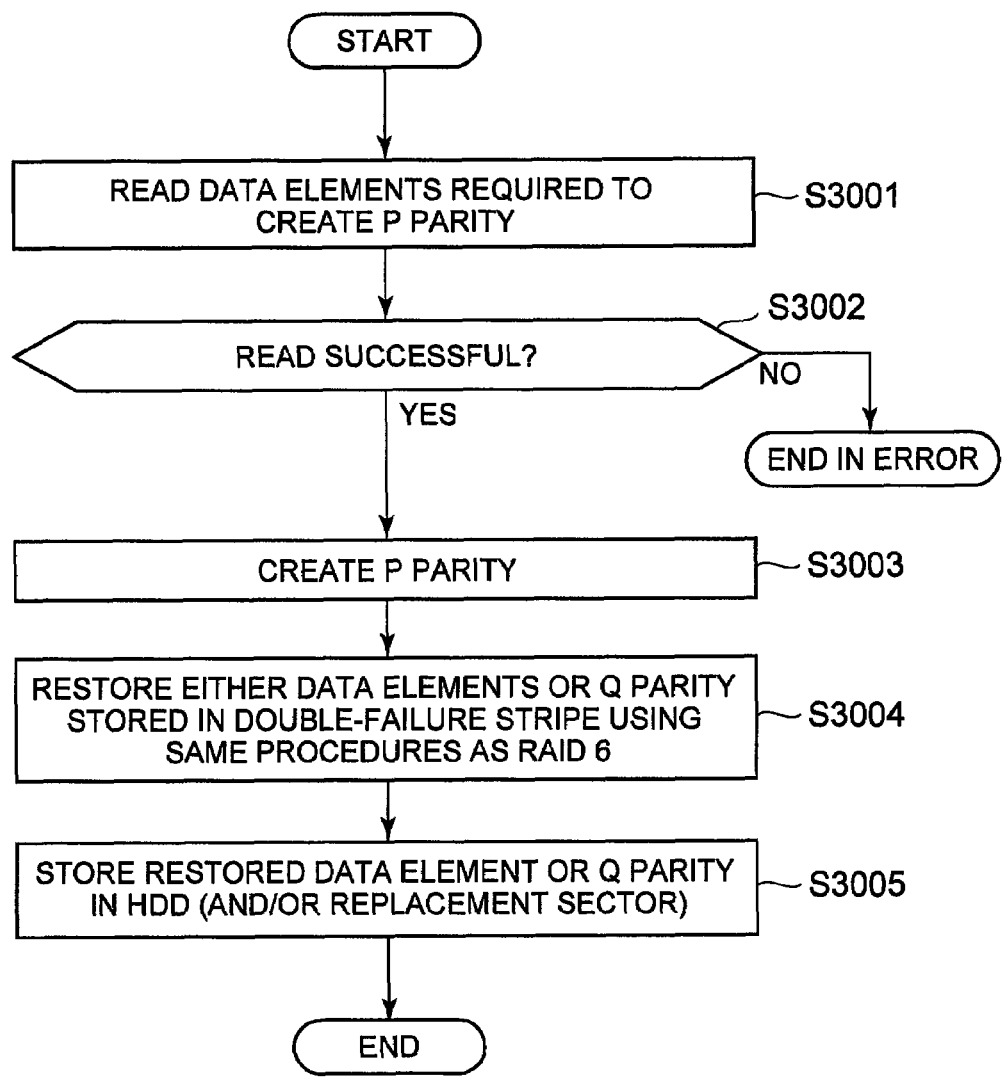
FIG. 30 is a flowchart of processing corresponding to S2909 of FIG. 29.

FIG. 30 is a flowchart of processing that is equivalent to that of S2909 of FIG. 29 in the fourth data protection mode.

This processing is implemented in S2909 of FIG. 29 in the fourth data protection mode.

In S3001, the disk I/O processor 202 reads out the data unit and compressed parity required to create a P parity corresponding to the data unit of the target row of stripes.

In S3002, the disk I/O processor 202 determines whether or not the read of S3001 was successful. When this read succeeded (S3002: YES), this processing proceeds to S3003, and when this read failed (S3002: NO), this processing ends in an error.

In S3003, the disk I/O processor 202 creates a P parity corresponding to the data unit of the target stripe from the data unit and compressed parity read out in S3001 by computing the exclusive OR thereof.

In S3004, the disk I/O processor 202 restores the two data elements of the two failed stripes from the data element and Q parity read out in S2903, and the P parity created in S3003 using the same procedures as RAID 6.

In S3005, the disk I/O processor 202 respectively writes either the data element or Q parity restored in S3004 to a stripe in the same location of the spare HDD 16 as the location of the completely failed stripe in the completely failed HDD 16, and to a stripe in the same location of a different spare HDD 16 as the location of the partially failed stripe in the partially failed HDD 16. Furthermore, when either the data element or Q parity restored in S3004 was in the partially failed HDD 16, the write of either the restored data element or Q parity can be to the replacement sector of the partially failed HDD instead of to the spare HDD.

The above-described embodiments of the present invention are examples for explaining the present invention, and do not purport to limit the scope of the present invention to these embodiments. The present invention can be put into practice in a variety of other modes without departing from the gist thereof. For example, in the above-cited examples, a stripe that configures a row of stripes corresponds one-to-one with an HDD, but two or more stripes configuring a row of stripes can also correspond to a single HDD. Further, in the fourth data protection mode, a P parity can be recorded for each data unit instead of a Q parity, and a plurality of Q parities instead of a plurality of P parities can be compressed into a single compressed parity and written to a RAID group.

What is claimed is:
1. A storage system, comprising:
a storage group configured by a plurality of storage devices; and
a write controller that controls writing to the storage group,
wherein the storage group being configured from a plurality of storage sub-groups,
wherein respective storage sub-groups being configured from two or more storage devices of the plurality of storage devices,
wherein the plurality of storage sub-groups being configured from a plurality of first type storage sub-groups and a plurality of second type storage sub-groups,
wherein two or more storage devices, which configure respective second type storage sub-groups, being storage devices that respectively constitute components of the plurality of first type storage sub-groups, and therefore, respective storage devices that configure a storage group constituting components of both any of the plurality of first type storage sub-groups, and any of the plurality of second type storage sub-groups;
wherein respective first type sub-group storage areas, which are respective storage areas of respective first type storage sub-groups, being configured from a plurality of rows of first type sub-group storage areas,
wherein a row of first type sub-group storage areas spanning the two or more storage devices configuring the first type storage sub-group, and being configured from two or more first type sub-storage areas corresponding to these two or more storage devices,
wherein respective second type sub-group storage areas, which are respective storage areas of respective second type storage sub-groups, being configured from a plurality of rows of second type sub-storage areas, wherein a row of second type sub-group storage areas spanning the two or more storage devices that configure the second type storage sub-group, and being configured from two or more second type sub-storage areas corresponding to these two or more storage devices, wherein respective second type storage sub-groups are RAID groups corresponding to RAID 4, and wherein two or more logical addresses respectively corresponding to two or more first type sub-group storage areas configuring a Pth row of first type sub-group storage areas inside a Kth first type storage sub-group, and two or more logical addresses respectively corresponding to two or more first type sub-group storage areas configuring a Pth row of first type sub-group storage areas inside a K+1st first type storage sub-group are consecutive (K and P being integers greater than 0).

2. A storage system, comprising:

a storage group configured from a plurality of storage devices; and a write controller that writes a data unit of data of a prescribed size to the storage group, wherein the storage group being configured from a plurality of storage sub-groups, wherein respective storage sub-groups being configured from two or more storage devices of the plurality of storage devices, wherein the storage sub-groups, which are storage areas of the storage sub-groups, are configured from a row of a plurality of sub-storage areas, wherein each row of sub-storage areas spanning two or more storage devices and configured from a plurality of sub-storage areas corresponding to the plurality of storage areas, wherein a first type data unit being configured from a plurality of data elements, wherein the write controller:

writing (W1) a data set, which is configured from the plurality of data elements configuring a data unit and a second redundancy code created on the basis of the data unit, to a row of sub-storage areas, creating (W2) a compressed redundancy code, which is one code of a size that is smaller than a total size of two or more first redundancy codes, based on two or more first redundancy codes respectively created based on two or more data units in two or more storage sub-groups of the plurality of storage sub-groups, and writing (W3) the created compressed redundancy code to a nonvolatile storage area that differs from the two or more storage sub-groups, and wherein two or more logical addresses respectively corresponding to two or more sub-storage areas configuring a Pth row of sub-storage areas in a Kth storage sub-group, and two or more logical addresses respectively corresponding to two or more sub-storage areas configuring a Pth row of sub-storage areas in a K+1st storage sub-group are consecutive (K and P being integers greater than 0), for the two or more storage sub-groups.

* * * * *